United States Patent
Berichon et al.

(10) Patent No.: US 9,105,003 B2
(45) Date of Patent: Aug. 11, 2015

(54) FREIGHT TRACKING AND CONTROL SYSTEM

(75) Inventors: Jeffrey Berichon, Kirtland, OH (US); Lance T. Pfeifer, Ft. Lauderdale, FL (US); Michael O'Flaherty, Streetsboro, OH (US)

(73) Assignee: BearWare, Inc., Chagrin Fallas, OH (US)

( * ) Notice: Subject to any disclaimer, the term of this patent is extended or adjusted under 35 U.S.C. 154(b) by 2595 days.

(21) Appl. No.: 10/755,218

(22) Filed: Jan. 12, 2004

(65) Prior Publication Data

US 2004/0199285 A1    Oct. 7, 2004

Related U.S. Application Data

(60) Provisional application No. 60/439,130, filed on Jan. 10, 2003.

(51) Int. Cl.
| | | |
|---|---|---|
| *G06Q 10/08* | (2012.01) | |
| *G06Q 20/20* | (2012.01) | |
| *G06Q 30/06* | (2012.01) | |
| *G06Q 10/06* | (2012.01) | |

(52) U.S. Cl.
CPC .............. *G06Q 10/087* (2013.01); *G06Q 10/06* (2013.01); *G06Q 10/08* (2013.01); *G06Q 20/203* (2013.01); *G06Q 30/0635* (2013.01)

(58) Field of Classification Search
CPC ... G06Q 10/087; G06Q 10/08; G06Q 20/203; G06Q 30/0635; G06Q 10/06
USPC ............. 705/1, 28, 22, 29; 700/213–220, 222
See application file for complete search history.

(56) References Cited

U.S. PATENT DOCUMENTS

| | | | | |
|---|---|---|---|---|
| 6,026,378 | A | * | 2/2000 | Onozaki .......................... 705/28 |
| 6,285,916 | B1 | * | 9/2001 | Kadaba et al. ................. 700/222 |
| 6,988,079 | B1 | * | 1/2006 | Or-Bach et al. .................. 705/28 |
| 7,257,552 | B1 | * | 8/2007 | Franco ............................. 705/28 |
| 2002/0010661 | A1 | * | 1/2002 | Waddington et al. ........... 705/28 |
| 2004/0138921 | A1 | * | 7/2004 | Broussard et al. ................ 705/2 |
| 2004/0153379 | A1 | * | 8/2004 | Joyce et al. ...................... 705/28 |

* cited by examiner

*Primary Examiner* — Ryan Zeender
*Assistant Examiner* — H Rojas
(74) *Attorney, Agent, or Firm* — Tucker Ellis LLP

(57) ABSTRACT

An electronic system for managing items in a supply chain. The system generally includes item information capturing means, such as a handheld device, adapted for capturing identification information associated with an item identified for supply chain management; mode specifying means adapted for receiving user input representative of a selection of at least one of a plurality of capturing modes, wherein each capturing mode is adapted for creating associated information by associating the captured item information with supply chain information; and transferring means adapted for transferring the associated information to an electronic storage device.

24 Claims, 99 Drawing Sheets

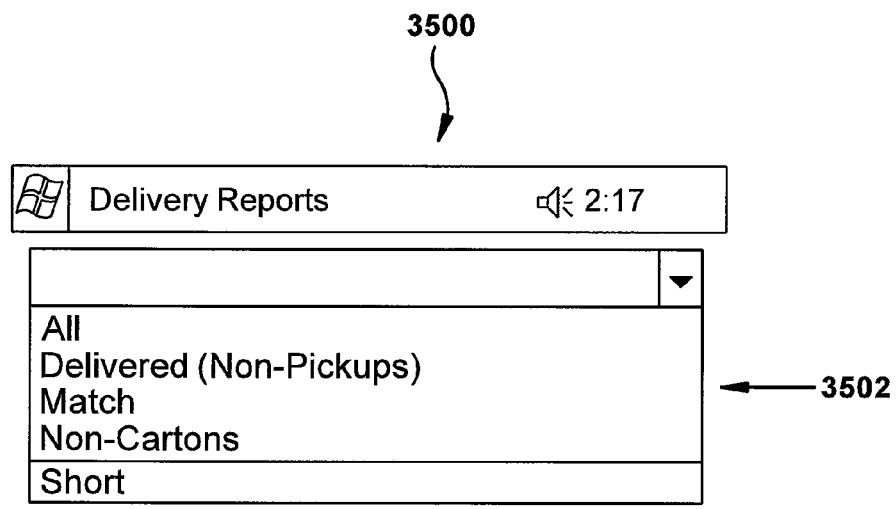
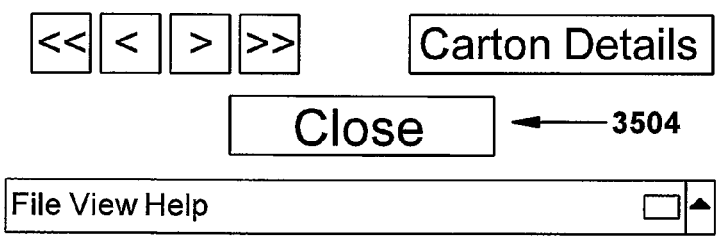
Figure 35

|  |  |  |  |  |  |
|---|---|---|---|---|---|
| NAME OF ORIGIN CARRIER  P.G. & E. COMPANY TRUCK | | RECEIVED, subject to the classification and tariffs in effect on the date of the issue of this Bill of Lading. | | BOL #  200311260015 | |
| AT (City or Town)  42105 Boyce Road, Fremont | | STATE OF  CALIFORNIA | ZIP CODE  94538 | ON (DATE)  11/26/2003 | |
| CONSIGNED TO  Merced | | STREET ADDRESS  3185 "M" Street | | ROUTE #  123 | |
| DESTINATION (City or Town)  California | | STATE OF | ZIP CODE | DELIVERY DATE | |
| Description | Barcode | Pallet | | Box | Carton |
| Pallet | MEW00 1773350311250011 | | | 177335 | 001 |
| Pallet | MEW00 11773350311250021 | | | 177335 | 002 |
| SHIPPER  PACIFIC GAS AND ELECTRIC COMPANY | | CARRIER  P. G. & E. COMPANY TRUCK | | CARRIER VENDOR # | |
| PREPARED BY (PRINT) | CO. PHONE #  225-2034 | DRIVER (PRINT) | | ☐ COLLECT  Present Bill to Consignee | |
| PREPARED BY (SIGNATURES) | | | | ☐ PREPAID  Sent Freight Bill | |

FREIGHT TRACKING AND CONTROL SYSTEM

CROSS-REFERENCE TO RELATED APPLICATIONS

The present application claims the benefit of U.S. Provisional Application 60/439,130, filed Jan. 10, 2003.

BACKGROUND OF THE INVENTION

This invention is directed to a system and method for tracking and controlling goods as they move through the supply chain. More particularly, this invention is a supply chain event management system which generally includes four basic example components: (i) a handheld scanner application, (ii) a desktop application that transmits that data to a centralized server, (iii) a web service that parses the data and inserts it into a SQL database, and (iv) a web based reporting tool.

Supply chain management is a common problem for any organization that must transport goods over a wide geographic area. Successful businesses cannot afford to routinely lose goods or otherwise mismanage their supply chain. Unfortunately, until recently, many companies were forced to track goods by manually counting them as they left one point in the supply chain and were received at another. After counting the goods shipped and received, manually generated paper reports were prepared and mailed or faxed to management to identify shipment exceptions.

With the advent of computers, systems were created that partially automated the data collection and reporting process. Bar code scanners collected data at the consolidated shipment level, value added networks (VAN's) or file transfer protocol (FTP) processes were used to transmit electronic files between transportation companies and their shipping clients, company firewalls were modified to receive these electronic files, and, once this data was received, reports were created that could be distributed to decision makers.

While much better than paper and pencil, these systems were ultimately not accurate, efficient, or cost-effective. First, by tracking freight at only the shipment level, cartons and other individual freight items were invisible and could be lost in the supply chain. Second, transmitting electronic files using VAN's or an FTP process required companies to open their firewalls adding time, cost and increasing the possibility of security breaches. Finally, even when data made it through the company firewall, there was no secure method for a shipper and its transportation provider to view data using the same database or reports.

There is a need for a system which uses bar code scanning to track freight at the carton or item level at multiple points in the supply chain, a web service to directly insert data into a centralized data base, and internet based reports which can be accessed by multiple users via common web browsing tools.

SUMMARY OF THE INVENTION

In accordance with the present invention, there is provided a system and method for tracking and controlling the movement of goods and freight through the supply chain.

According to one aspect, the present invention provides an electronic system for managing items in a supply chain. The system generally includes item information capturing means adapted for capturing identification information associated with an item identified for supply chain management; mode specifying means adapted for receiving user input representative of a selection of at least one of a plurality of capturing modes, wherein each capturing mode is adapted for creating associated information by associating the captured item information with supply chain information; and transferring means adapted for transferring the associated information to an electronic storage device.

According to another aspect, the present invention provides a method for managing items in a supply chain. The method generally includes the steps of capturing identification information associated with an item identified for supply chain management; receiving user input representative of a selection of at least one of a plurality of capturing modes, wherein each capturing mode is adapted for creating associated information by associating the captured item information with supply chain information; and transferring the associated information to an electronic storage device.

These and other advantages, aspects, and features will be understood by one of ordinary skill in the art upon reading and understanding the specification.

BRIEF DESCRIPTION OF THE DRAWINGS

FIG. 35 is a Delivery Reports Query Screen of the Pool Distribution Delivery Scan Application according to the present invention;

FIG. 55 is a scan summary report screen of the web based Distribution Center Direct reporting application according to the present invention.

FIG. 56 is a bar code tracking report screen of the web based Distribution Center Direct reporting application according to the present invention.

FIG. 66 is a Barcode tracking report screen of the web based Distribution Center Direct reporting application according to the present invention.

FIG. 70 is a Pallet tracking report screen of the web based Distribution Center Direct reporting application according to the present invention.

FIG. 71 is a Bill of Lading query screen of the web based Distribution Center Direct reporting application according to the present invention.

FIG. 73 is a Bill of Lading screen of the web based Distribution Center Direct reporting application according to the present invention.

FIG. 88 is a Delivery Exceptions report screen of the web based Pool Distribution reporting application according to the present invention.

FIG. 92 is a Store/Trip List report screen of the web based Pool Distribution reporting application according to the present invention.

DETAILED DESCRIPTION OF A PREFERRED EMBODIMENT OVERVIEW

Figure 1:
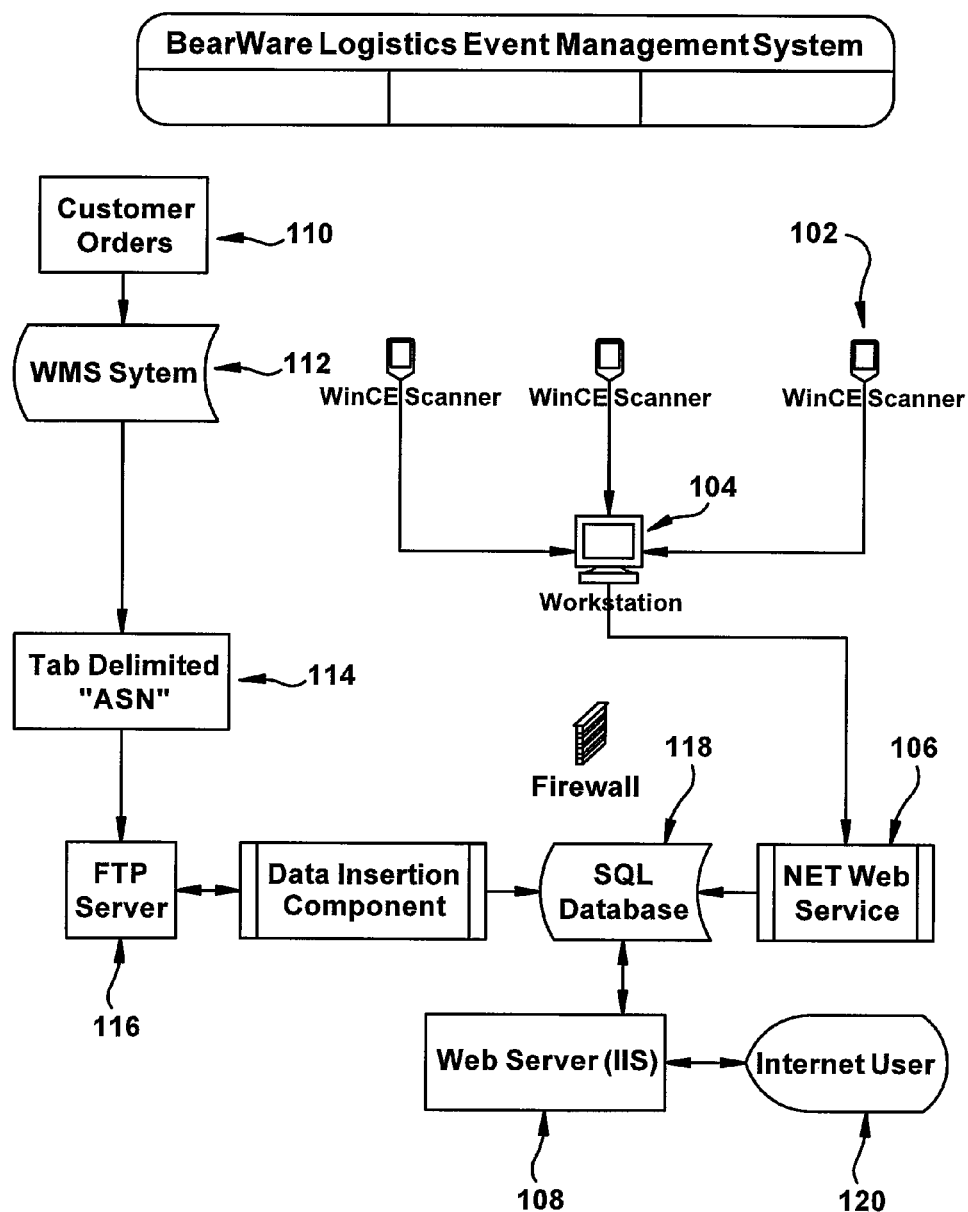
FIG. 1 is a diagram illustrating an overview of the entire freight tracking and controlling system according to the present invention.

The present invention is directed to a supply chain event management system for tracking and controlling goods and freight using bar code scanners to collect data 102, a desktop application to initially receive and transmit that data 104, a web service to receive that data and insert it into a SQL database 106, and a web-based reporting application 108. A diagram giving an overview of the freight tracking and controlling system 100 is shown in FIG. 1.

Figure 2:
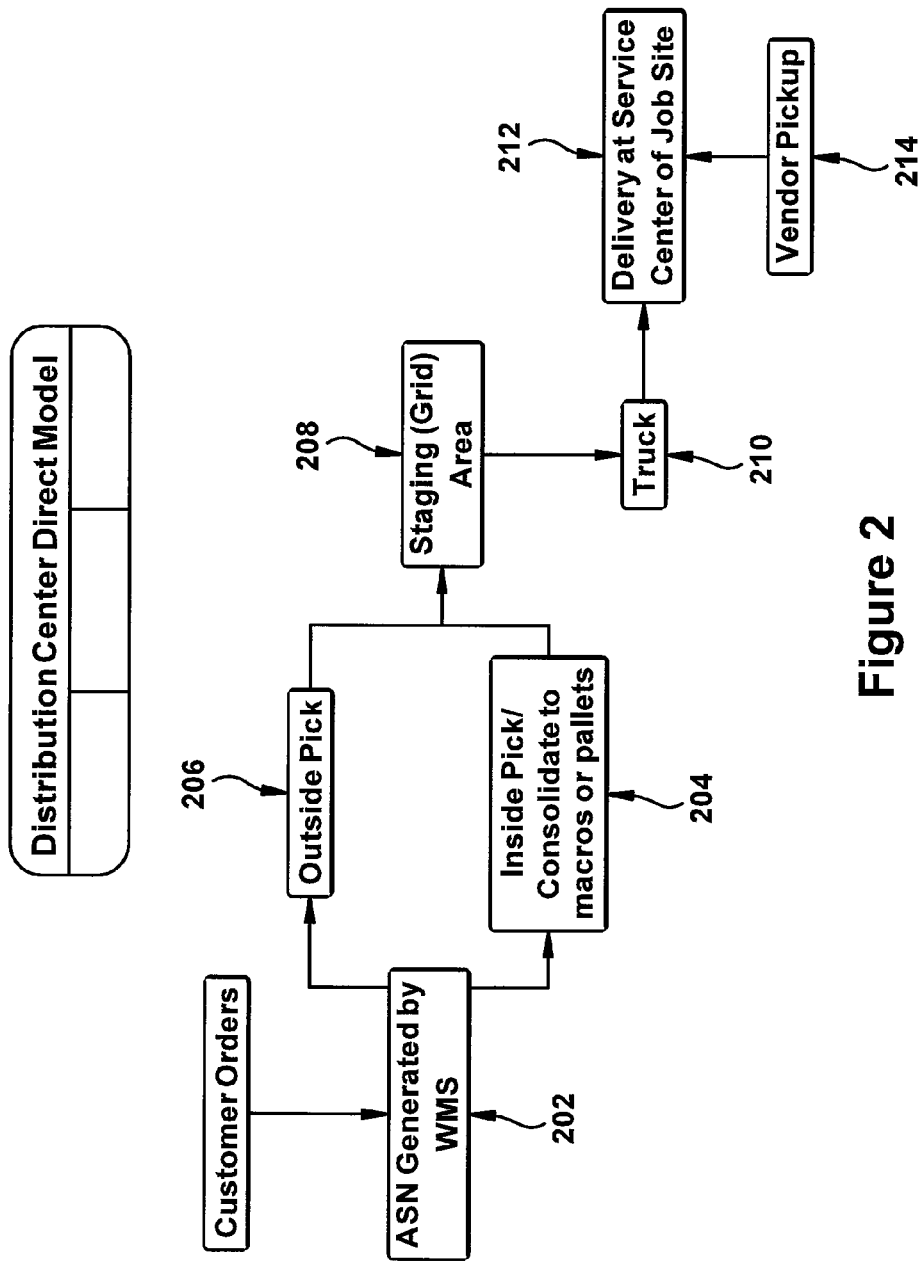
FIG. 2 is a diagram illustrating the Distribution Center Direct shipping model according to the present invention.
Figure 3:
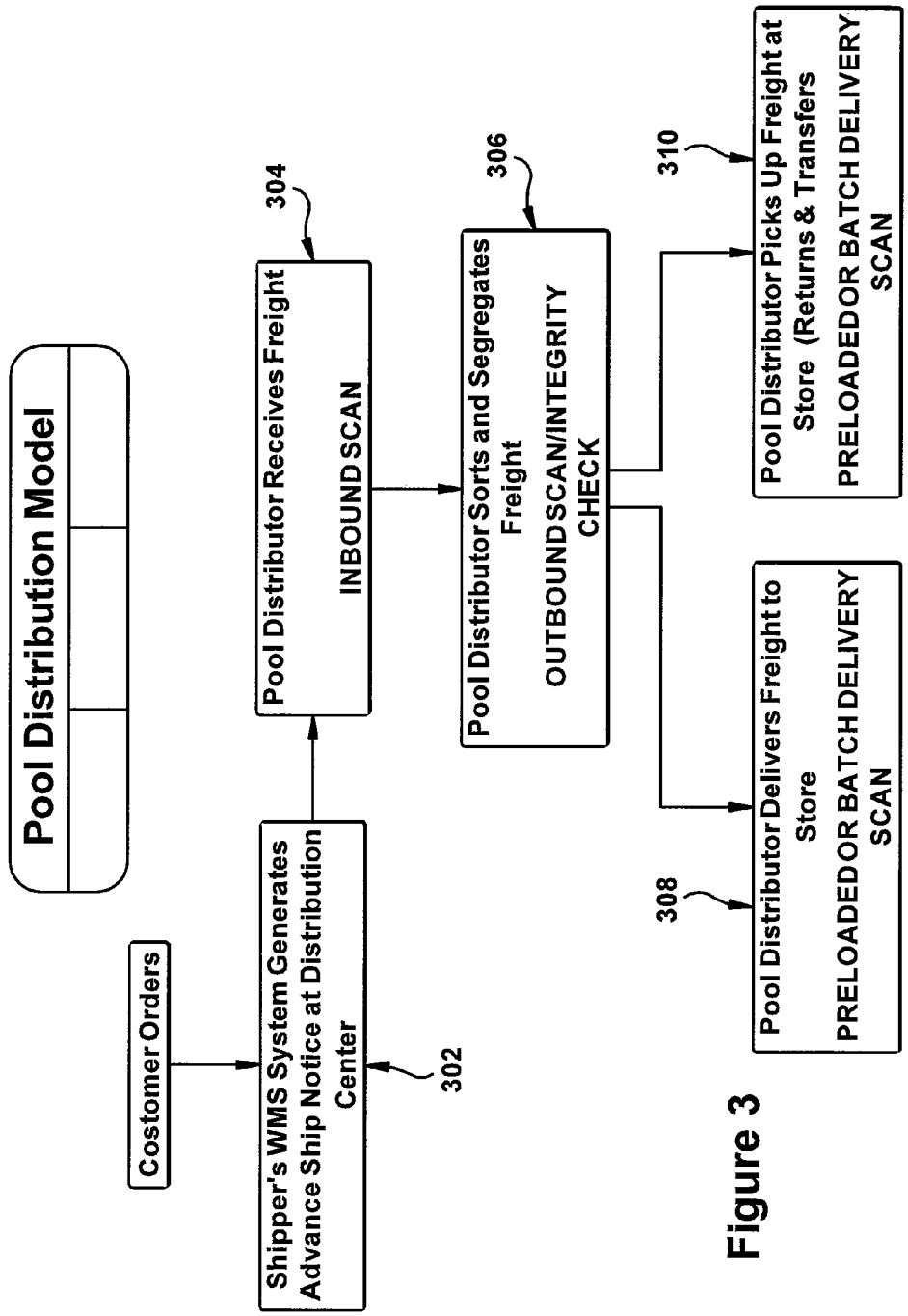
FIG. 3 is a diagram illustrating the Pool Distribution shipping model according to the present invention.

The present invention can be used in at least two points in the supply chain: (i) distribution center direct shipments and (ii) pool distribution shipments. In the distribution center direct model, goods are warehoused at a distribution center, customer orders are picked from inventory, and then delivered. A diagram illustrating the distribution center direct model is shown in FIG. 2. In the pool distribution model, goods are also warehoused at a distribution center; however, they are not delivered to the customer directly from the distribution center. Goods for multiple delivery points in a single geographic area are loaded on a tractor trailer at a shipper's distribution center, shipped to a secondary, usually independent, warehouse ("pool distribution point") where the goods are unloaded, sorted and segregated into single store orders. These orders are then shipped from the pool distributor to their ultimate delivery point. A diagram illustrating the distribution center direct model is shown in FIG. 3.

In both the distribution center direct and pool distribution models, the starting point in the supply chain is a customer order 110. These orders are processed by a warehouse management system ("WMS") 112. The WMS generates instructions to warehouse personnel on which inventory at the distribution center should be processed for outbound shipment during a particular shipping cycle. This is generically referred to as an advance shipment notice ("ASN") 114. The ASN is electronically transmitted to the web database 118 via an FTP transmission 116.

In the distribution center direct model, the WMS generates an ASN 202 which consists of a customer order or aggregation of customer orders. Freight is scanned at the time it is picked out of the warehouse inventory. If the goods to be picked are small, they are scanned as they are consolidated into larger containers (macros or pallets, etc.) bound for the same delivery site 204. Larger items and macros and pallets are scanned directly into a shipping grid 208. The items in the shipping grids are then scanned onto the delivery truck 210 and again when they are delivered 212. Goods from a vendor bound to the distribution ("vendor pickup") are also scanned at pickup and delivery to the distribution center 214. A desktop application 104 is then used to upload and process the scan data 102, and send the scan data to the web service 106 which inserts it into the web database 118. Finally, a Web Reporting application 108 provides online data reporting and allows users 120 to make inquiries about the freight data stored in the web database 108.

In the pool distribution model, the WMS generates the ASN 302 after goods have been prepared for outbound shipment and loaded onto a truck bound for a pool distribution point. The ASN represents a listing of goods that should have been shipped to the pool distribution point. The ASN is transmitted to the web database via an FTP transmission. Upon receipt of the goods at the pool distribution point, the freight is scanned ("inbound scan") 304, sorted into individual store orders, and scanned again ("outbound scan") 306 to verify the integrity of the sortation, loaded onto trucks for store delivery and scanned at the store ("delivery scan") 308. If freight is being picked up at the store for return to the shipper's distribution center or transferred to another store, the freight is scanned as it leaves the store ("returns or transfer scan") 310. After the freight is scanned at each scan point, the desktop application is used to upload, process the scan data and then transmit it to the web database. A web reporting application is then used to provide online data reporting allowing users to make inquiries about the freight data stored in the web database.

Data Collection in the Distribution Center Direct Model Scan Points

In the distribution center direct model, Windows Pocket PC-based handheld scanners are used to collect data at the following points in the supply chain: (i) consolidation, (ii) grid, (iii) truck loading, (iv) delivery, and (v) vendor pickup.

Figure 4:
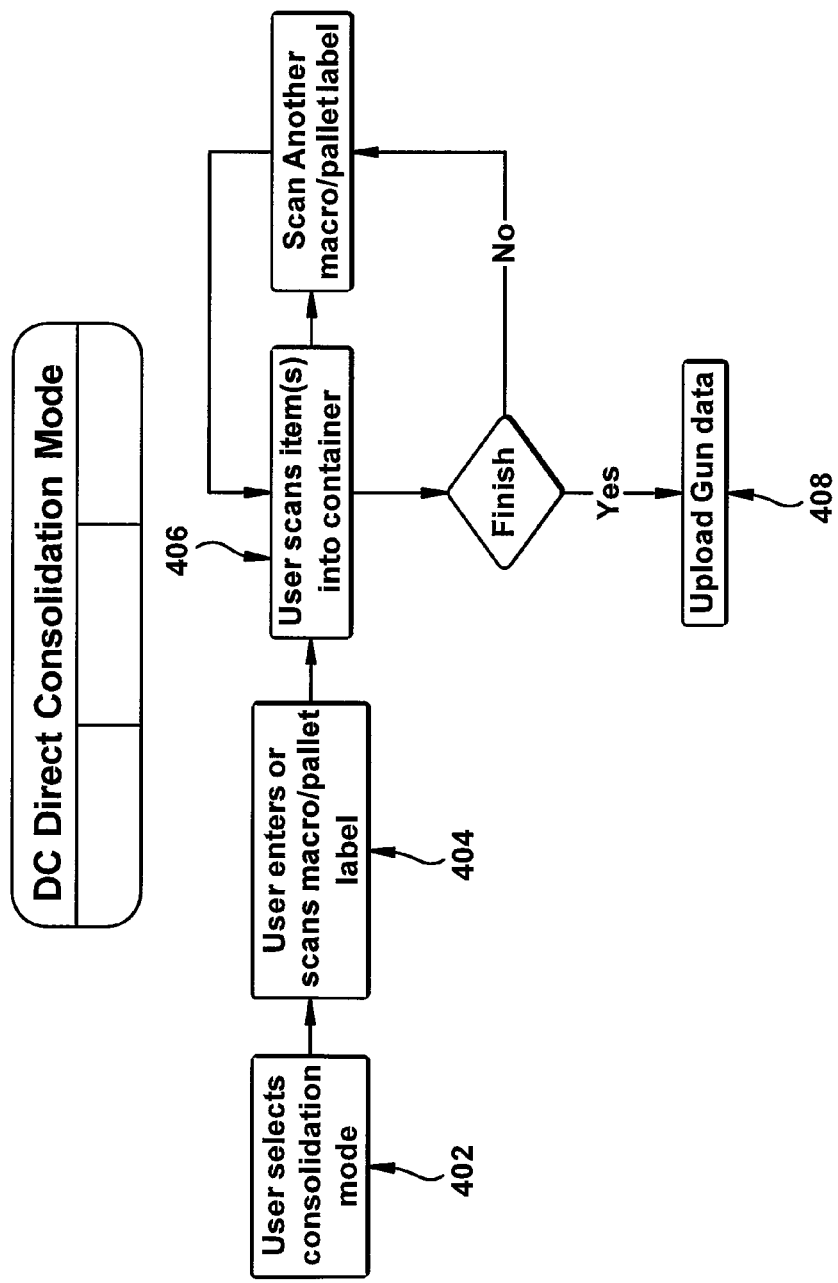
FIG. 4 is a diagram illustrating the Distribution Center Direct Consolidation Mode of the freight tracking and controlling system according to the present invention.

Consolidation mode scanning 400, as shown in FIG. 4, is used to track smaller items as they are placed into larger shipping units such as a pallet, carton, tote or macro container. In the consolidation scanning mode, the user selects the Consolidation mode on the scanner 402, scans or manually enters a macro or pallet barcode 404, scans individual items into the macro or pallet 403, and uploads the scan data to the Desktop application 408.

Figure 5:
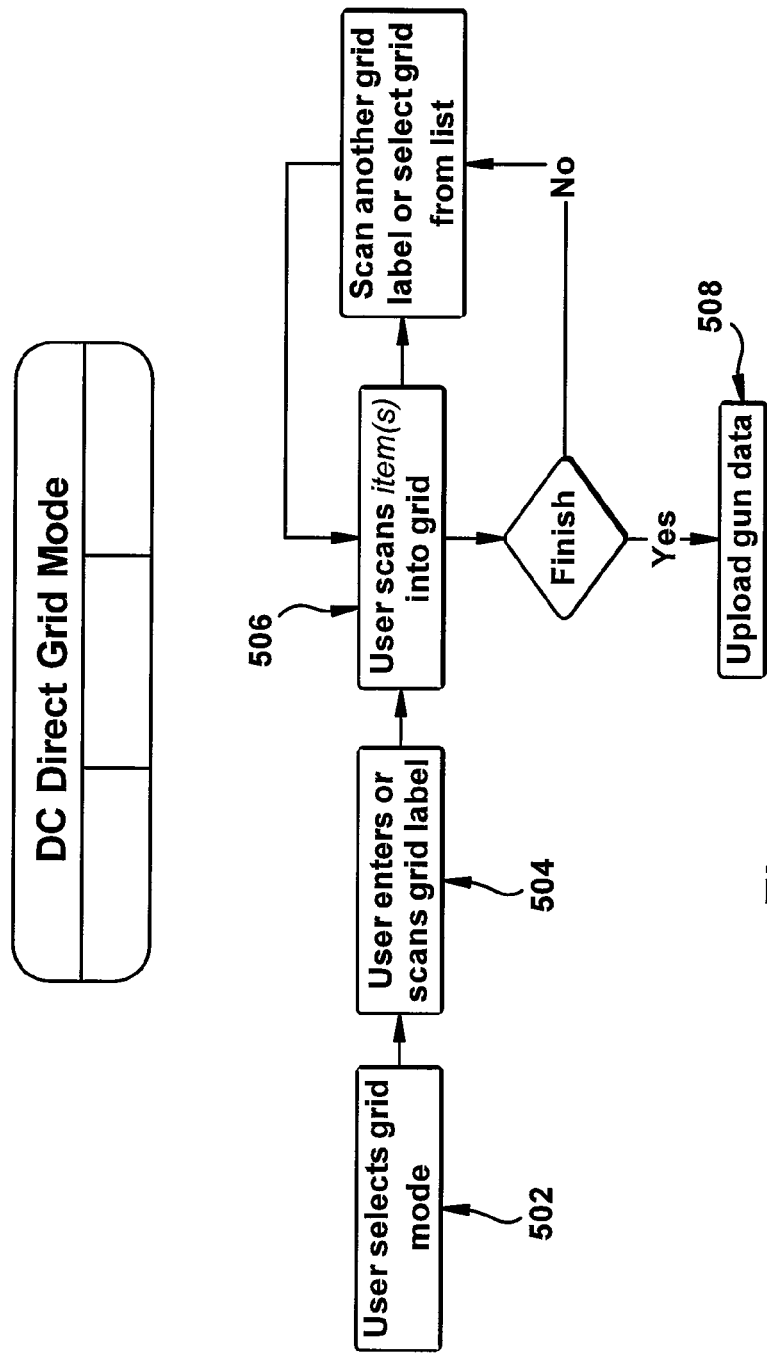
FIG. 5 is a diagram illustrating the Distribution Center Direct Grid Mode according to the present invention.

Grid mode scanning 500, as shown in FIG. 5, is used when staging freight in outbound shipping grids. These grids are used to aggregate items such as pallets, macros, and large unconsolidated items bound for a single delivery site. A user first selects Grid Mode Scanning 502, scans a barcode placed in a conspicuous area within each grid 504, and then scans items from the consolidation mode (described above) or large non-consolidated items into the grid 506. When finished scanning items into the grid, the user uploads the scan data to the desktop application 508.

Figure 6:
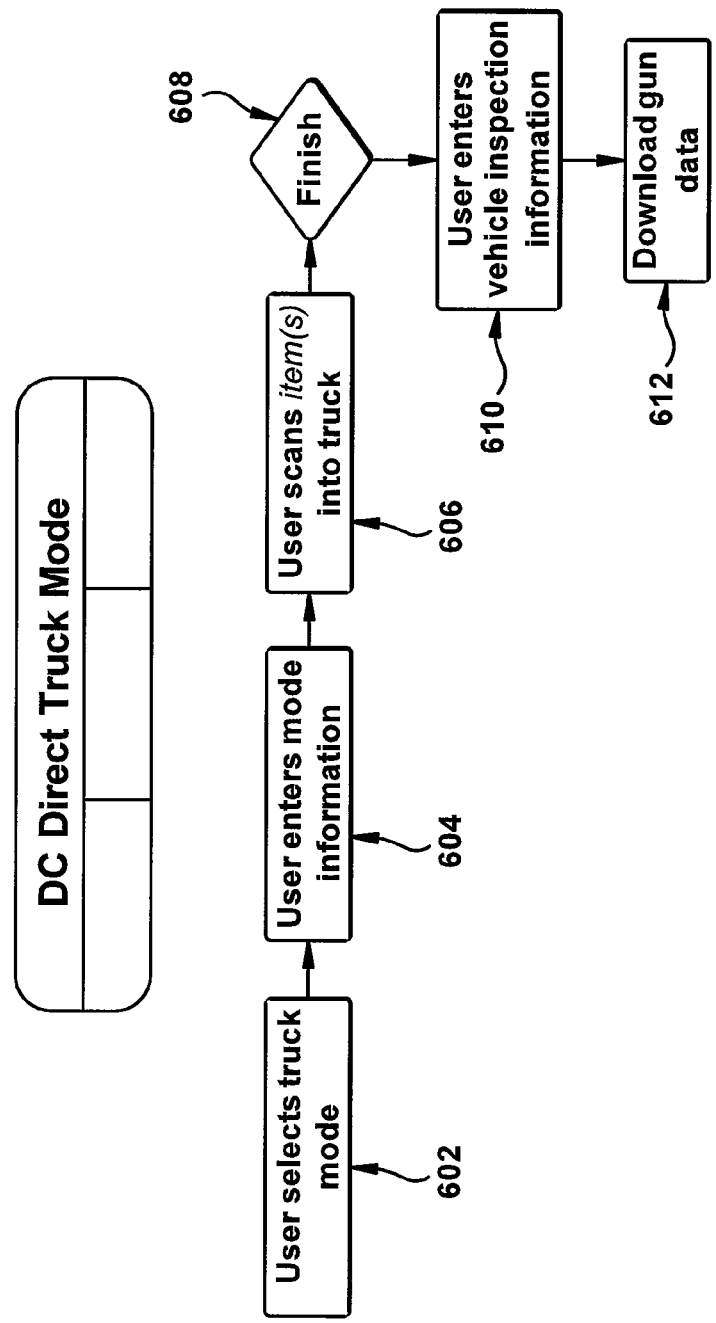
FIG. 6 is a diagram illustrating the Distribution Center Direct Truck Mode according to the present invention.

Truck mode scanning 600, as shown in FIG. 6, is used to scan items placed into a shipping grid onto a delivery truck. The truck mode can also be used to scan PRO number barcode labels when making a pickup at a vendor site. A user first selects the Truck mode scanning 602 and enters mode information 604. This scanning mode then allows drivers to scan items from the Grid mode (described above) onto the truck 606. When the user is finished scanning 608, the user is prompted to enter vehicle inspection information 610. Finally, the scan data is uploaded from the scan gun 612 to the desktop application 104.

Figure 7:
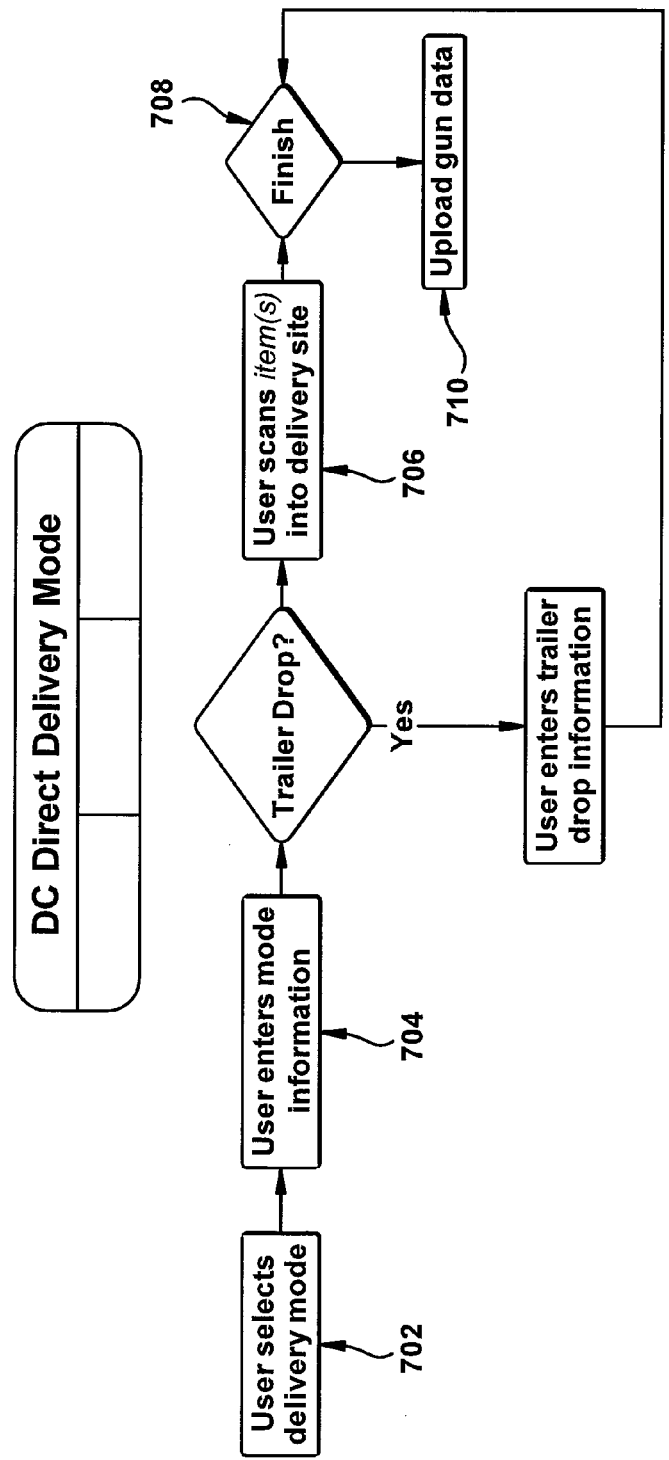
FIG. 7 is a diagram illustrating the Distribution Center Direct Delivery Mode according to the present invention.

The Delivery mode scanning 700, as shown in FIG. 7, is used by the delivery driver when unloading freight from the truck at a delivery site. It is also used by a driver when unloading vendor pickup items at the distribution center. A user first selects the Delivery mode 702 then enters the mode information 704. This scanning mode then allows drivers to scan the items from the Truck mode (described above) into the delivery point 706. Once a user is finished scanning 708, the scanned data is then uploaded from the scan gun 710.

Using the Distribution Center Direct Scan Application

Figure 8:
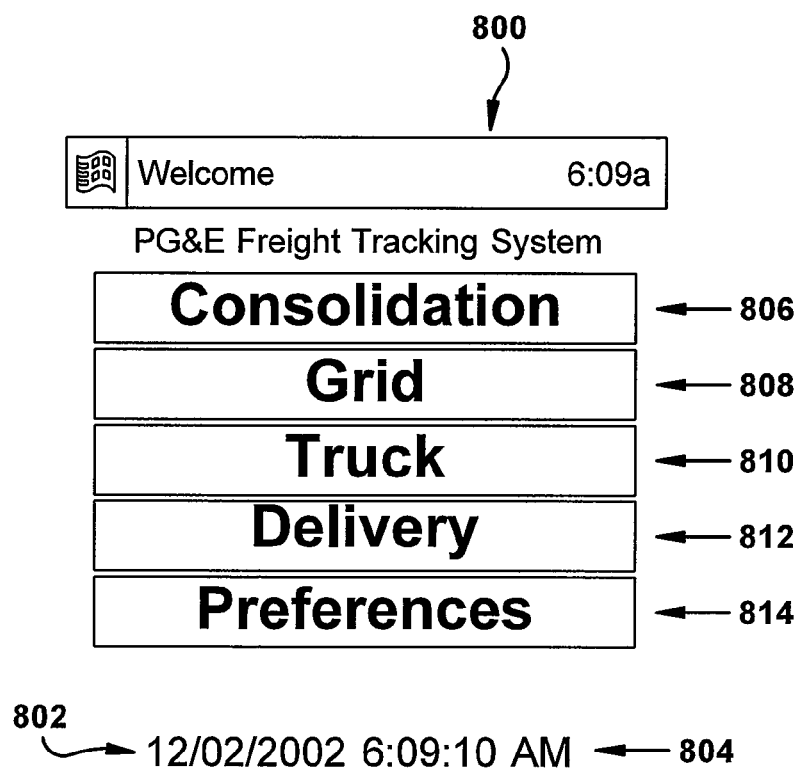
FIG. 8 is a diagram illustrating the Welcome Screen for the Distribution Center Direct Scanning Application according to the present invention.

After selecting the scanner application from the application menu on the Windows Pocket PC scanner, the user is brought to the Welcome Screen 800, as shown in FIG. 8. The Welcome Screen 800 displays the date 802 and time 804. A user can then choose which scan mode 102 to use, such as Consolidation 806, Grid 808, Truck 810, or Delivery 812. User Preferences 814 can also be set in the scanner.

Figure 9:
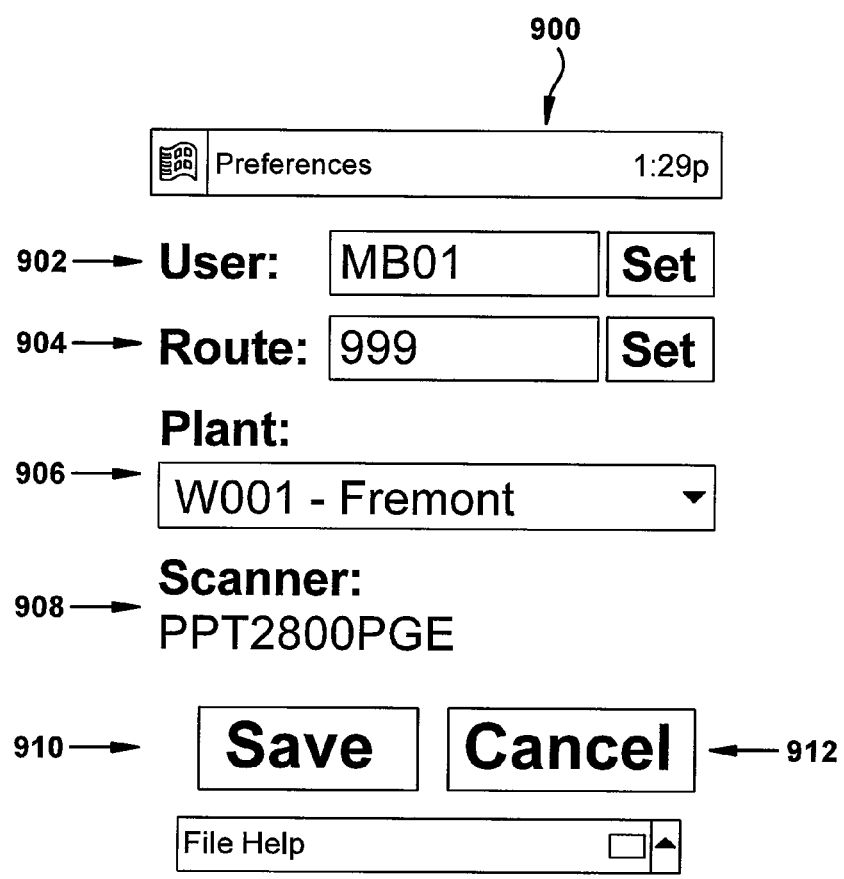
FIG. 9 is a diagram illustrating the Preferences Screen for the Distribution Center Direct Scanning Application according to the present invention.

By clicking on the Preferences button 814, the Preference Screen 900 is displayed, as shown in FIG. 9. The preferences screen 900 contains fields for user, route, originating location (i.e. "Plant"), and scanner ID. A user can enter a user ID 902, a route number 904, and a Plant number 906. The scanner ID number is displayed also 908. Once entered, this information can either be saved 910 or cancelled 912. If the cancel button 912 is clicked, the changes are discarded and the user is returned to the Welcome screen 800. If the Save Button 910 is tapped, the preferences set are recorded and the user is brought back to the Welcome Screen 800.

As discussed above and as shown in FIG. 2, the system allows users to scan items at five different scan point/modes, such as Consolidation Mode Scanning 204, Grid Mode Scanning 208, Load Truck Mode Scanning 210, Delivery Mode Scanning 212, and Vendor Pick-up Mode Scanning 214.

Figure 10:
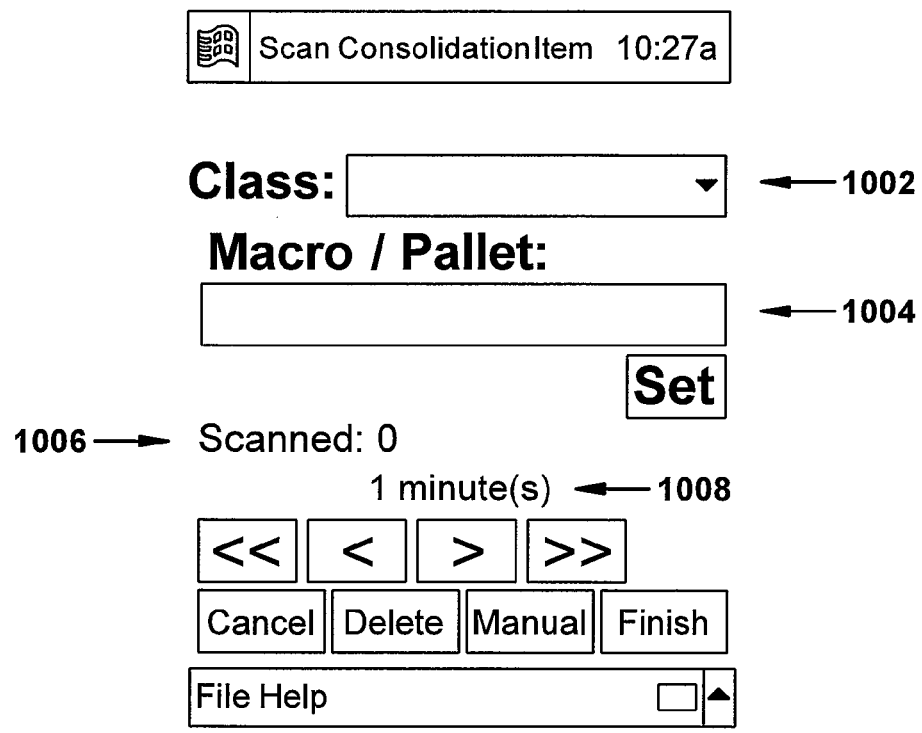
FIG. 10 is a diagram illustrating the Scan Consolidation Items Screen of the scanner application according to the present invention.
Figure 11:
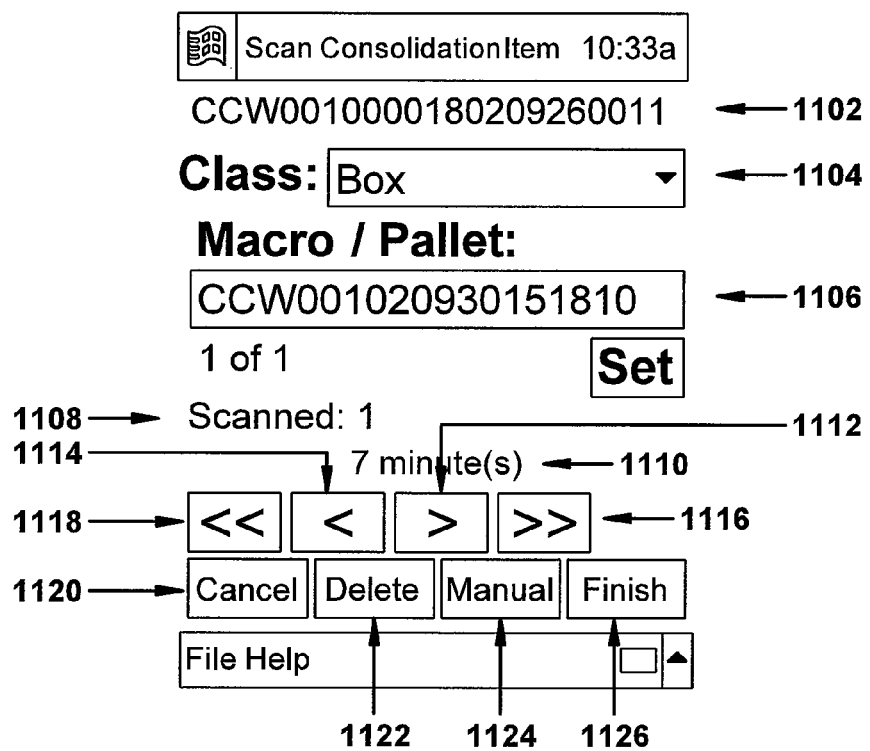
FIG. 11 is a diagram illustrating a data filled Scan Consolidation Items Screen of the scanner application according to the present invention.

Once the user selects the Consolidation mode on the scanner 806, the user is brought to the Scan Consolidation Items screen as shown in FIG. 10. The fields are carton class 1002, and macro/pallet number 1004. The screen also has a counter which maintains the number of items scanned into a macro or pallet 1006 and a timer indicating the elapsed time spent scanning items into a macro/pallet 1008. FIG. 11 shows these fields filled in after an item has been scanned in consolidation mode. The barcode number for the item scanned into the macro or pallet is displayed at the top of the screen 1102. The item classification indicates the type of item placed into the macro or pallet 1104. The macro/pallet number is displayed 1106. The number of items scanned into the macro/pallet is displayed 1108 as is the elapsed time of the scanning session 1110.

Additionally, the scanner application contains forward 1112, backward 1114, first 1116, and last 1118 arrow buttons that will navigate the user through the scanned items. If the Cancel button 1120 is clicked, the information is reset on this screen. If the Delete button 1122 is clicked, the current scanned item will be deleted. If the Manual button 1124 is clicked, the user navigates to the Manual entry screen. If the Finish button 1126 is clicked, the scanning operation is complete and the user is returned to the Welcome screen 800.

Figure 12:
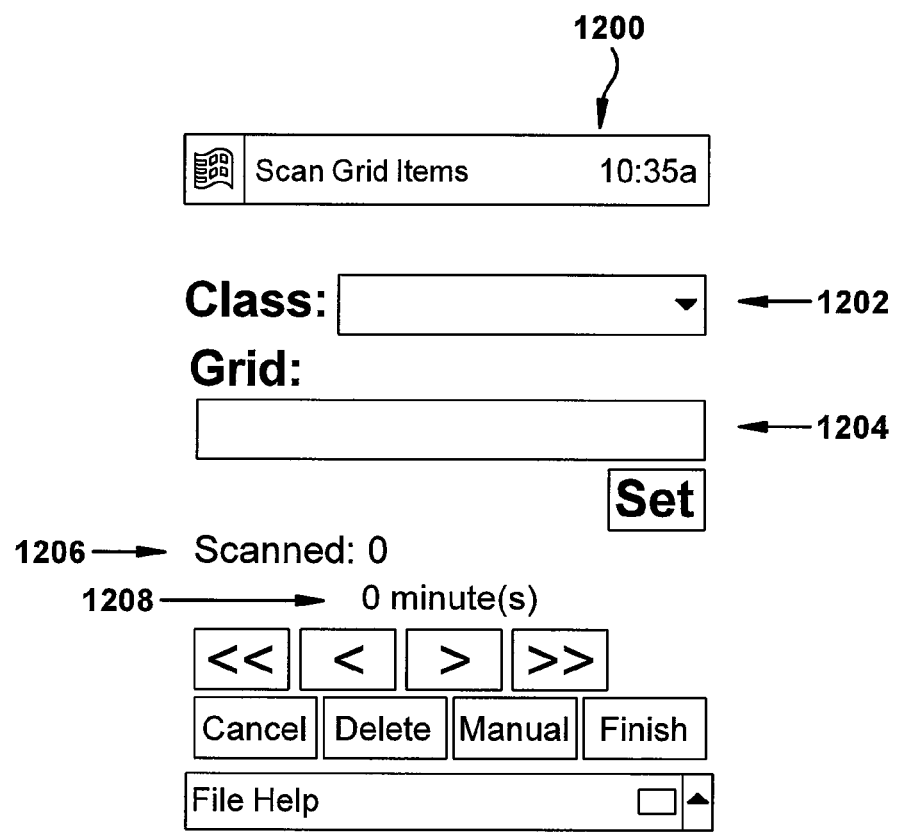
FIG. 12 is a diagram illustrating the Scan Grid Items Screen of the scanner application according to the present invention.
Figure 13:
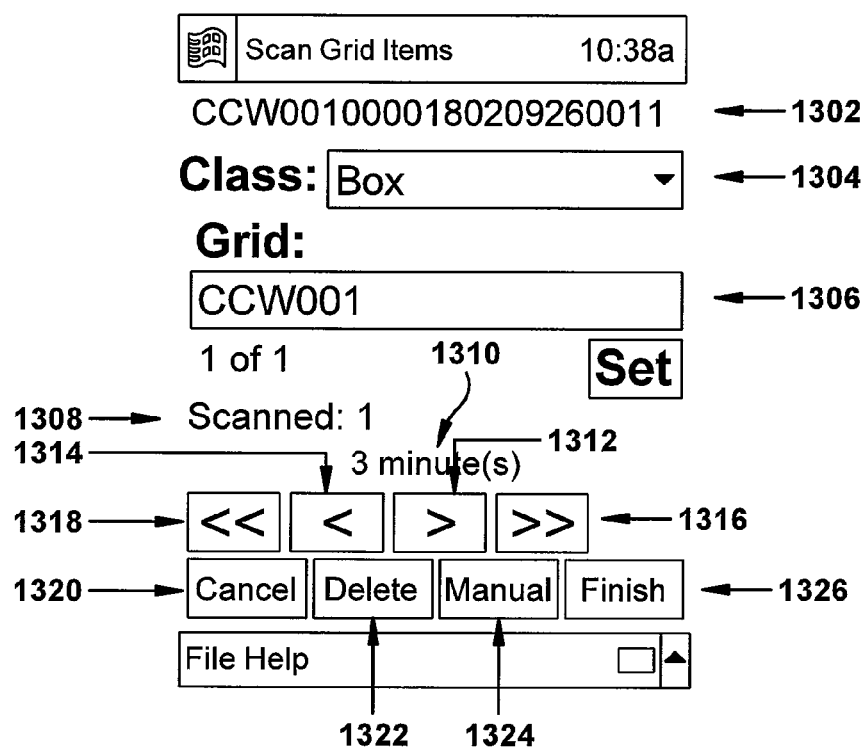
FIG. 13 is a diagram illustrating a data filled Scan Grid Items Screen of the scanner application according to the present invention.

Once a user selects the Grid mode 808 on the Welcome Screen 800 of the scan application, the user is taken to the Scan Grid Items screen as shown in FIG. 12. The Scan Grid Items screen 1200 contains fields for item classification 1202, the grid number 1204, and displays the number of items scanned into a grid in a specific scanning session 1206 and the elapsed time for the scanning session 1208. FIG. 13 depicts this same screen with the data fields filled in. After scanning the grid label and an item into the grid, the barcode number of the scanned item is displayed at the top of the screen 1302, the item classification is filled out 1304, the grid number is displayed 1306, the number of items scanned 1308 and the elapsed time 1310 are shown.

Additionally, the grid scan mode contains forward 1312, backward 1314, first 1316, and last 1318 arrow buttons that will navigate the user through the scanned items. If the Cancel button 1320 is clicked, the information is reset on this screen. If the Delete button 1322 is clicked, the current scanned item will be deleted. If the Manual button 1324 is clicked, the user navigates to the Manual entry screen. If the Finish button 1326 is clicked, the scanning operation is complete and the user is returned to the Welcome screen 800.

Figure 14:
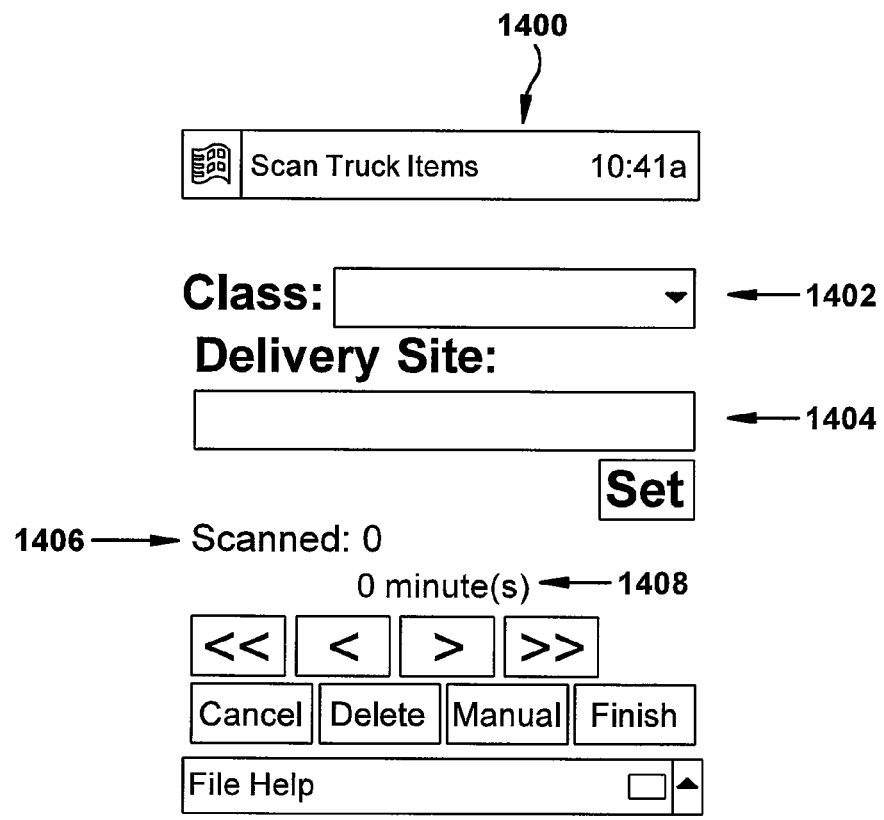
FIG. 14 is a diagram illustrating the Scan Truck Items Screen of the scanner application according to the present invention.

Once the user selects the Truck mode 810 on the Welcome Screen 800, they are taken to the Scan Truck Items screen as shown in FIG. 14. The Scan Truck Items screen 1400 contains fields for item classification 1402, the delivery site 1404, the number of items scanned 1406 and the elapsed time for the scanning session 1408 After the delivery site field is entered 1404, the user proceeds to scanning freight onto the truck.

Figure 15:
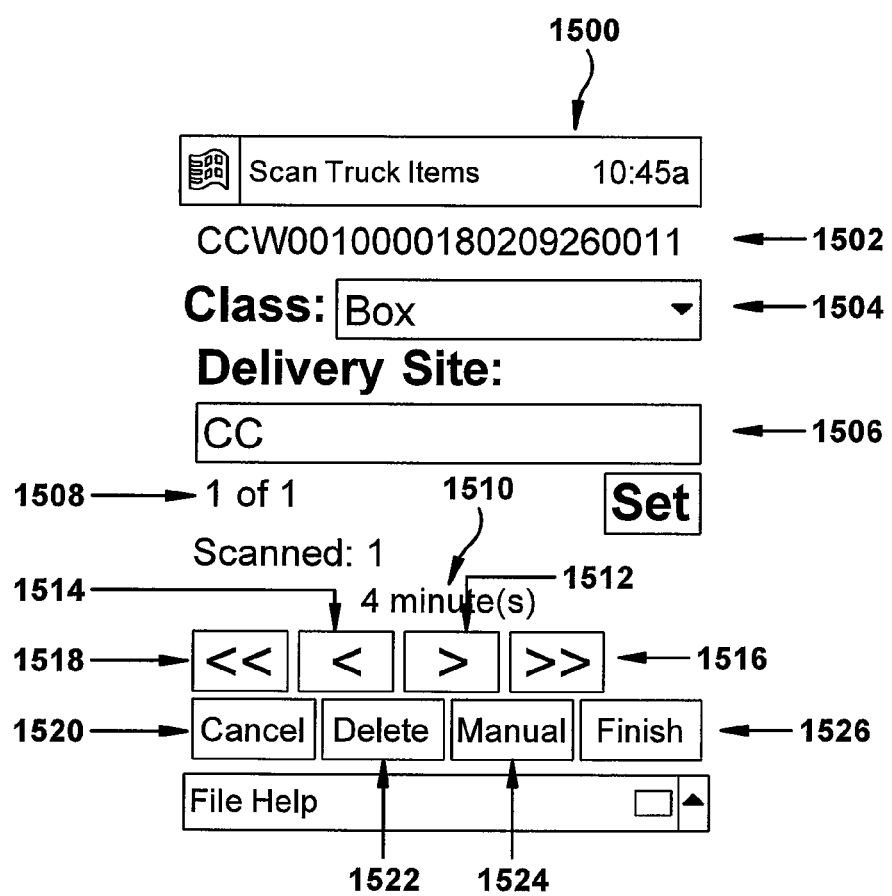
FIG. 15 is a diagram illustrating a data filled Scan Truck Items Screen of the scanner application according to the present invention.
Figure 16:
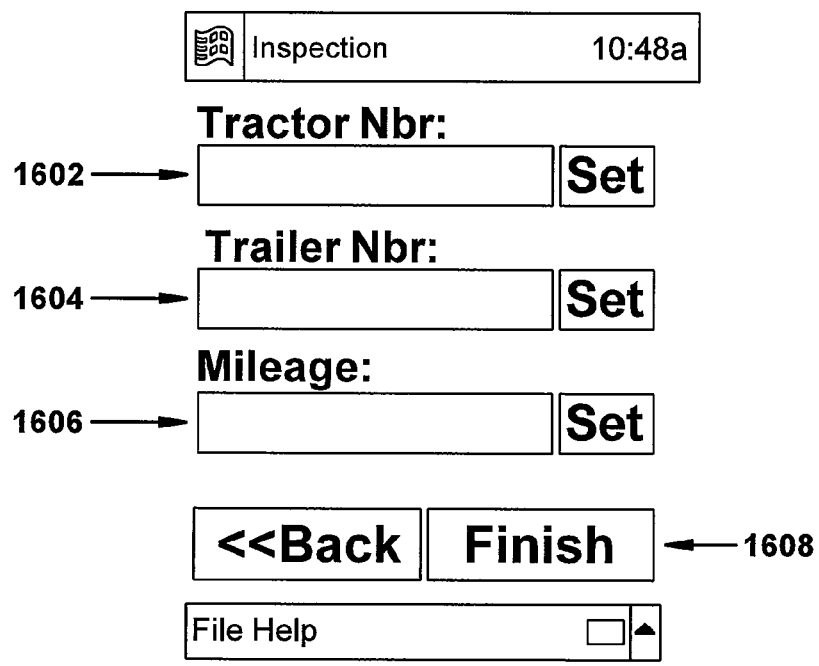
FIG. 16 is a diagram illustrating the Truck Inspection Screen from the Scan Truck Items mode of the scanner application according to the present invention.

FIG. 15 shows the Scan Truck Items screen with data. The barcode number of the scanned item is displayed at the top of the screen 1502, the item classification is filled out 1504, the delivery site number is displayed 1506, the number of items scanned 1508 and the elapsed time 1510 are shown. Additionally, the interface contains forward 1512, backward 1514, first 1516, and last 1518 arrow buttons that will navigate the user through the scanned items. If the Cancel button 1520 is clicked, the information is reset on this screen. If the Delete button 1522 is clicked, the current scanned item will be deleted. If the Manual button 1524 is clicked, the user navigates to the Manual entry screen. If the Next button 1526 is clicked, the user is brought to the Inspection screen as shown in FIG. 16. The inspection screen requires the user to insert the tractor number 1602, the trailer number 1604 and the mileage 1606. Once these fields are filled in the user selects the Finish button 1608 and is returned to the Welcome screen 800. The Back button, if selected, takes the user back to the Scan Truck Items Screen 1500.

Figure 17:
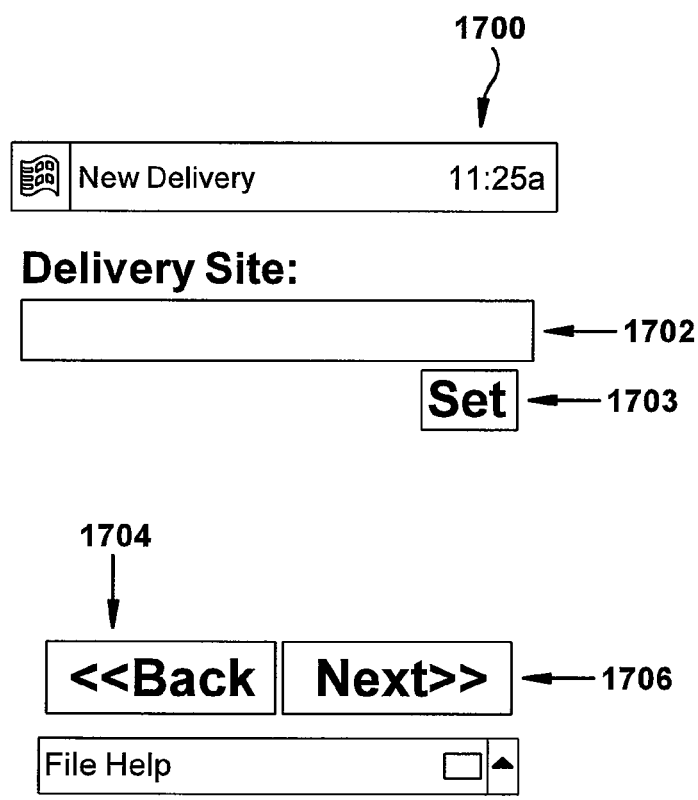
FIG. 17 is a diagram illustrating the New Delivery Screen of the scanner application according to the present invention.
Figure 18:
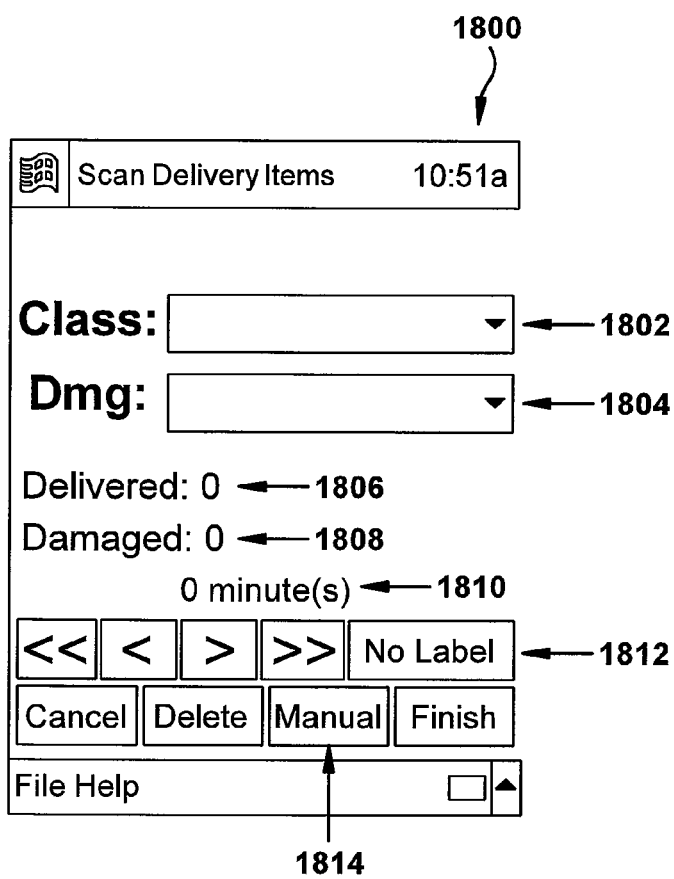
FIG. 18 is a diagram illustrating the Scan Delivery Items screen of the scanner application according to the present invention.
Figure 19:
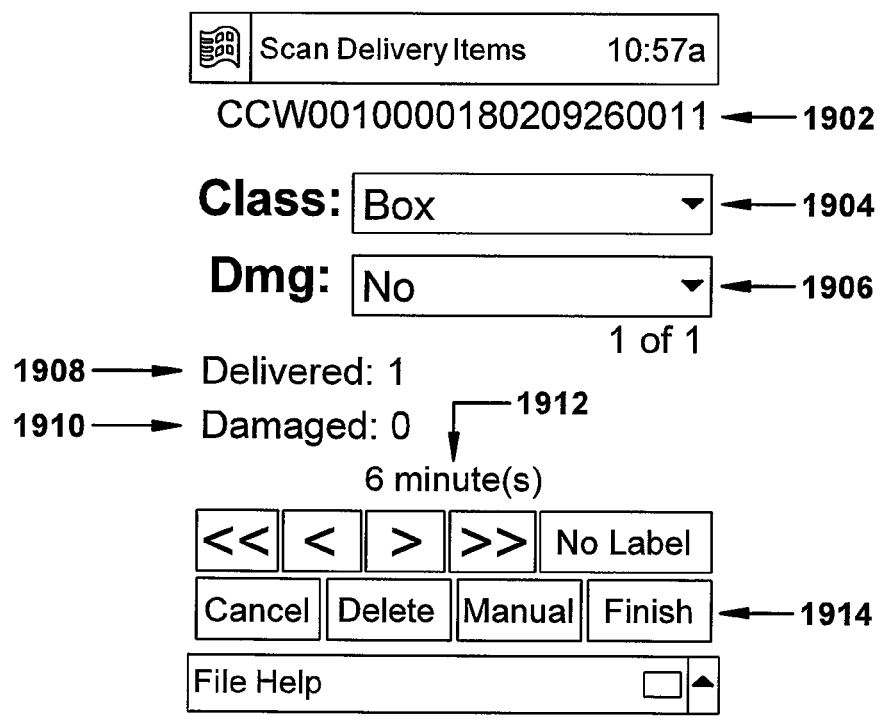
FIG. 19 is a diagram illustrating a data filled Scan Delivery Items screen of the scanner application according to the present invention.

Once the user selects the Delivery mode 812 from the Welcome Screen 800, the user is brought to the New Delivery screen 1700 to enter the delivery site code 1702 shown in FIG. 17. This code is entered by scanning a barcode label at the delivery site which then fills the Delivery Site field or the driver can tap the Set button 1703 and type in the delivery site code. After setting the delivery site, the user taps the Next button 1706 (or taps the Back button 1704 to return to the Welcome Screen). Tapping the Next button 1706 takes the user to the Scan Delivery Items screen 1800 as shown in FIG. 18. Here the user begins scanning the barcodes of the items to be delivered. After scanning each item, the user selects the item class 1802 and whether the item is damaged 1804. The Delivered Counter 1806 keeps track of the total number of items scanned and the Damaged Counter 1808 the total number of scanned items to which the user has assigned a damage designation. An elapsed time clock 1810 runs keeping track of the time from the entry into the Scan Delivery Items screen. If an item to be delivered does not have a barcode label on it, the user can tap the No Label button 1812 which assigns a carton number to the item. The user can tap the Cancel button to escape from the Delivery Scan mode. If the user taps the Delete button, the user removes the last scanned item from the scanner's memory. The Manual button 1814 is used if the barcode label is unreadable by the scanner. Tapping this button brings the user to a numerical keyboard to tap in the barcode number. FIG. 19 shows the Scan Delivery Items Screen with data entered. The barcode number is displayed 1902, the item class 1904, the damage designation 1906, the delivered counter 1908, damage counter 1910, and elapsed time 1912. When the delivery is completed, the user taps the Finish button 1914 and is brought back to the Welcome Screen 800.

Users can also scan items that are picked up at vendor sites and brought back to the Distribution Center. At a vendor pickup site, the user selects the Truck Mode 810 from the Welcome Screen 800. The user then enters the class 1402 and delivery site 1404, which in the case of vendor pickup is a distribution center code, and then scans the vendor pick up/PRO# label. Upon arrival at the distribution center, the driver selects delivery mode 812 from the Welcome Screen 800, enters the distribution center code 1702 and scans the freight.

Data Collection in the Pool Distribution Model Scan Points

In the pool distribution model, handheld scanners are used to collect data at various points in the supply chain including (i) inbound, (ii) outbound scan/integrity check, (iii) delivery, and (iv) pickup.

Figure 20:
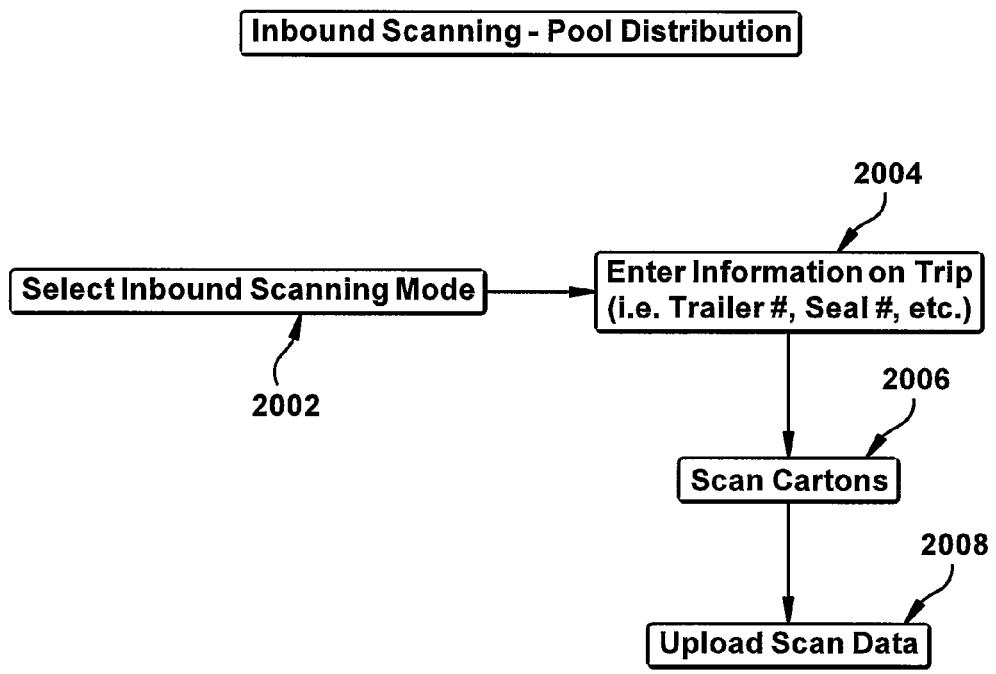
FIG. 20 is a diagram showing the inbound scan process in the Pool Distribution model according to the present invention.

The inbound scanning process is shown in FIG. 20. Inbound scanning occurs upon the arrival of a truck from a shipper's distribution center at a pool distribution site. Here the pool distributor selects inbound scanning mode on the scanner 2002, enters information on the inbound load such as the trailer number, seal number, etc. 2004, scans the freight off of the tractor trailer 2006, and, when finished scanning all of the cartons on the trailer, uploads the data captured by the scanner to the desktop application 2008.

Figure 21:
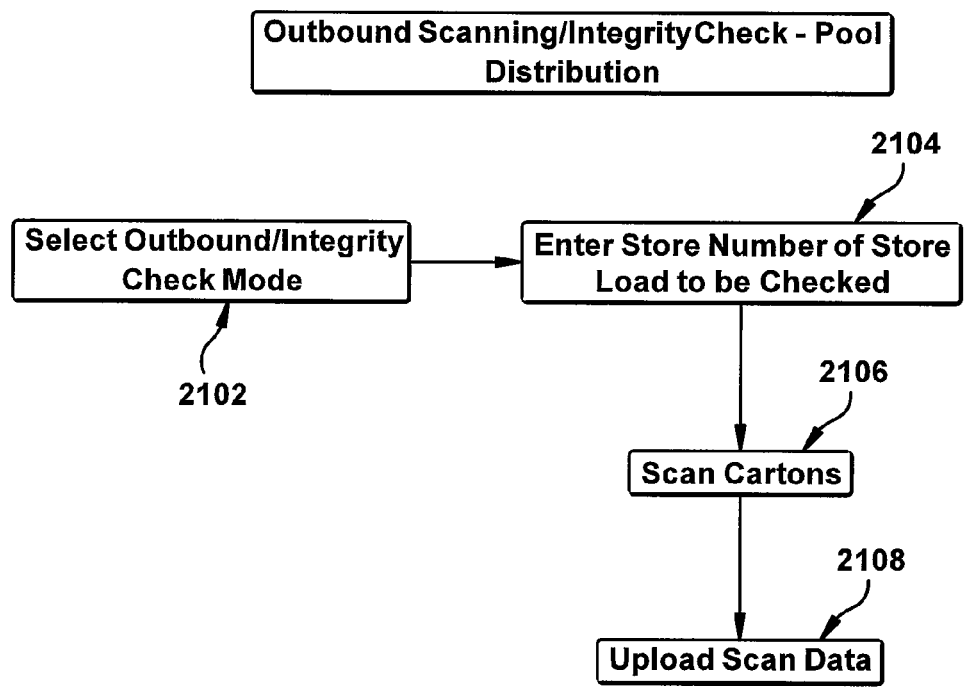
FIG. 21 is a diagram showing the outbound scan/integrity check scan process in the Pool Distribution model according to the present invention.

The outbound scan/integrity check process is shown in FIG. 21. Outbound scanning/integrity check scanning occurs after the initial receipt of the shipper's freight and the inbound scan. Once the freight that has been received is sorted and segregated by store order, the outbound scan/integrity check mode 2102 is selected, the store number of the order to be checked is entered into the scanner 2104, and the cartons scanned 2106. If in the process of scanning, a carton has been mis-sorted, the scanner will emit an audible tone and the scanner will turn off. This alerts the user to an incorrect sortation. This scan also helps the pool distributor to catch any cartons that were not scanned inbound. After completing this scan, the data in the scanner is uploaded into the desktop application 2108.

Figure 22:
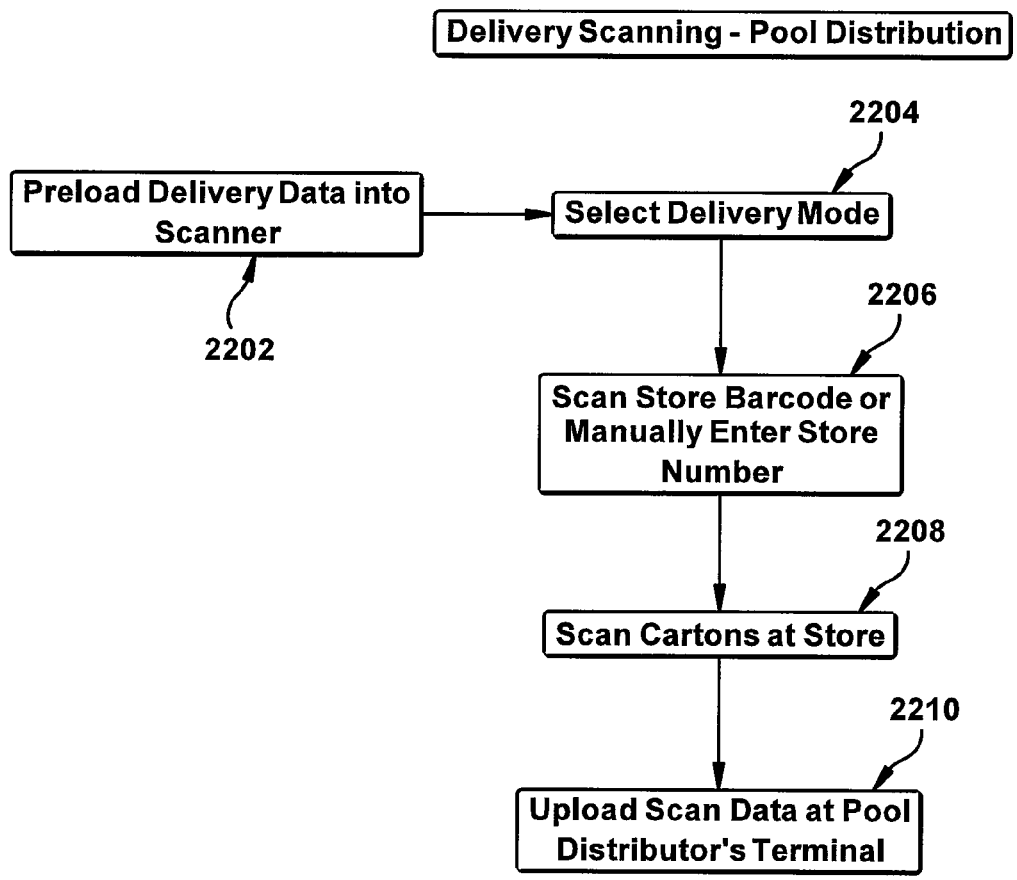
FIG. 22 is a diagram showing the delivery scan process in the Pool Distribution model according to the present invention.

FIG. 22 shows the delivery scanning process. Delivery scanning is performed by the driver at the store when making a delivery. Delivery scanning can be performed in either batch or preload mode. In batch mode, the scanner simply collects the data from each barcode scanned. In preload mode, the barcode numbers of cartons expected to be delivered to a particular store are loaded into the scanner 2202. When scanning a carton barcode at delivery, the scanner application compares the barcode scanned against the list of barcode carton numbers preloaded into the scanner for that store. If the barcode scanned matches the barcode preloaded, the scanner records a match. If the barcode scanned is not included in the preloaded list of cartons, the scanner records an overage. If at the end of scanning, all of the preloaded cartons are not scanned, the preloaded scanner application reports those cartons as shortages.

Whether the driver delivery scans in batch or preloaded mode, the scanning process is the same. After arriving at the store, the driver selects delivery mode on the scanner 2204, and either scans a store barcode or manually enters the store number 2206 which records the time of arrival for on-time delivery performance reporting, and then begins to scan the cartons 2208. If the driver needs to return to the truck to gather more cartons for the delivery, the driver checks out by scanning the store barcode and upon return scans the store barcode again to check in. This provides the pool distributor with a snapshot of the delivery process. At the conclusion of scanning all of the cartons, the driver enters the name of the store receiving personnel which ends the delivery scanning session. Upon return to the pool distributor's terminal, the scanner data is uploaded 2210 into the desktop application.

Using the Pool Distribution Scanner Application

Figure 23:
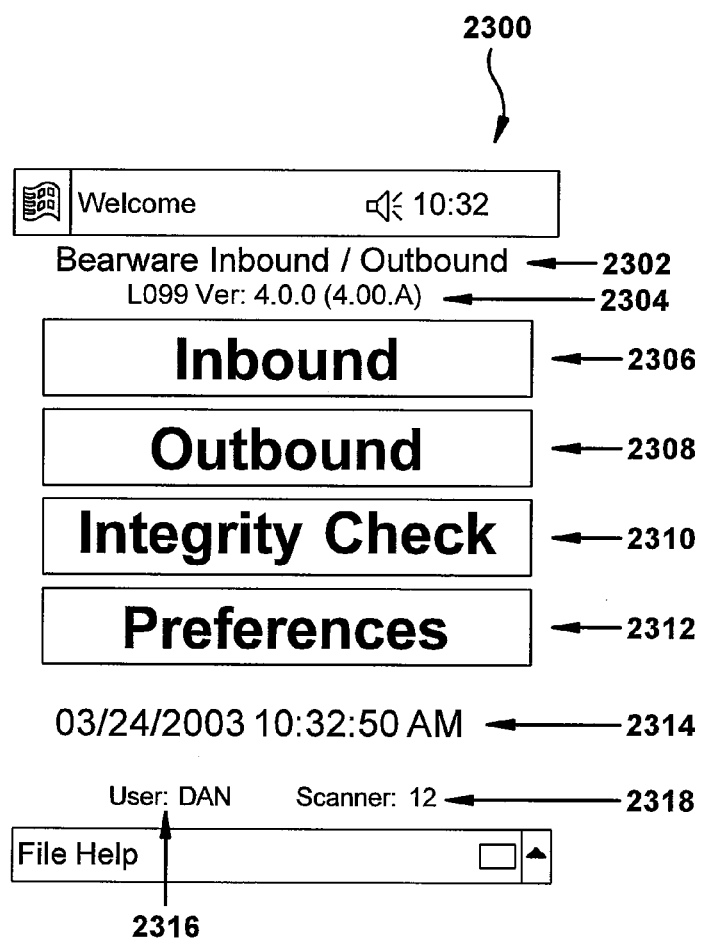
FIG. 23 is a Welcome Screen of the Pool Distribution inbound/outbound scanning application according to the present invention.

After turning on the scanning device, the user must select the scanning program by tapping the BWICE icon on the screen. The user is then brought to the BearWare Inbound/Outbound Welcome Screen 2300 as shown in FIG. 23. This screen displays the name of the program 2302, the version number of the scanning software 2304, buttons for the three scanning modes: inbound 2306, outbound 2308, and integrity check 2310, a preferences button 2312, the date and time 2314, the user name 2316, and the scanner number 2318.

Figure 24:
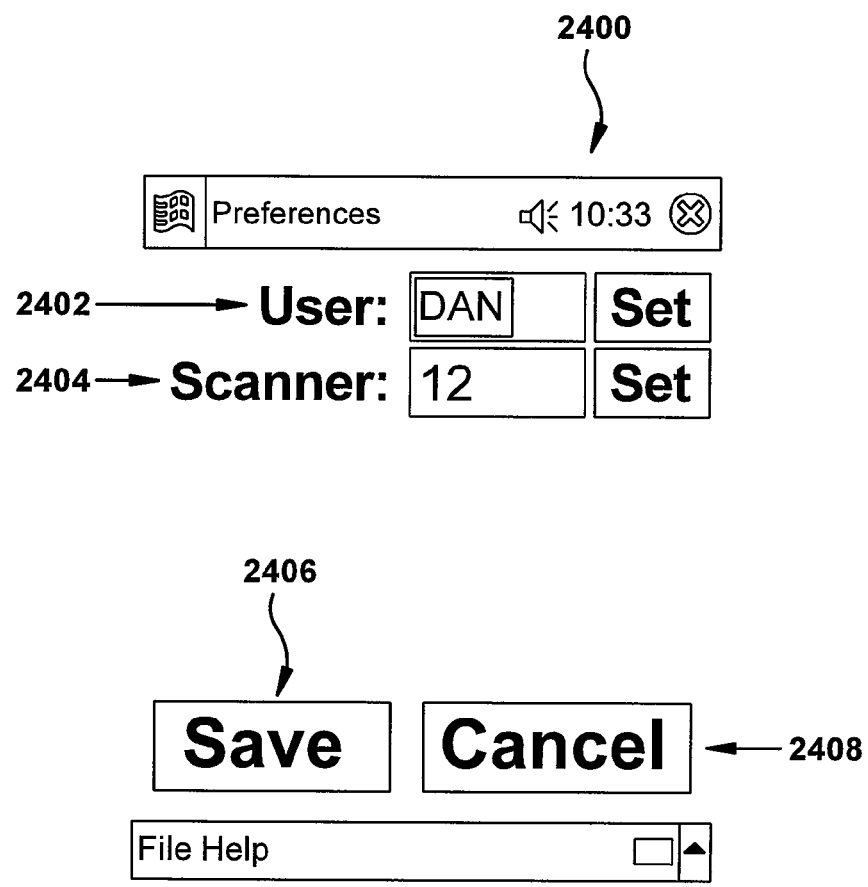
FIG. 24 is a Preferences Screen of the Pool Distribution inbound/outbound scanning application according to the present invention.

By tapping the Preferences button 2312, the user is brought to the Preferences screen 2400 shown in FIG. 24. Preferences are set prior to initiating each scanning session. Here the user's initials 2402 and the scanner identification number 2404 can be entered. Once this information is entered, the user selects the Save button 2406 to record his entries and return to the Welcome Screen 2300. The user can select the Cancel button 2408 to reset the preferences screen.

Figure 25:
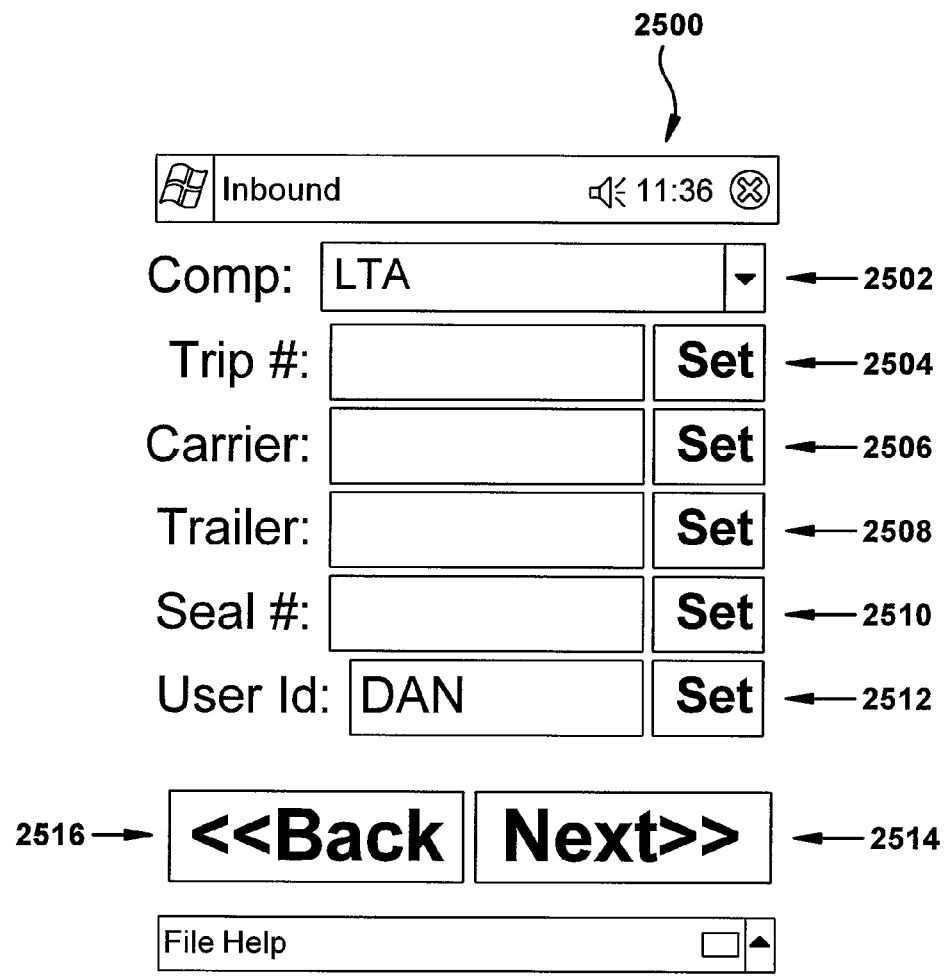
FIG. 25 is an Inbound Trip Information Screen of the Pool Distribution inbound/outbound scanning application according to the present invention.

Inbound scanning of freight is initiated by tapping the Inbound button 2306 on the Welcome Screen 2300. This brings the user to the Inbound Trip Information Screen 2500 as shown in FIG. 25. The user enters the shipper's company code 2502, trip number 2504, carrier 2506, trailer number 2508, seal number 2510, and scanner user initials (if not already set in Preferences) 2512. After entering this information the user taps the Next button 2514 to start scanning. If the user wants to return to the Welcome screen 2300, they can tap the Back button 2516.

Figure 26:
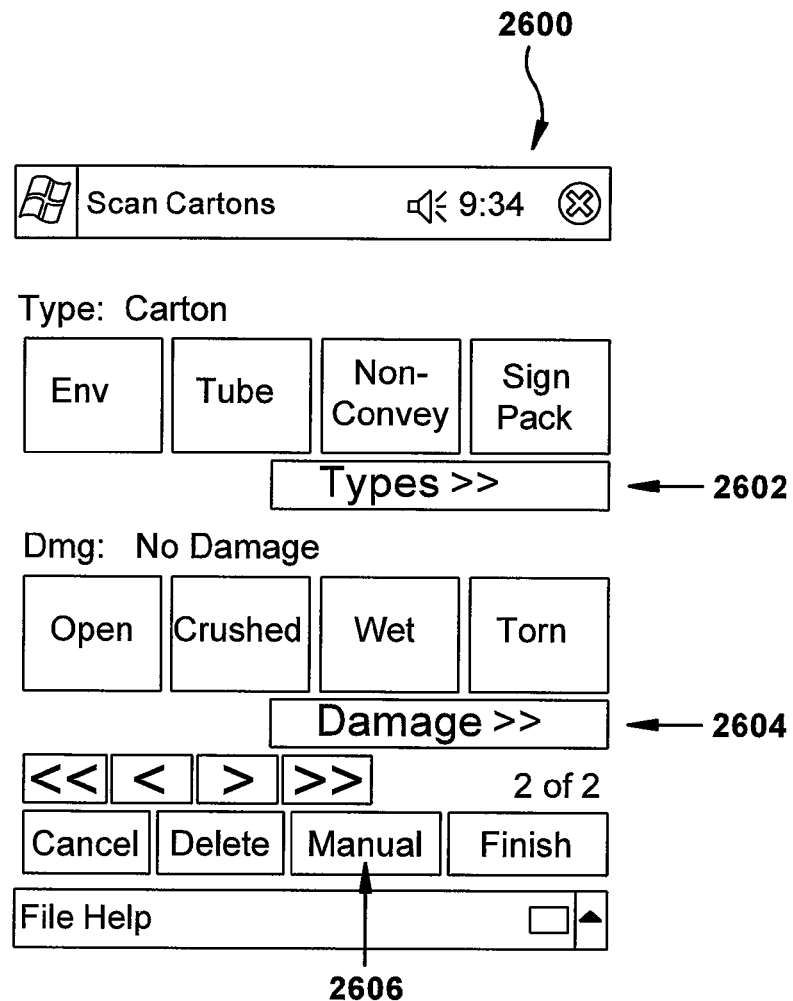
FIG. 26 is a Scan Cartons Screen of the Pool Distribution inbound/outbound scanning application according to the present invention.
Figure 27:
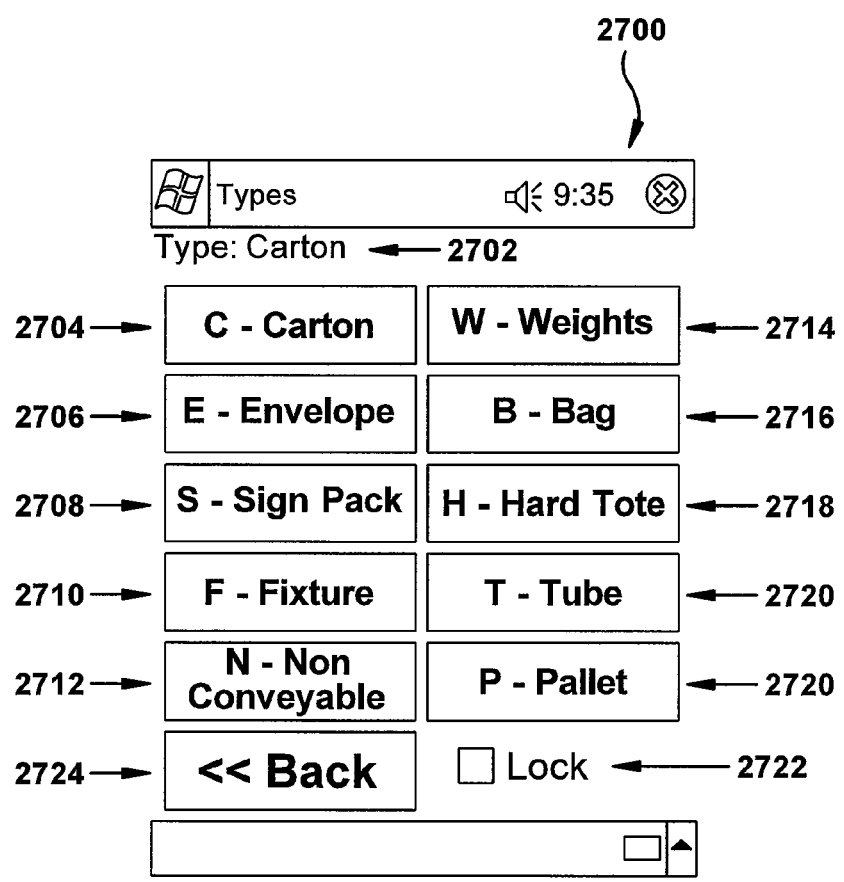
FIG. 27 is a Carton Types Screen of the Pool Distribution inbound/outbound scanning application according to the present invention.
Figure 28:
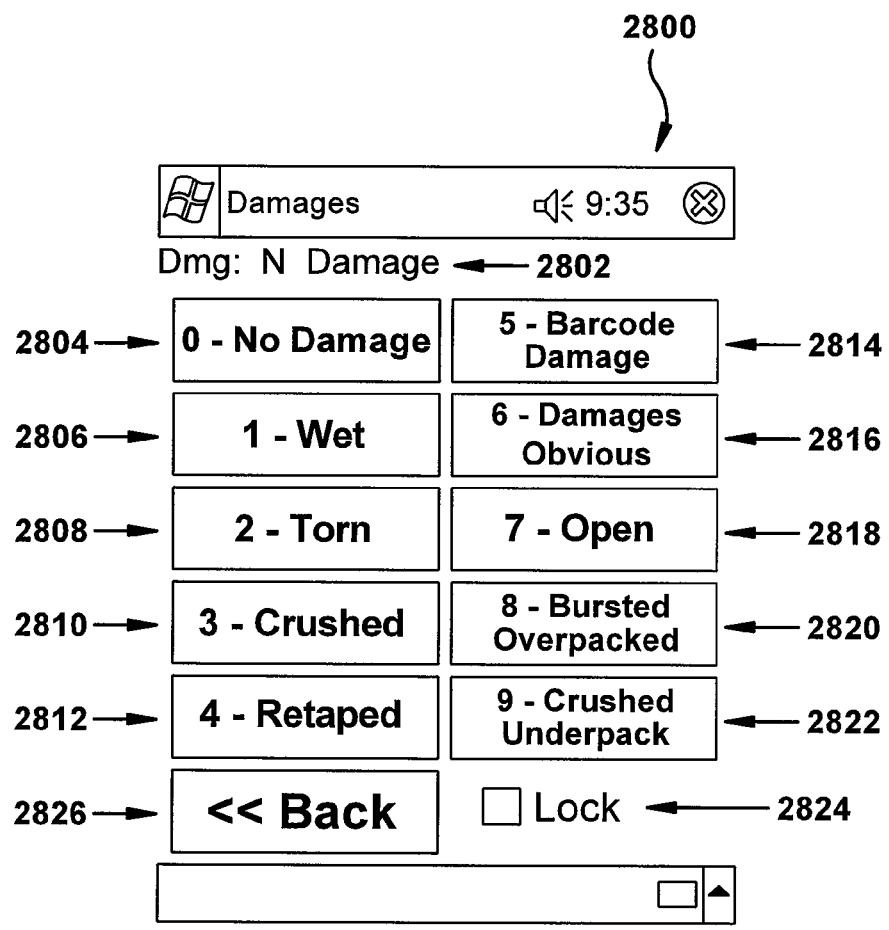
FIG. 28 is a Damages Type Screen of the Pool Distribution inbound/outbound scanning application according to the present invention.

While scanning freight, the Scan Cartons screen 2600 is displayed as shown in FIG. 26. This screen gives the user the ability to select the type of freight being scanned and assign damage codes to it if necessary. If the user taps the Types button 2602 on the Scan Carton screen, they are brought to the Types screen 2700 shown in FIG. 27. At the Types screen 2700, the user can view the type previous selected 2702. The user can select which type of item is being scanned: carton 2704, envelope 2706, sign pack 2708, fixture 2710, non-conveyable 2712, weights 2714, bag 2716, hard tote 2718, tube 2720, or pallet 2722. If the lock check box 2722 is selected, the presently selected item type will be assigned to all subsequently scanned items. By tapping the Back button 2724, the user is brought back to the Scan Cartons screen. If the Damages button 2604 is selected on the Scan Cartons screen 2600, the user is brought to the Damages screen 2800 shown in FIG. 28. At the Damages screen, the user can view the damage type previously selected 2802. The user can also select a type of damage: no damage 2804, wet 2806, torn 2808, crushed 2810, retaped 2812, barcode damage 2814, damages obvious 2816, open 2818, bursted overpacked 2820, crushed underpacked 2822. If the Lock box 2824 is selected after a damage type is tapped, that damage type will be assigned to all subsequently scanned items. By tapping the Back button 2826, the user is brought back to the Scan Cartons screen 2600.

Figure 29:
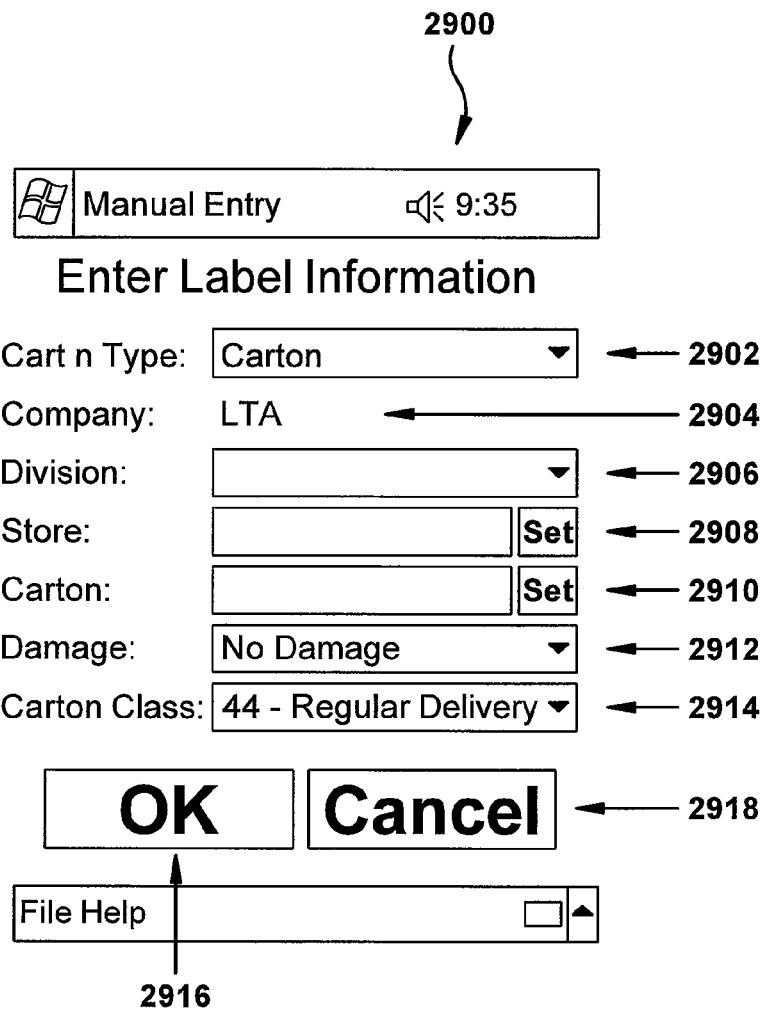
FIG. 29 is a Manual Entry Screen of the Pool Distribution inbound/outbound scanning application according to the present invention.

If a barcode label is damaged or otherwise unscannable, the user can tap the Manual button 2606 on the Scan Cartons screen 2600 to get to the Manual Entry 2900 screen as shown in FIG. 29. Once at the Manual Entry screen 2900, the user selects the Carton Type 2902, Division 2906, Store Number 2908, Carton Number 2910, Damages 2912, and Carton Class 2914. The company is already displayed 2904. After entering all of this information, the user taps the OK button 2916 to record the information and return to the Scan Cartons screen 2600 or taps the Cancel button 2918 to delete any entered information and return to the Scan Cartons screen 2600.

Figure 30:
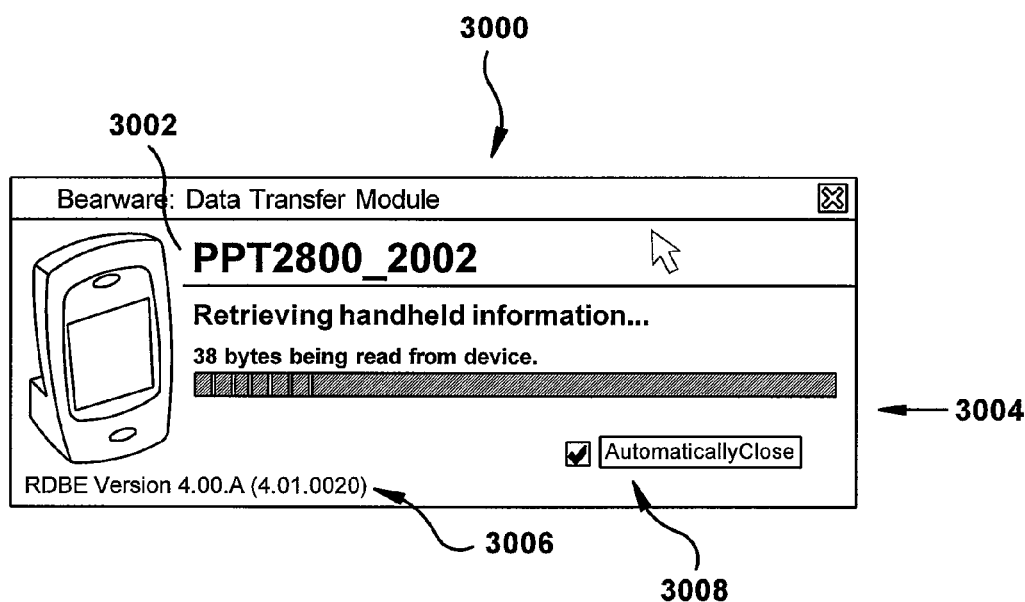
FIG. 30 is a BearWare Data Transfer Module Screen of the freight tracking and controlling system according to the present invention.

After all of the cartons have been scanned, the user places the scanner in a cradle attached to a PC or connects to the PC using a wireless connection. The BearWare Data Transfer Module screen, FIG. 30, is displayed on the PC screen as the data is being transferred to the PC.

Figure 31:
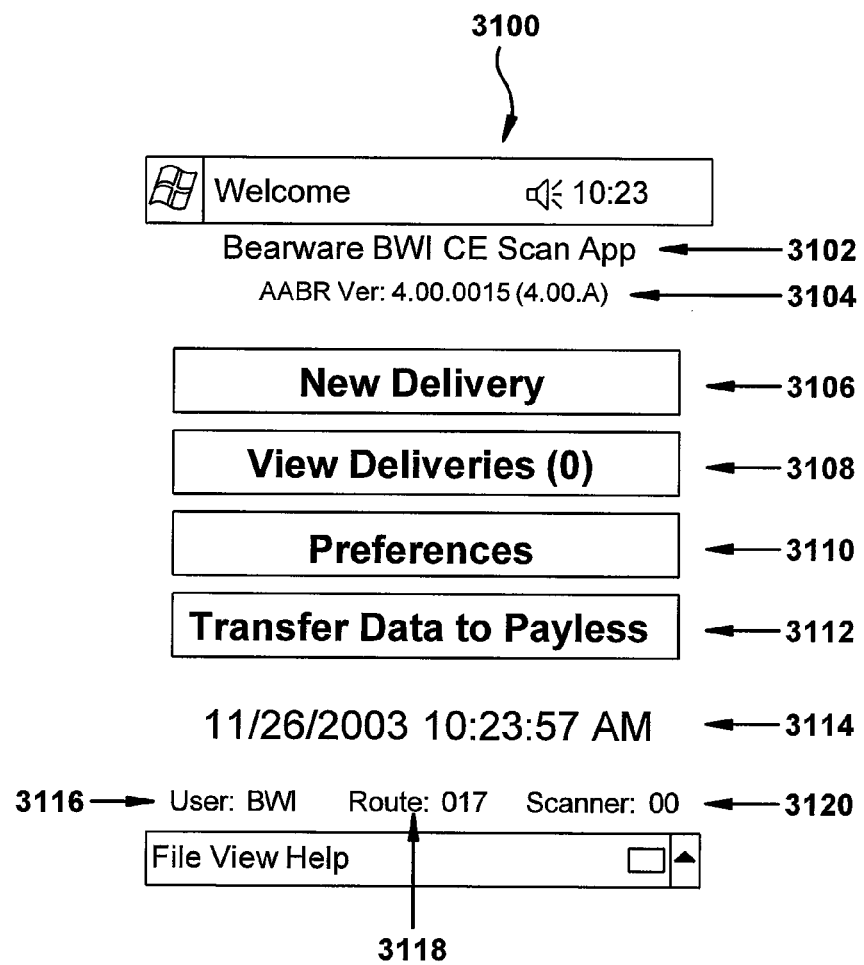
FIG. 31 is a Welcome Screen of the Pool Distribution Delivery Scan Application according to the present invention.

When delivering freight to a store or other delivery point, the delivery scan mode is used. After tapping the delivery scan icon on the scanner, the user is brought to the Delivery Scan Welcome screen 3100 as shown in FIG. 31. This screen shows the application name 3102 and version number 3104 and has four buttons: New Delivery 3106, View Deliveries 3108, Preferences 3110, and Transfer Data to Payless 3112. The Welcome Screen also shows the present time and date 3114, the user's initials 3116, the route number 3118, and scanner number 3120.

Figure 32:
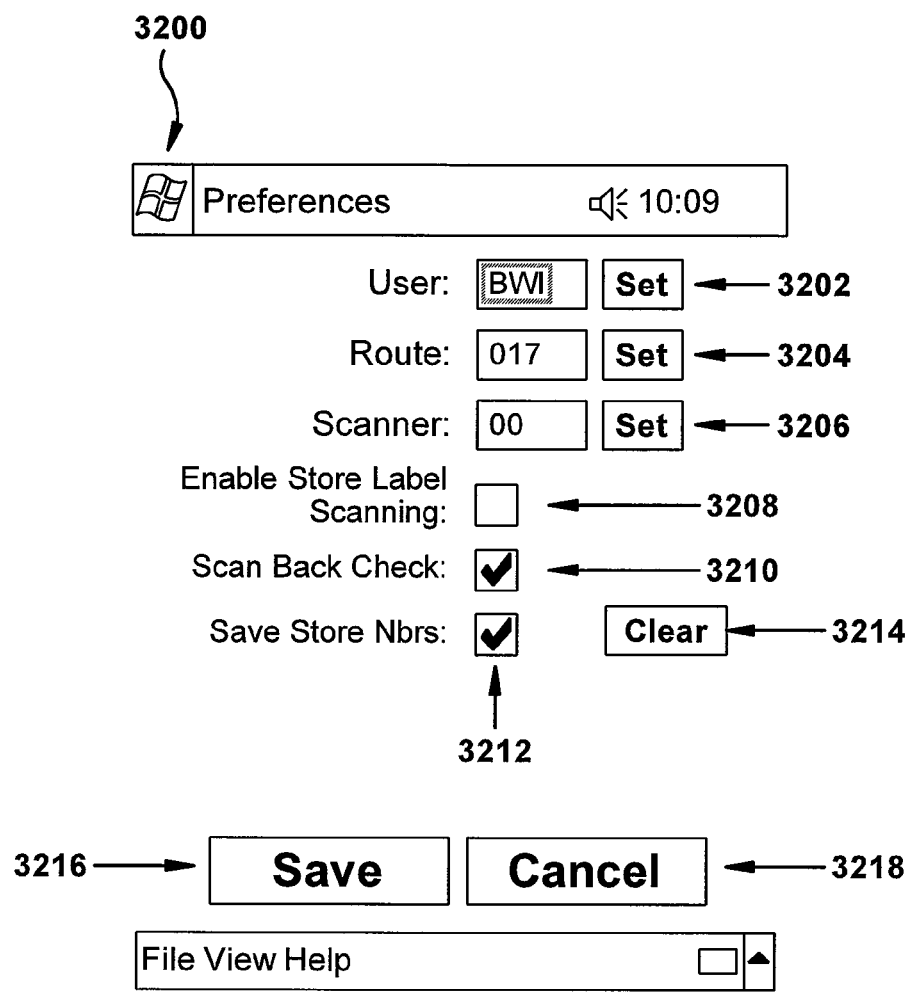
FIG. 32 is a Preferences Screen of the Pool Distribution Delivery Scan Application according to the present invention.

Tapping the Preferences Button 3110 brings the user to the Preferences screen 3200 shown in FIG. 32. Here the user sets his three letter initials in the user box 3202, the three digit route number 3204, and two digit scanner number 3206. Check boxes are provided for enabling store label scanning 3208, scan back check 3210 and saving store numbers 3212. The Enable Store Label scanning box 3208 will be checked when stores to which deliveries are made have barcode labels at their stores which are scanned to initiate a delivery scanning session. The Scan Back Check box 3210 will be selected if the user wants to have the scanner review the last fifty cartons for duplicate scans. The Save Store Number check box 3212 will be selected if the user wants the scanner to save store numbers that have been scanned in a store number pick list. The Clear button 3214 is used to clear all set preferences and start over. Tapping the Cancel button 3218 will bring the user back to the Welcome Screen 3100. After entering the preference data, tapping the Save button 3216 records the preferences and returns the user to the Welcome screen 3100.

Figure 33:
FIG. 33 is a New Delivery Screen of the Pool Distribution Delivery Scan Application according to the present invention.

Tapping the New Delivery Button 3106 brings the user to the New Delivery Screen 3300 as shown in FIG. 33. The user must first select whether this delivery is a Preloaded Delivery or a New (batch) Delivery. Preloaded delivery scanning refers to a process by which store delivery data is entered into the scanner prior to making the deliveries. When scanning in Preloaded Delivery mode, the scanned cartons are checked against the carton list in the scanner. Consequently, a user knows whether all cartons for a particular delivery have been scanned. If cartons are missing from the store order, the user can view a list showing which ones are missing. If no store data is preloaded into the scanner, scanning at delivery is done in "batch" or "data collection" mode. If scanning in preloaded mode, the Preloaded Delivery button 3302 will be highlighted. If scanning in batch or data collection mode, the New Delivery button 3304 will be highlighted.

Figure 34:
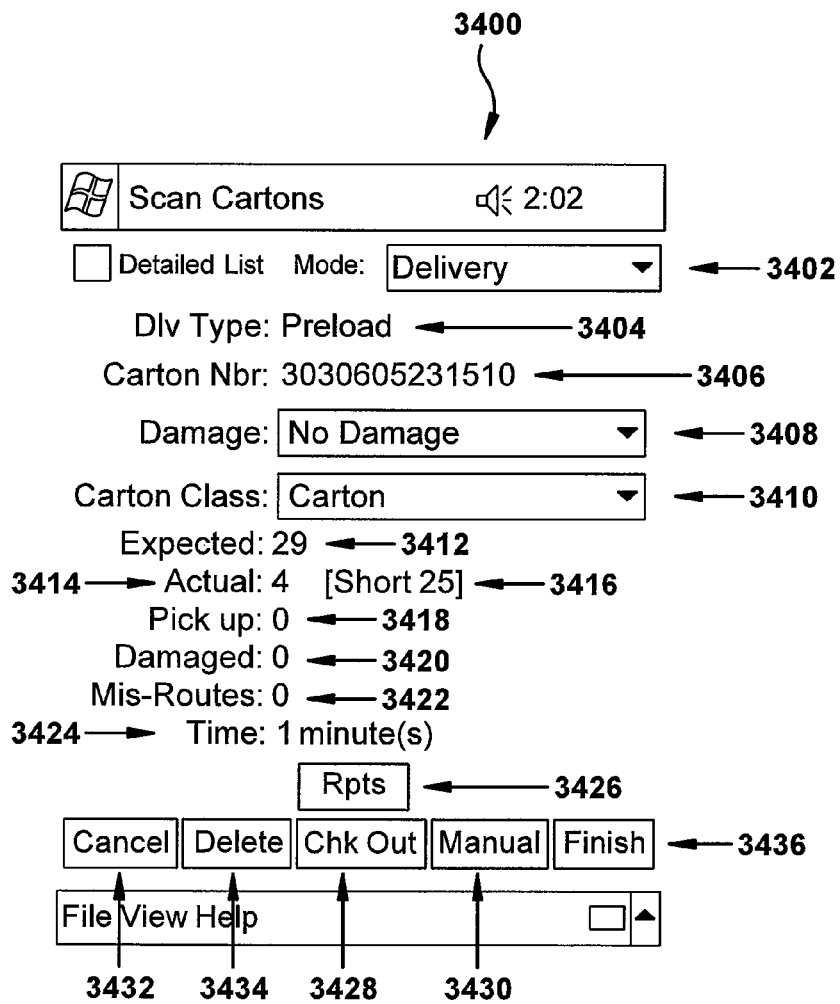
FIG. 34 is a Scan Cartons Screen of the Pool Distribution Delivery Scan Application according to the present invention.

When making a preloaded delivery, the user scrolls through the store list 3306 to select the store being delivered. By tapping the Next button 3308, the user is brought to the Scan Cartons screen 3400 as shown in FIG. 34. The Scan Cartons screen shows the Mode 3402 (delivery, pickup, etc.), the Delivery Type 3404 (Preloaded, Batch), the Carton Number scanned 3406, whether the carton is damaged 3408, the carton class 3410 and counters showing the total number of cartons expected to be delivered to the selected store 3412, the actual number of cartons scanned 3414 and short 3416, the number of cartons picked up 3418, damaged 3420 or misrouted 3422. A clock runs timing the length of the delivery 3424.

Figure 36:
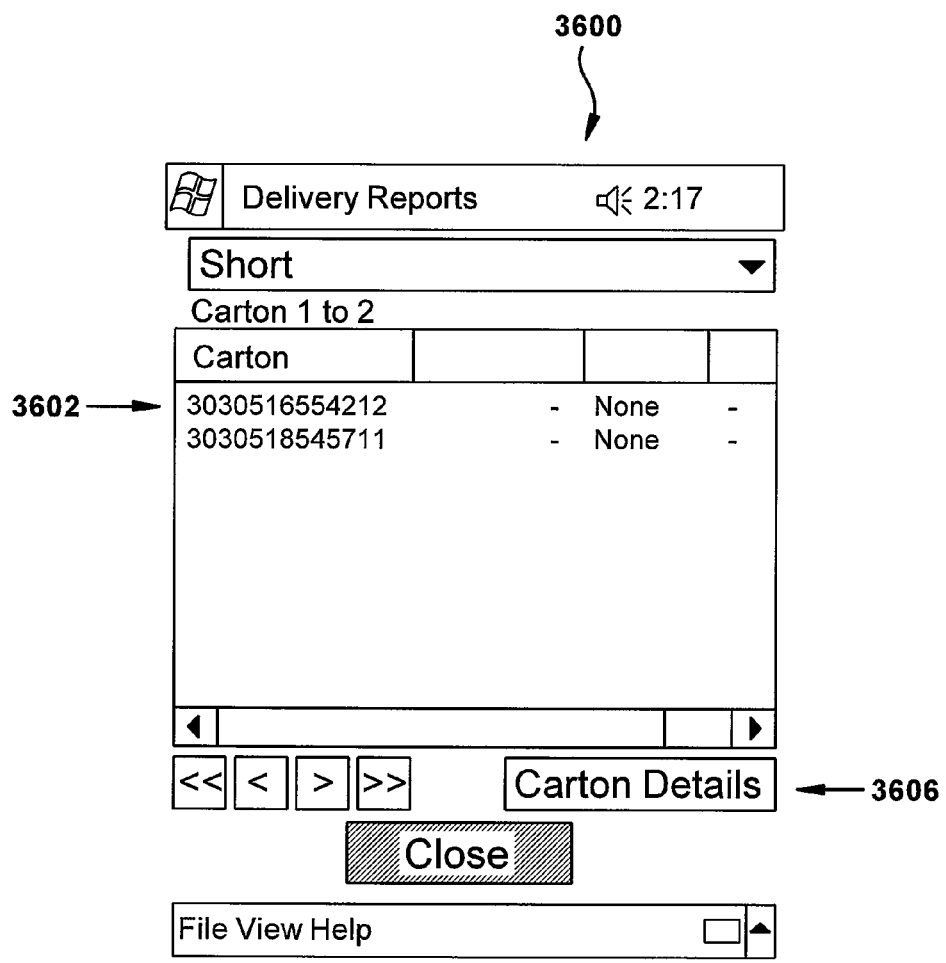
FIG. 36 is a Delivery Reports Screen of the Pool Distribution Delivery Scan Application according to the present invention.
Figure 37:
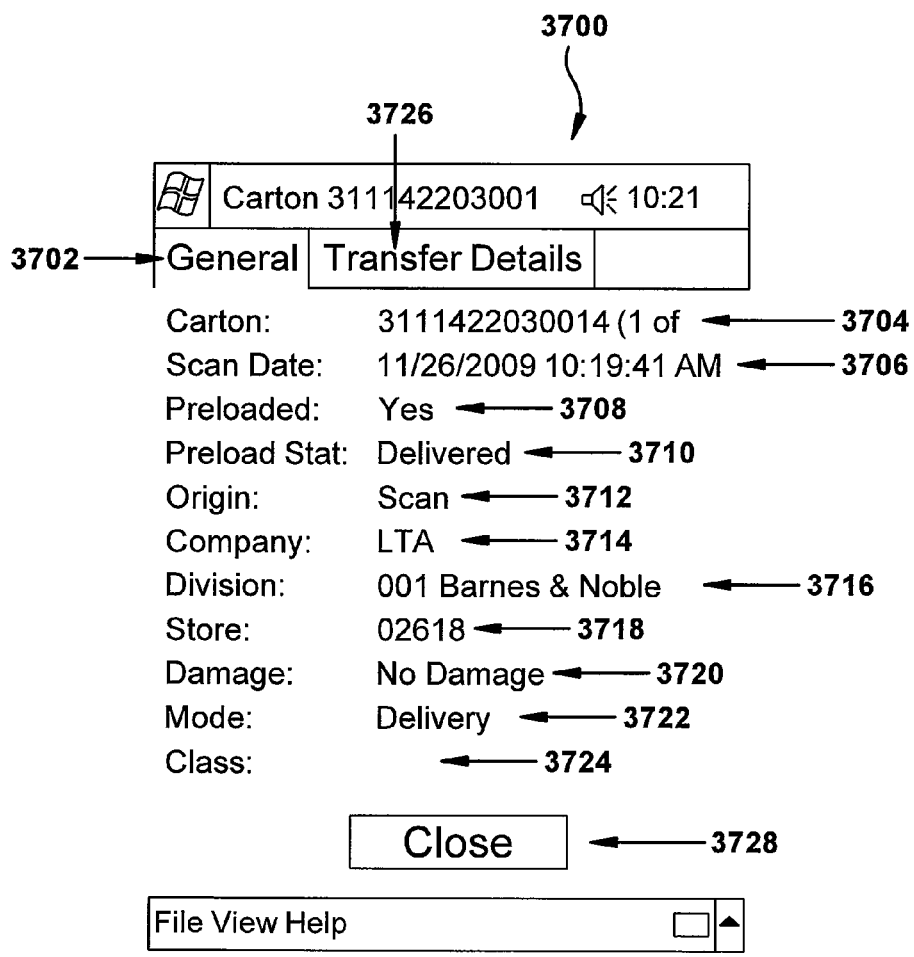
FIG. 37 is a General Tab of the Carton Details Screen of the Delivery Report of the Pool Distribution Delivery Scan Application according to the present invention.
Figure 38:
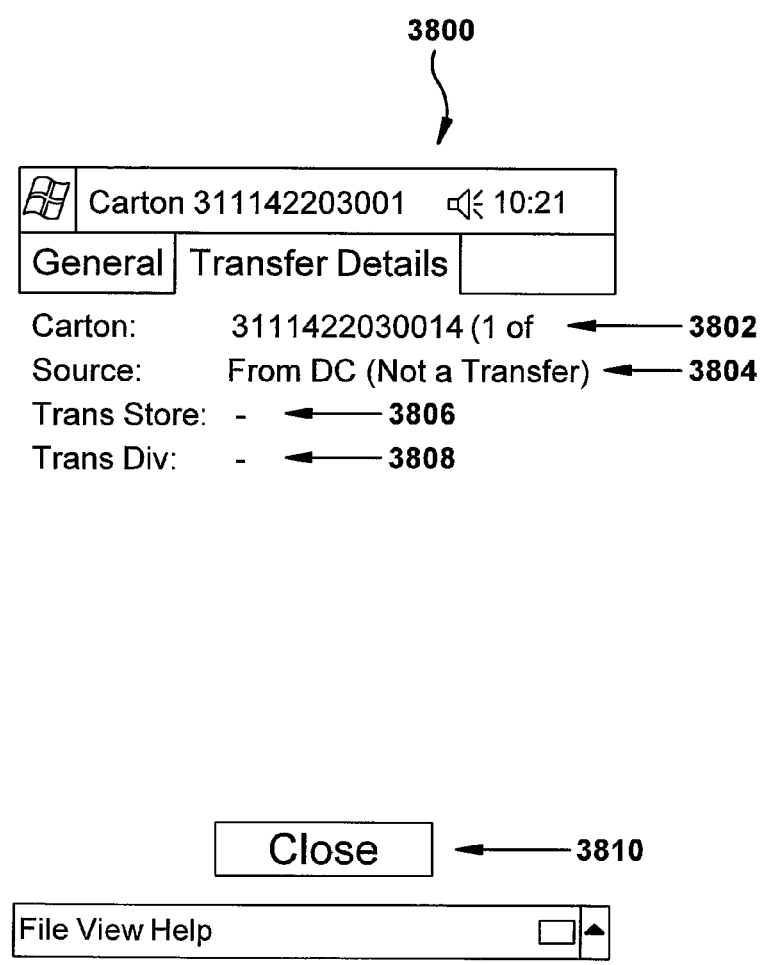
FIG. 38 is a Transfer Tab of the Carton Details Screen of the Delivery Report of the Pool Distribution Delivery Scan Application according to the present invention.

By tapping the Reports button 3426 on the Scan Cartons Screen 3400, the user is brought to the Delivery Reports Screen 3500 as shown in Figure 35. From the pull down list 3502, the user then can select what report to display: all cartons, delivered cartons, match cartons, non-cartons, or short cartons. For example, tapping the short carton menu option in the pull down menu 3502 will return a report screen 3600 as shown in FIG. 36. This report displays a list of all cartons that were preloaded, but not scanned at delivery. If the user taps the carton number on the screen 3602, the Carton Details button 3604 becomes active. By tapping on the Carton Details button 3604, the user is brought to the Carton Details Report 3700 shown in FIG. 37. Data displayed in the General Tab 3702 of this report are the carton number 3704, the scan date and time 3706, whether the carton was preloaded into the scanner 3708, the preload status 3710, the origin 3712, the company 3714, the company's division 3716, the store number 3718, the damage status 3720, the scan mode 3722, and carton class 3724. Tapping the Transfer Details tab 3726 displays the information relating to the transfer of cartons from one store to another. The data displayed on this screen 3800, FIG. 38, is the carton number 3802, the source of the carton 3804, the transferred to store 3806 and transferred to division 3808. When tapping the Close button on the reports screen 3728, 3810, the user is brought back to the Delivery Reports screen 3500. Tapping the Close button 3504 on the delivery reports screen 3500 will bring the user back to the Scan Cartons Screen 3400.

If the driver must return to the truck to get more cartons, the driver can tap the Check Out button 3428 which records the time leaving and re-entering the store and also locks the scanner so that no cartons can be scanned while the driver is checked out.

Figure 39:
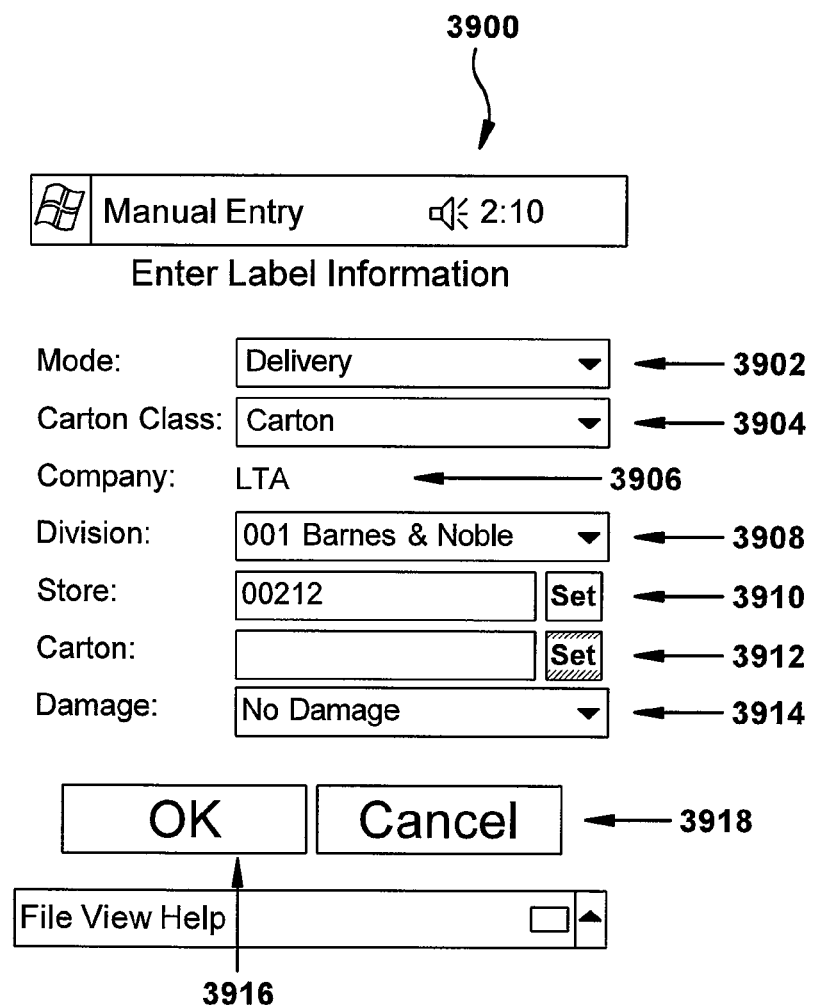
FIG. 39 is a Manual Entry Screen of the Pool Distribution Delivery Scan Application according to the present invention.
Figure 40:
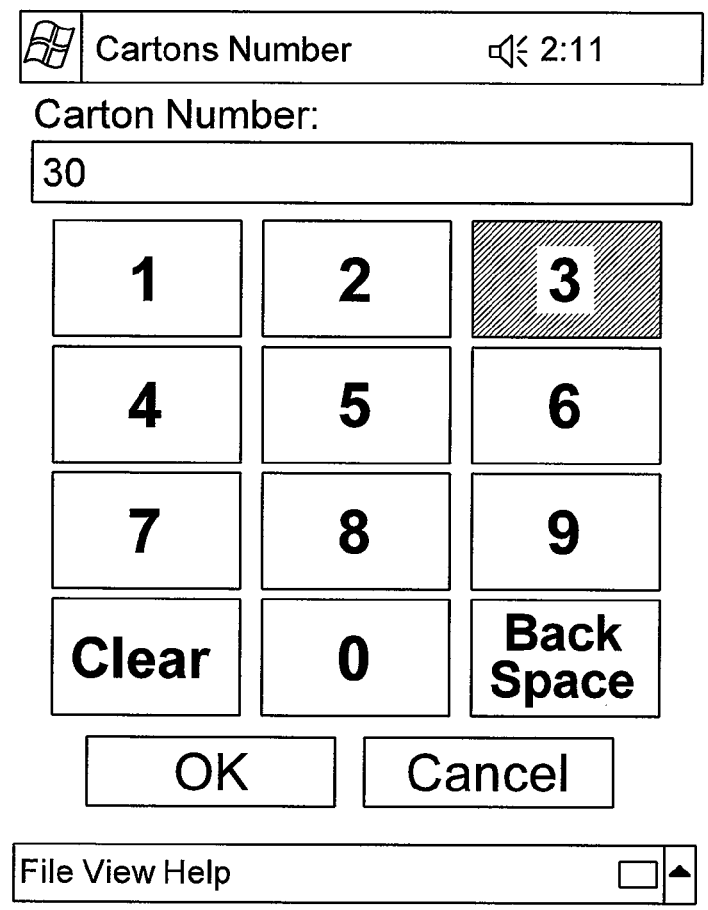
FIG. 40 is a Numeric Keypad for the manual entry of carton numbers in the Pool Distribution Delivery Scan Application according to the present invention.

If a barcode label is unreadable by the scanner, the user can tap the Manual button 3430 which brings them to the Manual Entry screen 3900 shown in FIG. 39. Here the user selects the Mode 3902, the Carton Class 3904, the Company 3906, the Division 3908, and Damage type 3914, and enters the Store Number 3910, and the Carton number 3912. By tapping the Set buttons, the user is brought to a numerical keypad as shown in FIG. 40 to enter the store number and carton number. By tapping the OK button 3916 or Cancel button 3918, the user is brought back to the Scan Cartons screen 3400.

The user taps the Cancel button 3432 to exit the Delivery Scan screen. The user taps the Delete button 3434 to delete a scan.

Figure 41:
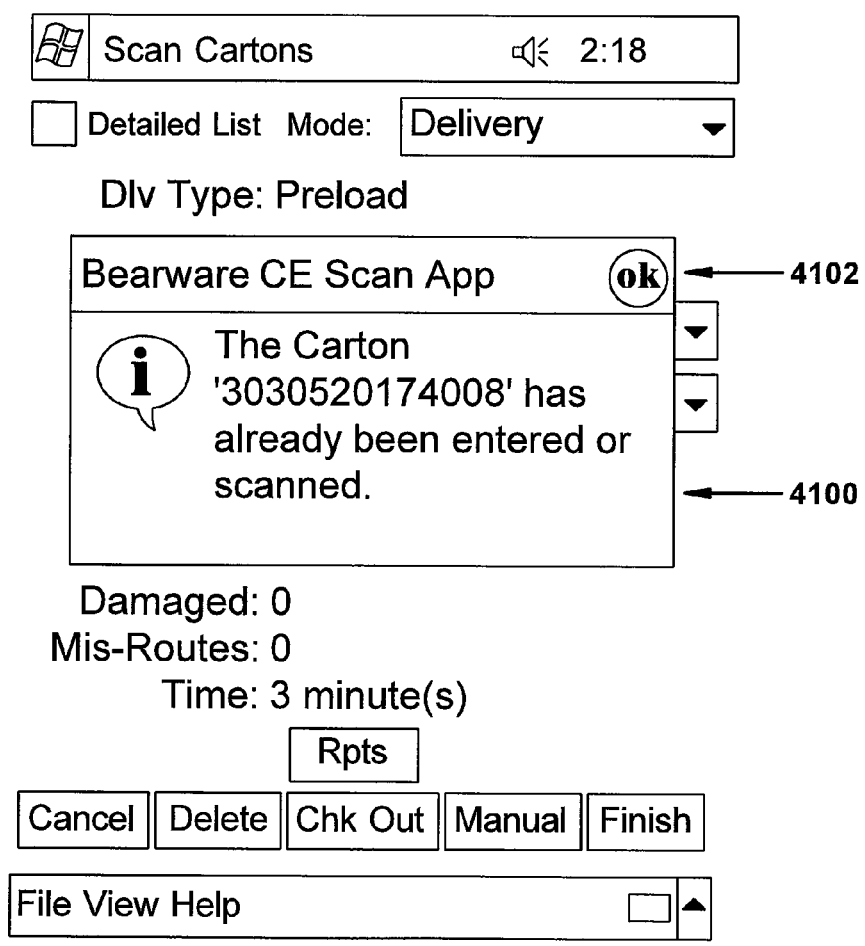
FIG. 41 is a duplicate scan error message screen of the Pool Distribution Delivery Scan Application according to the present invention.
Figure 42:
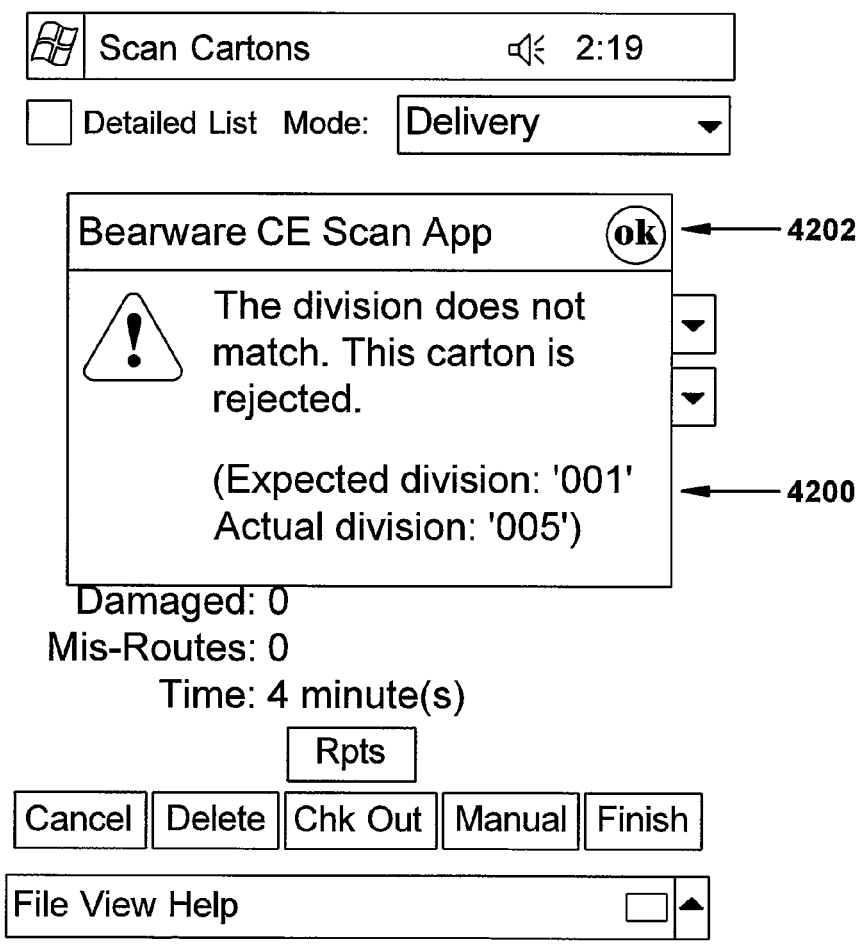
FIG. 42 is a misroute scan error message screen of the Pool Distribution Delivery Scan Application according to the present invention.

If the user scans the same carton more than once, an error message 4100 such as shown in FIG. 41 is displayed telling the user that the carton has already been scanned or manually entered. The user must tap the OK button 4102 to clear this error message and begin scanning again. If the user scans a carton barcode which does not match the store number to which the carton is supposed to be delivered, another error message is displayed. This misroute error message 4200 is shown in FIG. 42. The user must tap the OK button 4202 to clear this error message and begin scanning again.

Figure 43:
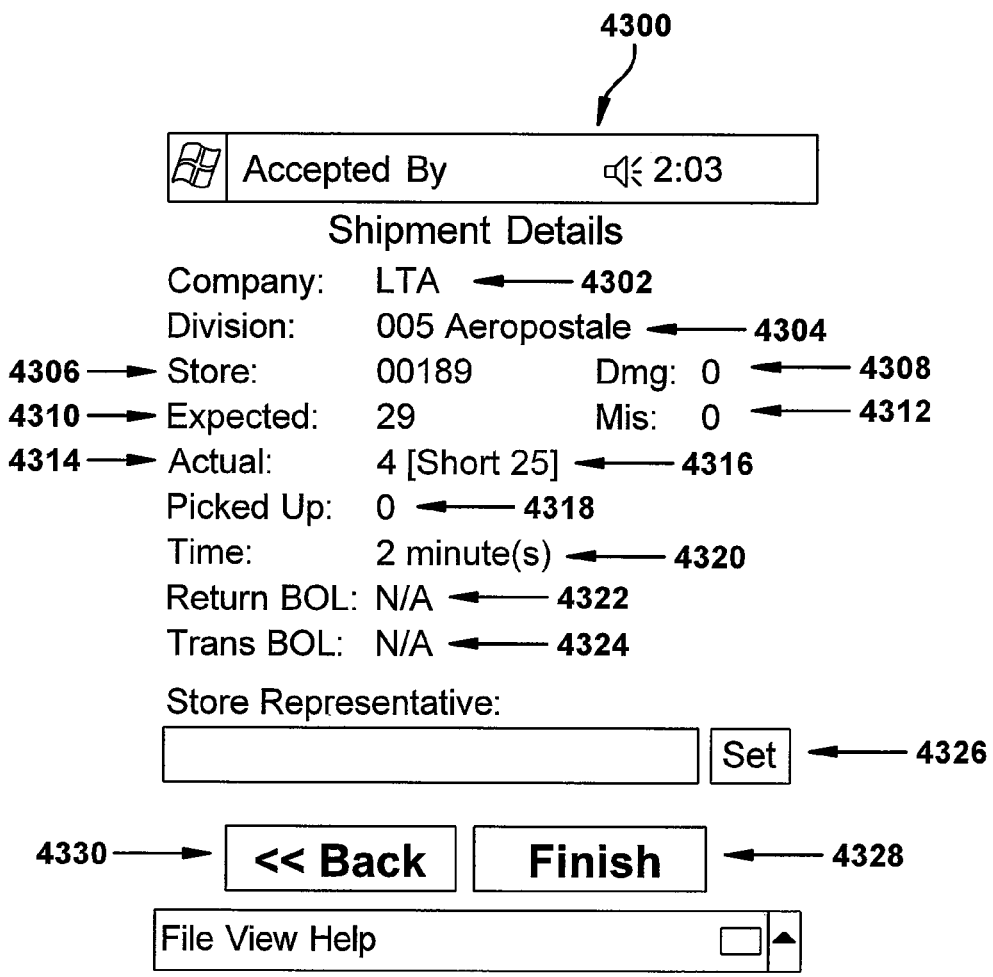
FIG. 43 is a Shipment Details Screen of the Pool Distribution Delivery Scan Application according to the present invention.
Figure 44:
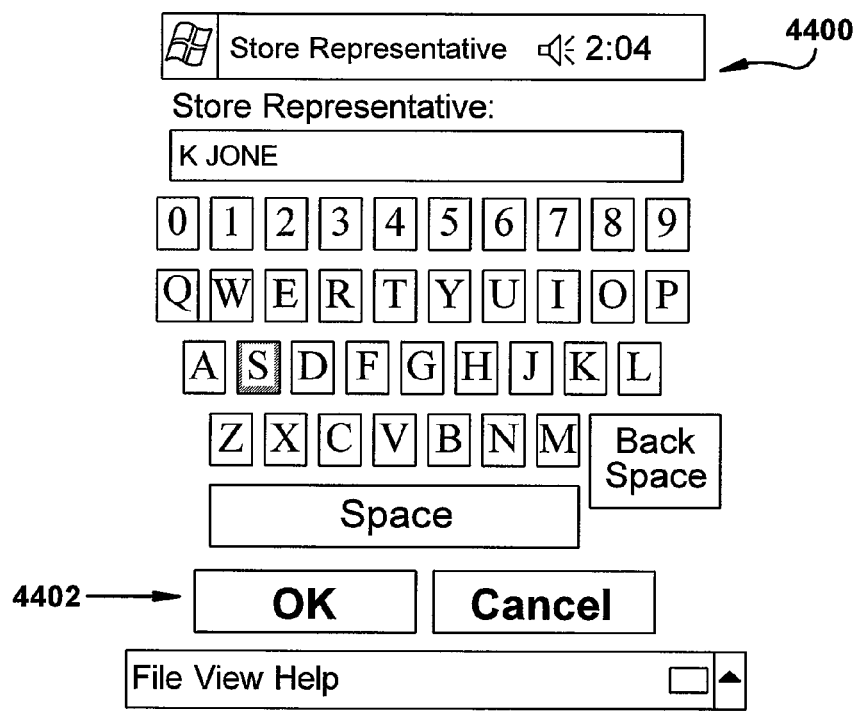
FIG. 44 is a Store Representative Screen of the Pool Distribution Delivery Scan Application according to the present invention.

When finished scanning all of the cartons to be delivered, the user taps the Finish button 3436. This brings the user to the Accepted By screen 4300 shown in FIG. 43. This screen displays shipment details relating to the most recent delivery scanning session: The company 4302, the division 4304, the store number 4306, the number of cartons damaged 4308, expected 4310, misrouted 4312, actually scanned 4314 and short 4316, picked up 4318, time elapsed for the delivery 4320, and the return bill of lading number 4322 and transfer bill of lading number 4324, if any. To finish the delivery, the user must enter the store representative's name. This is done by tapping the Set button 4326 which brings the user to the Store Representative screen 4400 shown in FIG. 44 where the user taps the appropriate letters to type the store representative's name. When finished, the user taps the OK button 4402 to return to the Accepted By screen 4300. Once the store representative's name is entered, the user can select the Finish button 4328 to complete the delivery scanning session. Tapping the Back button 4330 will take the user back to the Scan Cartons screen 3400.

Figure 45:
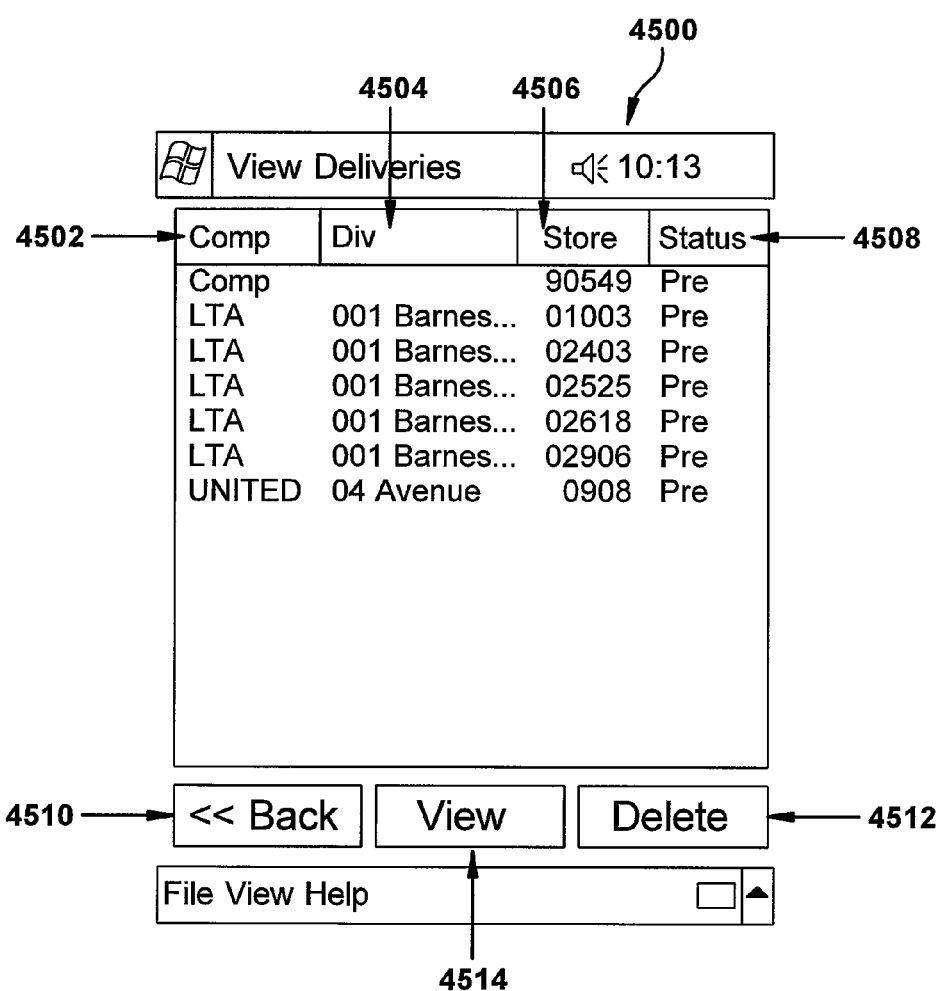
FIG. 45 is a View Deliveries Screen of the Pool Distribution Delivery Scan Application according to the present invention.
Figure 46:
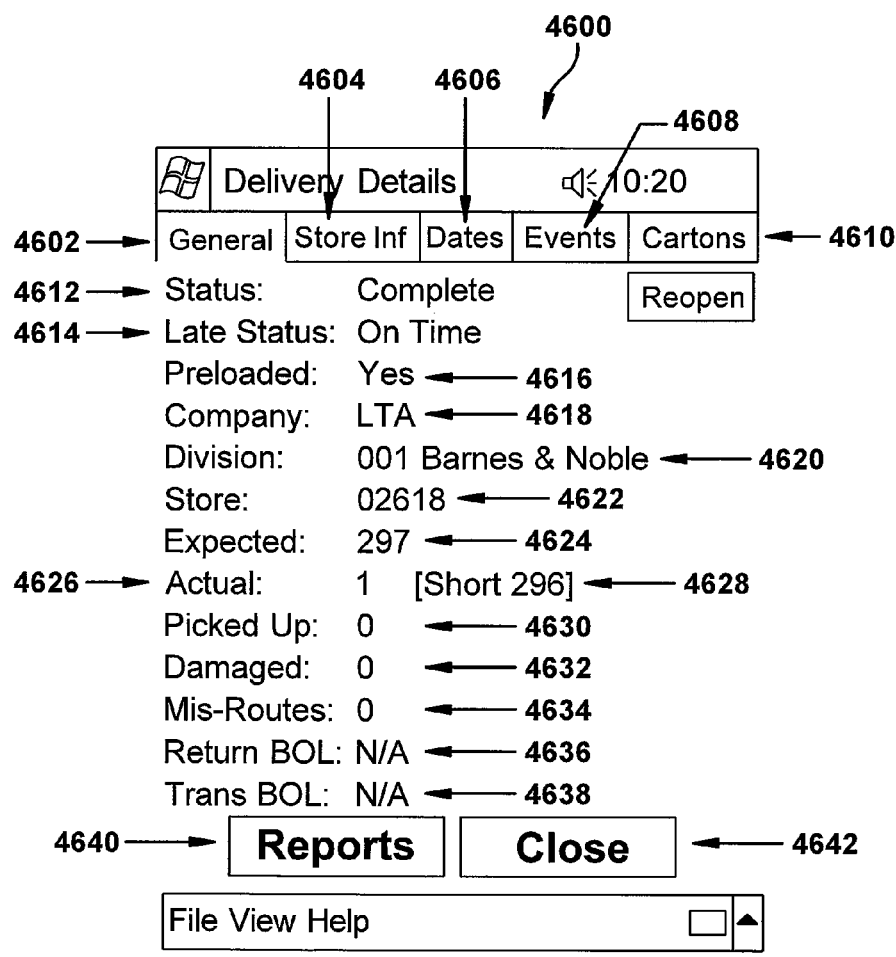
FIG. 46 is a General Tab of the Delivery Details Report of the Pool Distribution Delivery Scan Application according to the present invention.

From the Welcome Screen 3100, the user can also access data on all delivery scans by tapping the View Deliveries 3108 button. This takes the user to the View Deliveries screen 4500 shown in FIG. 45. This screen contains a list of all deliveries made and contains columns for the Company 4502, the Division 4504, the Store Number 4506 and the Status 4508. By tapping the Back button 4510, the user is taken to the Welcome Screen 3100. If the user taps the Delete Button 4512, the selected delivery will be deleted. By tapping a specific delivery line on the screen or selecting the delivery the user wants to see and tapping the Review button 4514, the user is brought to the Delivery Details screen 4600 as shown in FIG. 46. The Delivery Details Screen contains five tabs: General 4602, Store Information 4604, Dates 4606, Events 4608 and Cartons 4610.

The General Tab 4602 on the Delivery Details Report 4600 contains information on the status of the delivery 4612, the late status 4614, whether the delivery was preloaded 4616, the company 4618, division 4620, store number 4622, expected cartons to be delivered 4624, the actual number of cartons delivered 4626 and brackets around any exceptions 4628, the number of cartons picked up 4630, damaged 4632 or misrouted 4634, the return BOL number 4636 and transfer BOL number 4638, if any. If the user taps the Reports button 4640, the user is taken to the Cartons tab on the Delivery Details Report 4610. Tapping the Close button returns the user to the Welcome Screen 3100.

Figure 47:
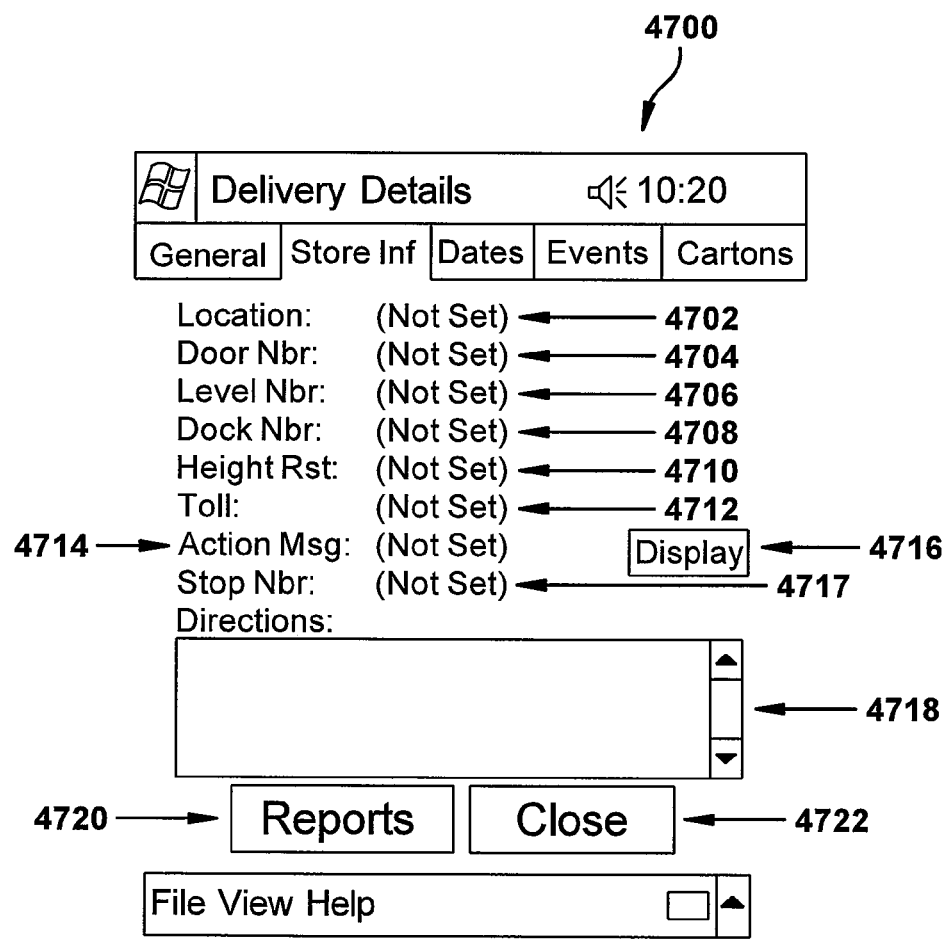
FIG. 47 is a Store Information Tab of the Delivery Details Report of the Pool Distribution Delivery Scan Application according to the present invention.

The Store Information Tab 4700 on the Delivery Details Report, as shown in FIG. 47, includes information concerning the store which can be preloaded into the scanner to assist the driver in making deliveries. The information that can be preloaded into the scanner and displayed in this report is the store location or address 4702, the door number 4704, the level number 4706, the dock number 4708, whether there are height restrictions 4710, whether tolls must be paid in order to get to the store 4712, an action message notice 4714, an action message display box 4716 which if selected shows the action message, the stop number 4717, and directions to the store 4718. By tapping the Reports button 4720, the user is brought to the Cartons tab 4610 on the Delivery Details Report. Tapping the Close Button 4722 takes the user back to the View Deliveries Screen 4500.

Figure 48:
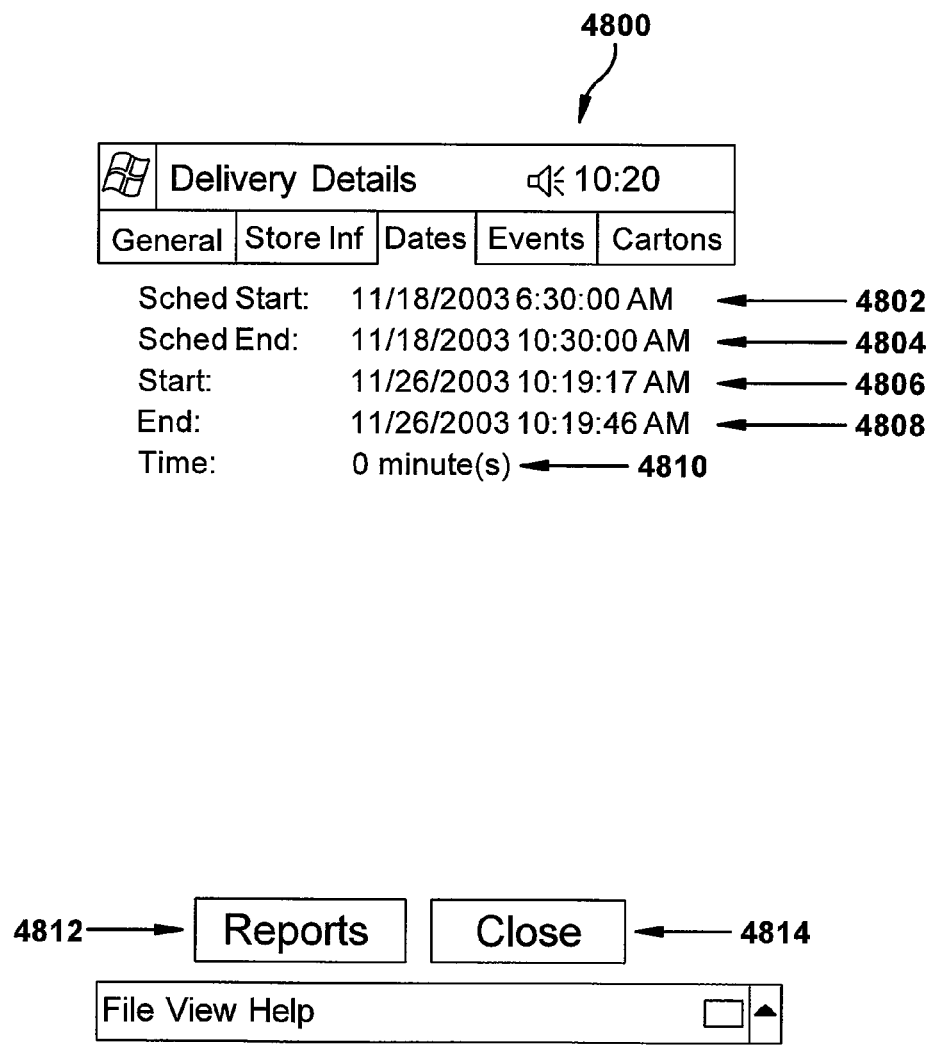
FIG. 48 is a Dates Tab of the Delivery Details Report of the Pool Distribution Delivery Scan Application according to the present invention.

The Dates Tab 4606 of the Delivery Details Report, as shown in Figure 48, shows the user the scheduled start time for the delivery 4802, the scheduled end time for the delivery 4804, the actual start 4806 and end time 4808 of the delivery and the elapsed time it took to make the delivery 4810. If the user taps the Reports button 4812, the user is taken to the Cartons tab 4610 on the Delivery Details Report. Tapping the Close Button 4814 takes the user back to the View Deliveries Screen 4500.

Figure 49:
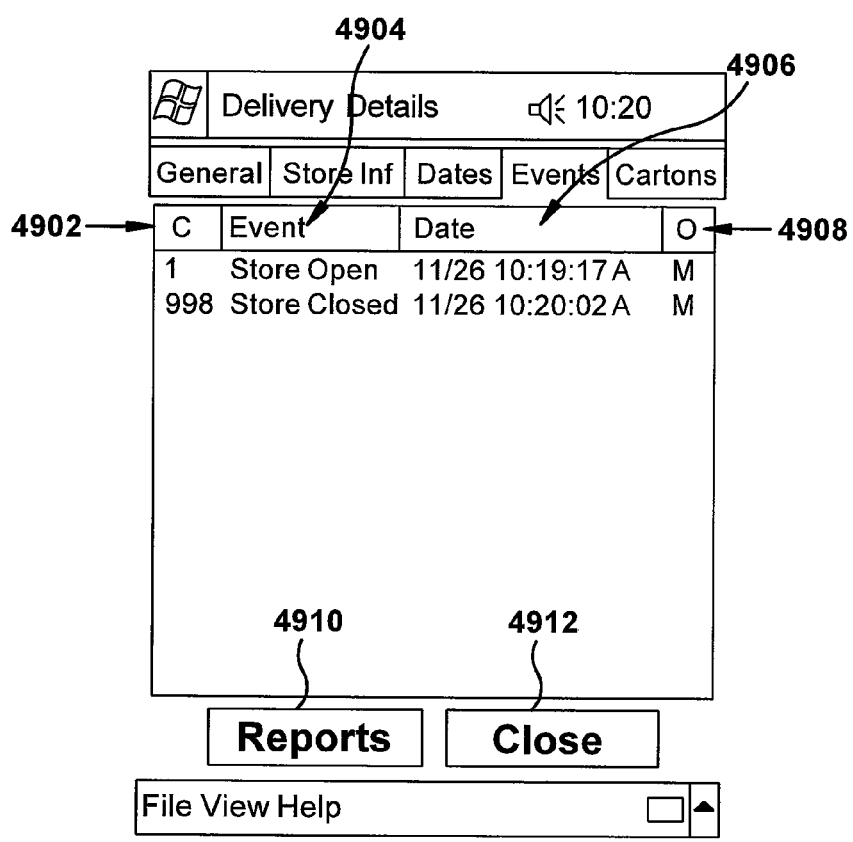
FIG. 49 is a Events Tab of the Delivery Details Report of the Pool Distribution Delivery Scan Application according to the present invention.

The Events Tab, as shown in FIG. 49, shows the user when the delivery driver entered and left the store during the delivery process. The columns in the report are C for record number 4902, the Event 4904, Date 4906, and O for Origin 4908. The C record reflects the type of event. The Event column contains either the store open or close scan or check in or check out scans. The Date column gives the date and time for each event. The Origin column lists whether the event data was obtained by scanning the store barcode or manually entered. If the user taps the Reports button 4910, the user is taken to the Cartons tab 4610 on the Delivery Details Report. Tapping the Close Button 4912 takes the user back to the View Deliveries Screen 4500.

Figure 50:
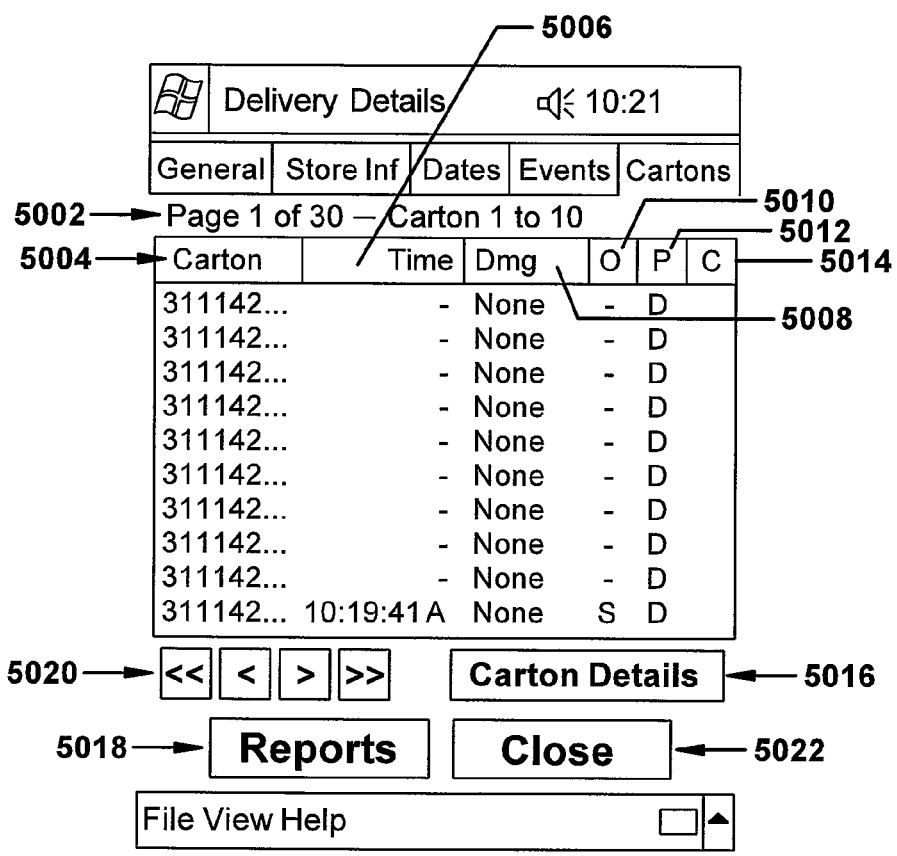
FIG. 50 is a Cartons Tab of the Delivery Details Report of the Pool Distribution Delivery Scan Application according to the present invention.

The Cartons Tab, as shown in FIG. 50, details all cartons scanned at the selected store. The header of the report 5002 lists how many pages of carton detail information are held in the scanner. The columns in this report are the carton number 5004, scan time 5006, damage 5008, origin 5010, pickup or delivery 5012, and carton class 5014. The carton number column contains the entire carton number scanned. The time column contains the time stamp when the carton was scanned. The damage column displays the damage status per carton. The origin column shows whether the carton was entered via a scan or manual entry. The pickup column shows whether the carton was scanned as a delivery into the store ("D") or as a pickup ("P") for cartons that are being taken by the driver for return to the shipper or transfer to another store. The class column shows the type of item scanned: carton, tube, envelope, etc. By selecting a carton, the Carton Details button 5016 becomes activated. Tapping the Carton Details button takes the user to the Carton Details screen 3700. If the user taps the Reports button 5018, the user is taken to the Cartons tab 4610 on the Delivery Details Report. The user can also navigate from the page to page of the report by using the back and forward arrow buttons 5020. Tapping the Close Button 5022 takes the user back to the View Deliveries Screen.

Desktop Application and Web Service

Regardless of the whether the freight tracking and control system is used for the distribution direct or pool distribution model, the data collected by the scanners must be transferred to the SQL database on the web server so that users can use the data to generate reports. The data can be transferred from the scanner to the workstation via a cradle attached by a serial cable or via a wireless connection.

Figure 51:
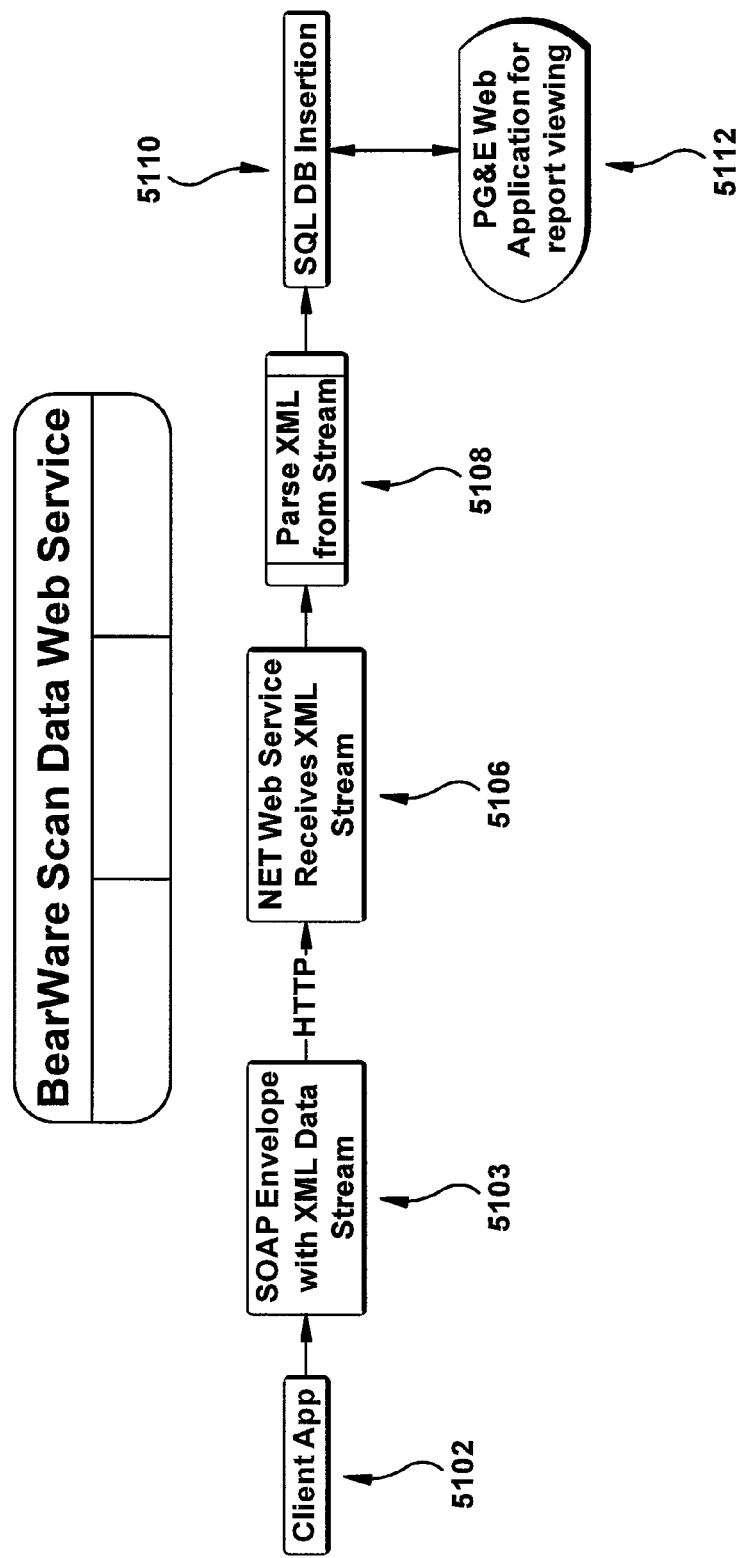
FIG. 51 is a diagram illustrating how data is transferred from the desktop client application to the web-based SQL database.

When the scanner is placed into the cradle or the wireless connection is initiated, the data transfer application is started and BearWare Data Transfer Module screen 3000 is displayed on the PC monitor. This is also referred to as the Client Application 5102 as shown in FIG. 51. This screen displays the name of the scanner device 3002, has a meter showing the status of the data transfer 3004, lists the version number of the transfer program 3006, and has a check box 3008 for automatically closing the BearWare Data Transfer application upon completion of the data transfer.

The outbound data packets contain a SOAP envelope and the scanner data in XML format 5104. The data leaves the workstation on which the client application is running via HTTP through port 80. This allows the scan data to be transferred to the web service 5106 without opening any ports on the company's firewall or otherwise compromising the sending or receiving company's internet security. When the SOAP envelope is received by the web server, the web service 5106 parses the scanner data 5108 and inserts it into the SQL database 5110. After the scanner data is successfully inserted into the SQL database, a confirmation from the web service is sent to the client application 5102 and the scan data is automatically deleted from the scanner. In addition to the scan data that is passed via the BearWare Data Transfer Module, the web service can receive and parse tab delimited text files from shippers, such as the ASN.

Once the scan data has been inserted into the web database via the web service, users can navigate to the web based reporting application to query the web database which contains all of the scan data and ASN data.

Web-Based Reporting Tool

The web reporting applications are accessed by a user navigating to it with a standard internet browser application (i.e. Microsoft Internet Explorer 5.xx) and entering the correct web address (i.e. www.weblogisticsinc.com). Depending on the web address entered, the user is brought to the Distribution Center Direct Reports or the Pool Distribution reports.

Distribution Center Direct Reports

Figure 52:
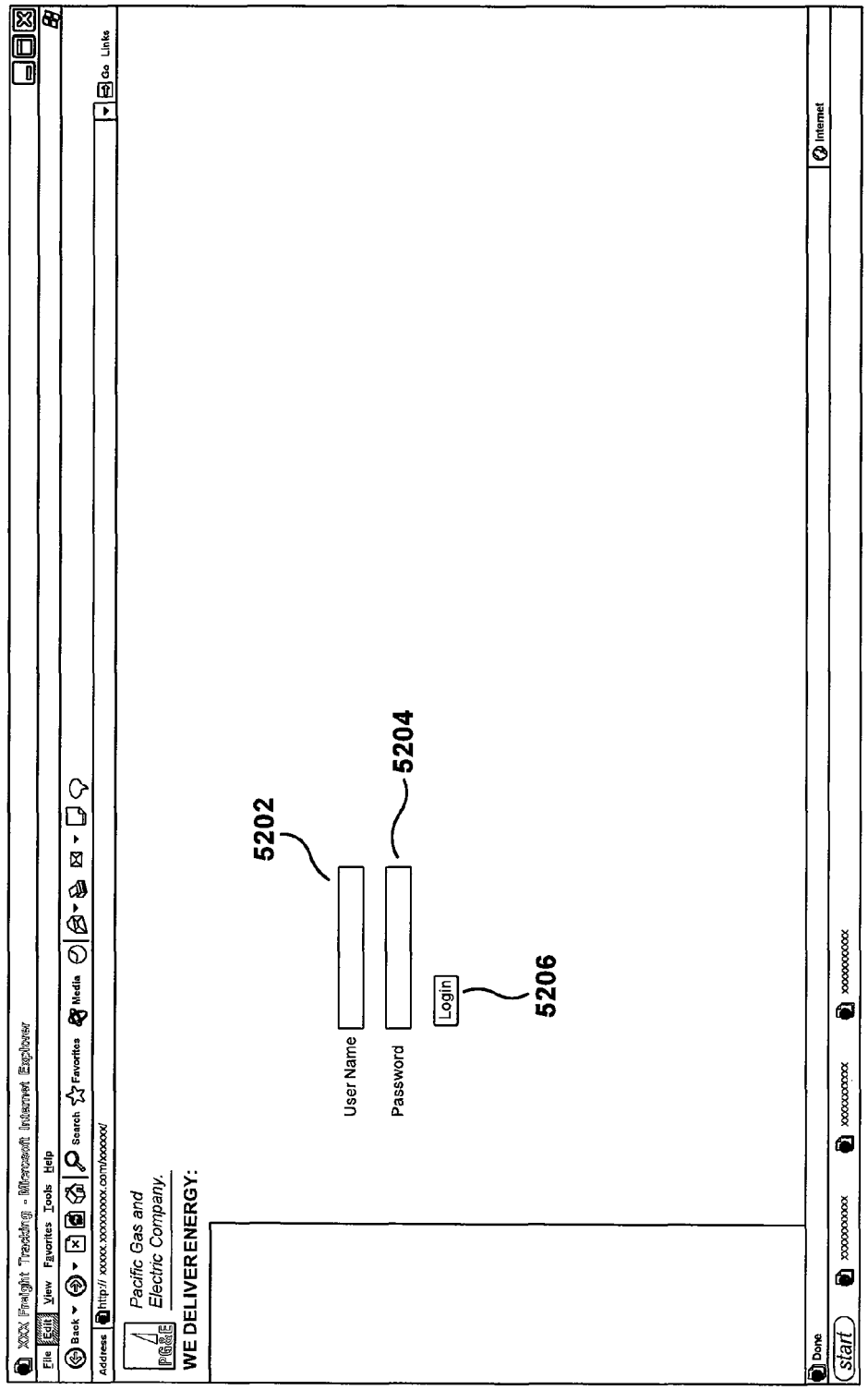
FIG. 52 is a login screen of the web based Distribution Center Direct reporting application according to the present invention.
Figure 53:
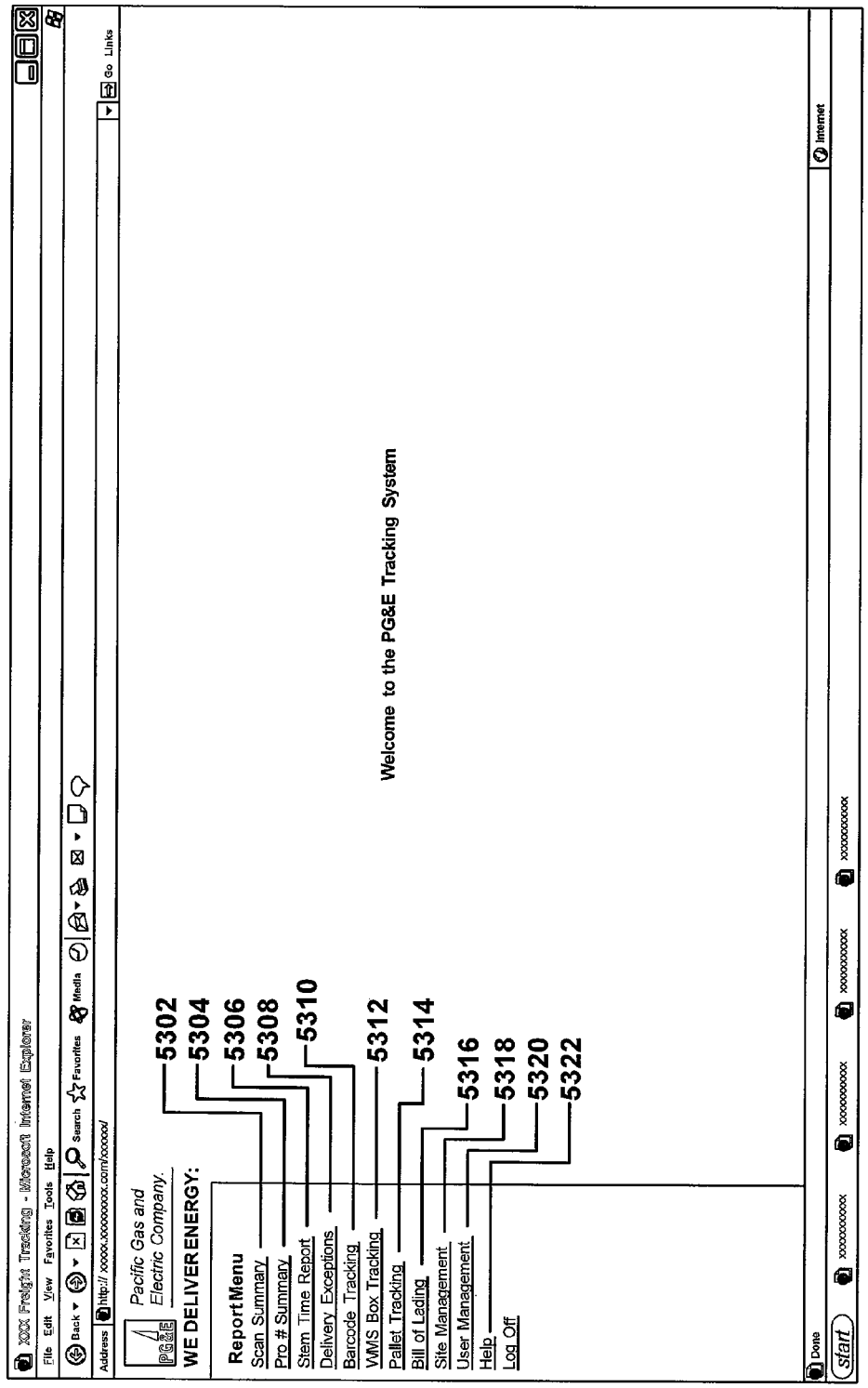
FIG. 53 is a Welcome screen of the web based Distribution Center Direct reporting application according to the present invention.

After entering in the correct web address in their internet browser application, the user is brought to the login screen as shown in FIG. 52. At this screen, the user types in their user name 5202 and password 5204 and then clicks on the login button 5206. The user is then brought to the Welcome Screen as shown in FIG. 53. From the Welcome Screen, the user can navigate to the following reports and information: Scan Summary 5302, Pro # Summary 5304, Stem Time Report 5306, Delivery Exceptions 5308, Barcode Tracking 5310, WMS Box Tracking 5312, Pallet Tracking 5314, Bill of Lading 5316, Site Management 5518, User Management 5320, and Help 5322.

Figure 54:
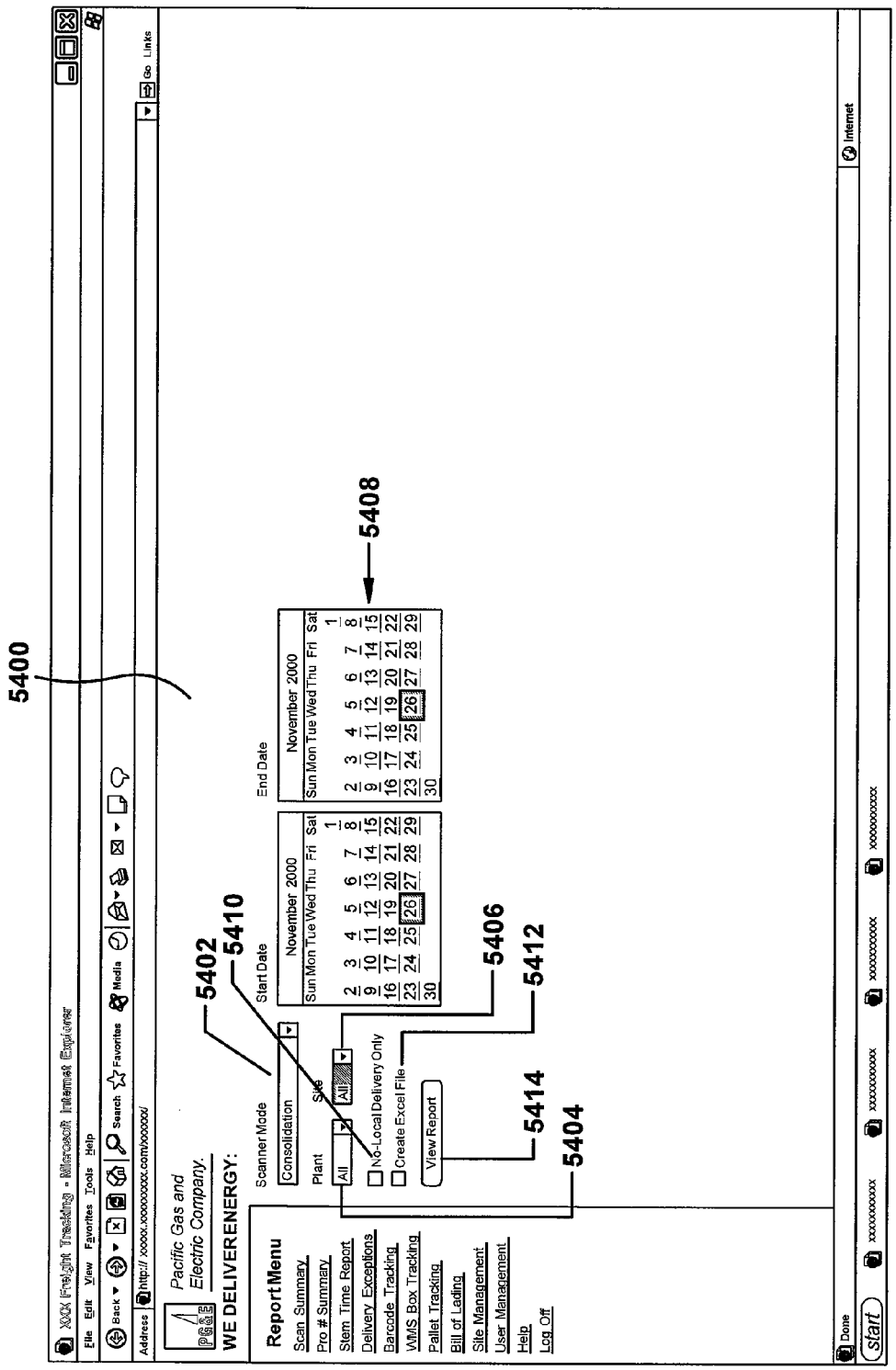
FIG. 54 is a scan summary report query screen of the web based Distribution Center Direct reporting application according to the present invention.
Figure 55:
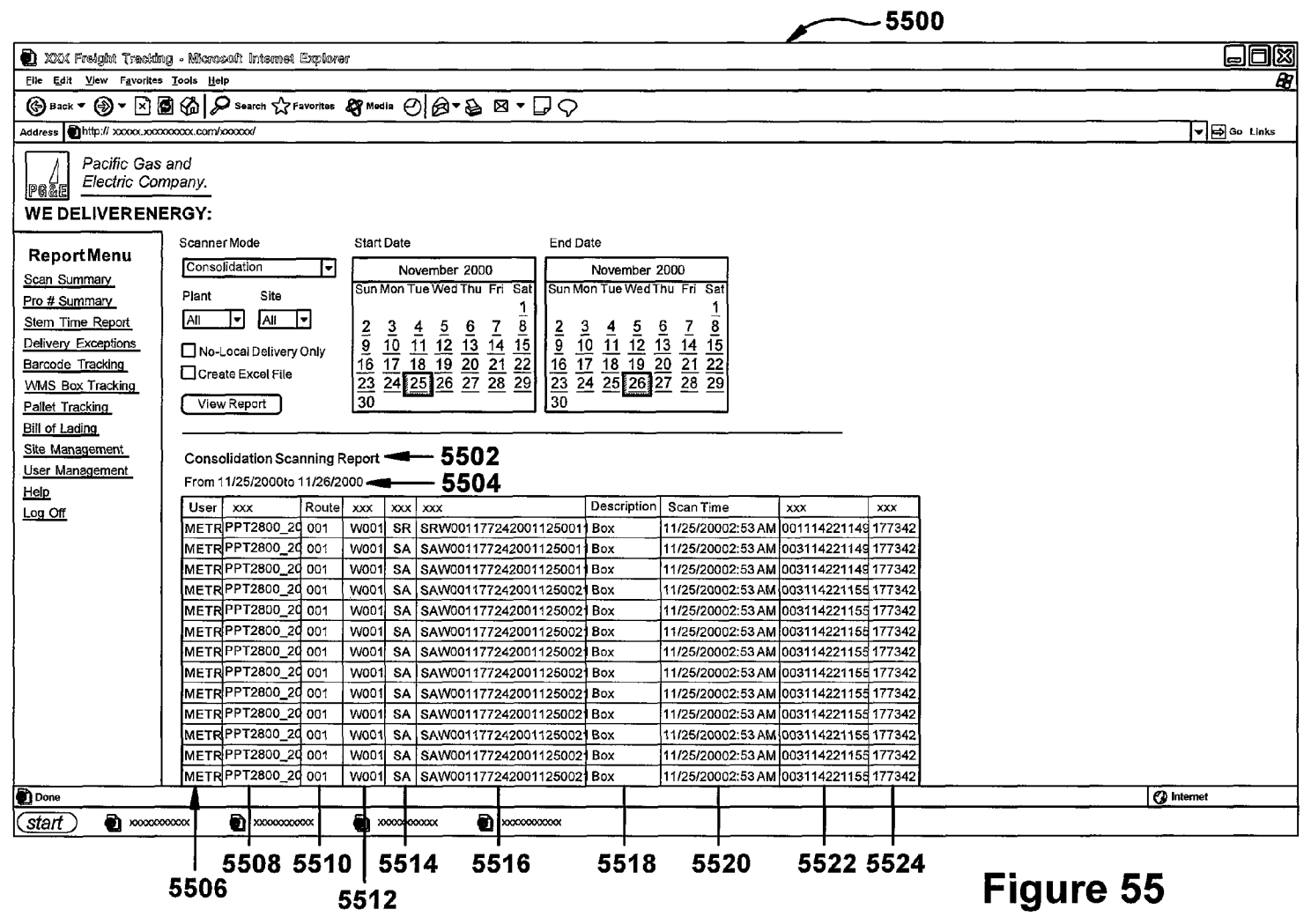
Figure 56:
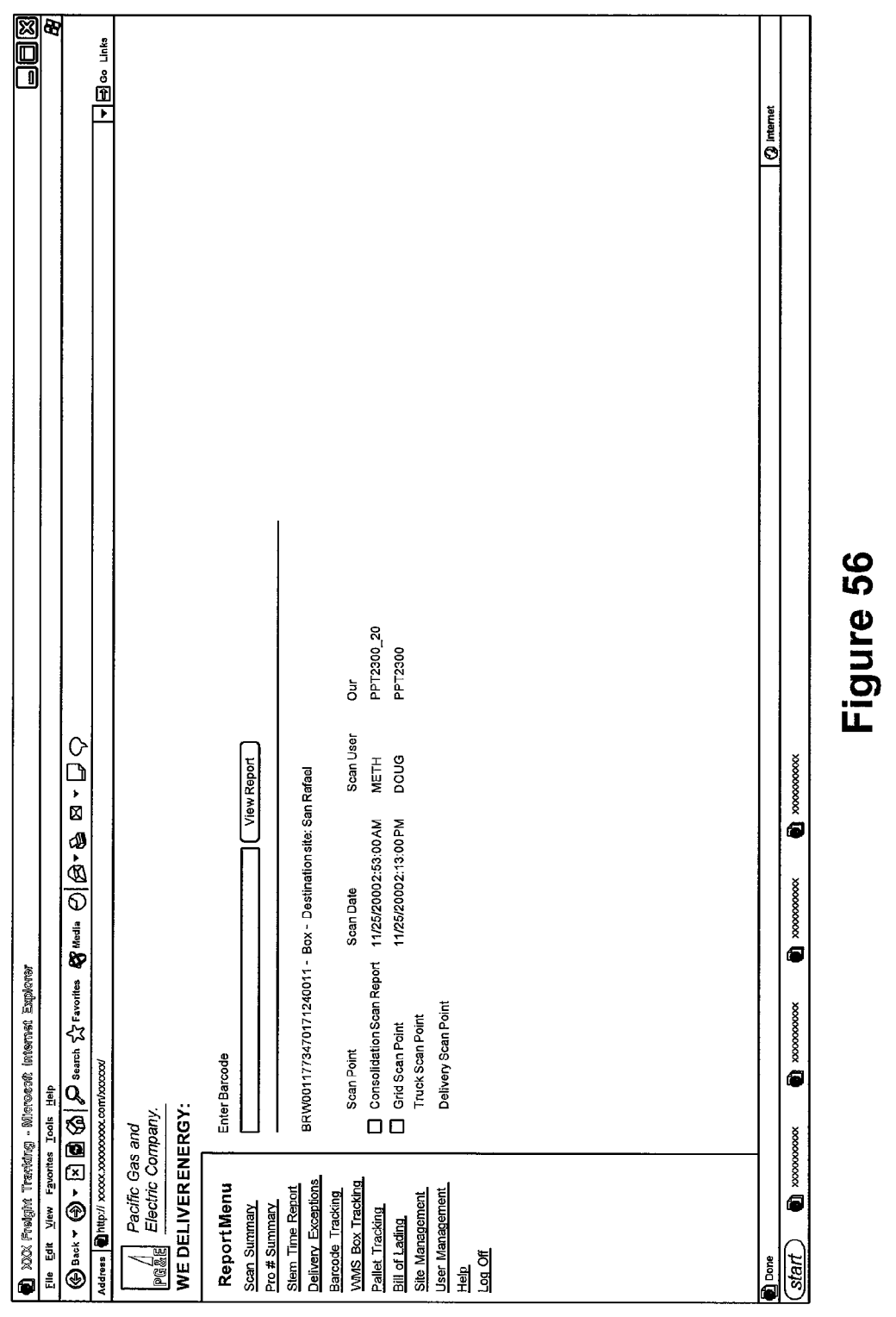
Figure 57:
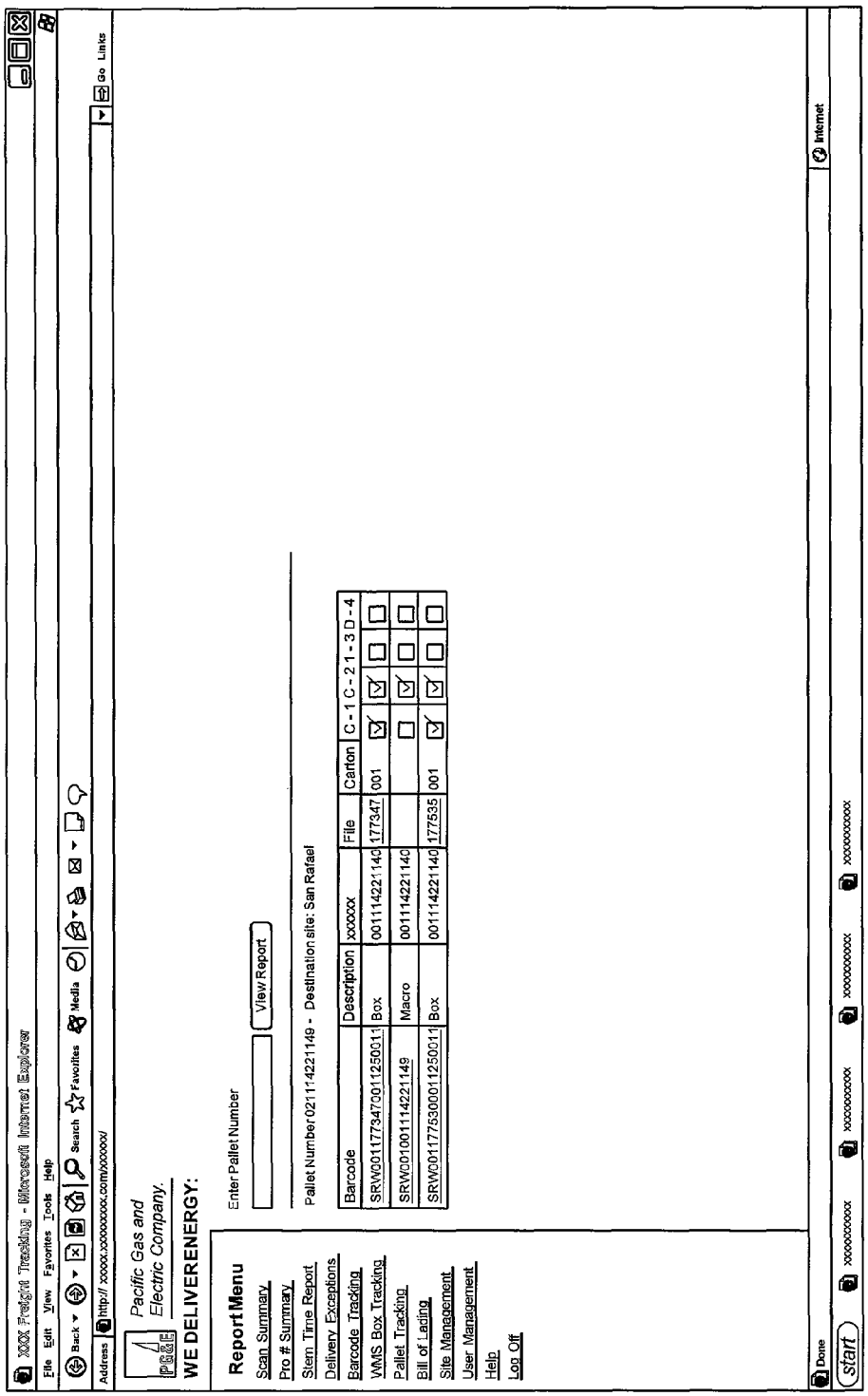
FIG. 57 is a pallet tracking report screen of the web based Distribution Center Direct reporting application according to the present invention.
Figure 58:
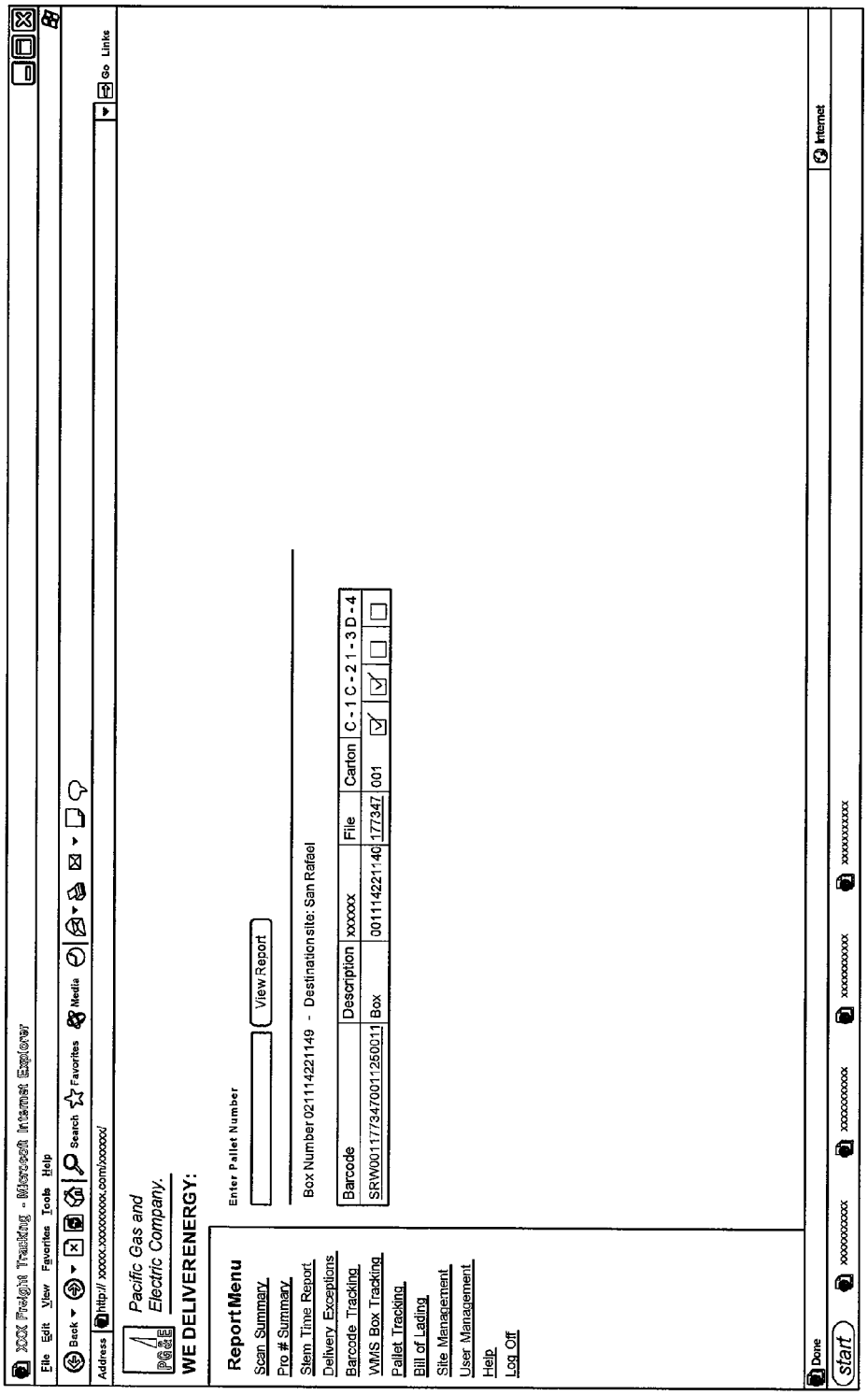
FIG. 58 is a WMS Box tracking report screen of the web based Distribution Center Direct reporting application according to the present invention.

The user can obtain a scan summary report by clicking on the scan summary menu option 5302. This will bring the user to the scan summary menu 5400 shown in FIG. 54. The user can choose the type of scan data 5402 they wish to view (pick, consolidation, delivery, etc.), enter a plant 5404 or site ID 5406, and enter a date range 5408 to frame their query. The report can also show only no-label items if the no-label box is checked 5410. The report can be returned in Microsoft Excel format if the excel report box 5410 is checked. After entering this query data and the View Report 5414 box is selected, a report 5500 is returned as shown in FIG. 55. The header of the report lists the report name 5502 and the date range of the report 5504. The report details the scanner user 5506, the scanner ID 5508, the route 5510, plant 5512, site 5514, barcode 5516, item description 5518, scan time 5520, pallet number 5522, and box number 5524. The barcode 5516, pallet 5522, and box 5524 numbers in the table are all hot linked to other reports. By clicking on the barcode number, the user is brought to the Bar Code Tracking Report shown in FIG. 56. By clicking on the Pallet Number, the user is brought to the Pallet Tracking report shown in FIG. 57. The WMS Box Tracking Report, shown in FIG. 58, is accessed by clicking on the box number in the scan summary report.

Figure 59:
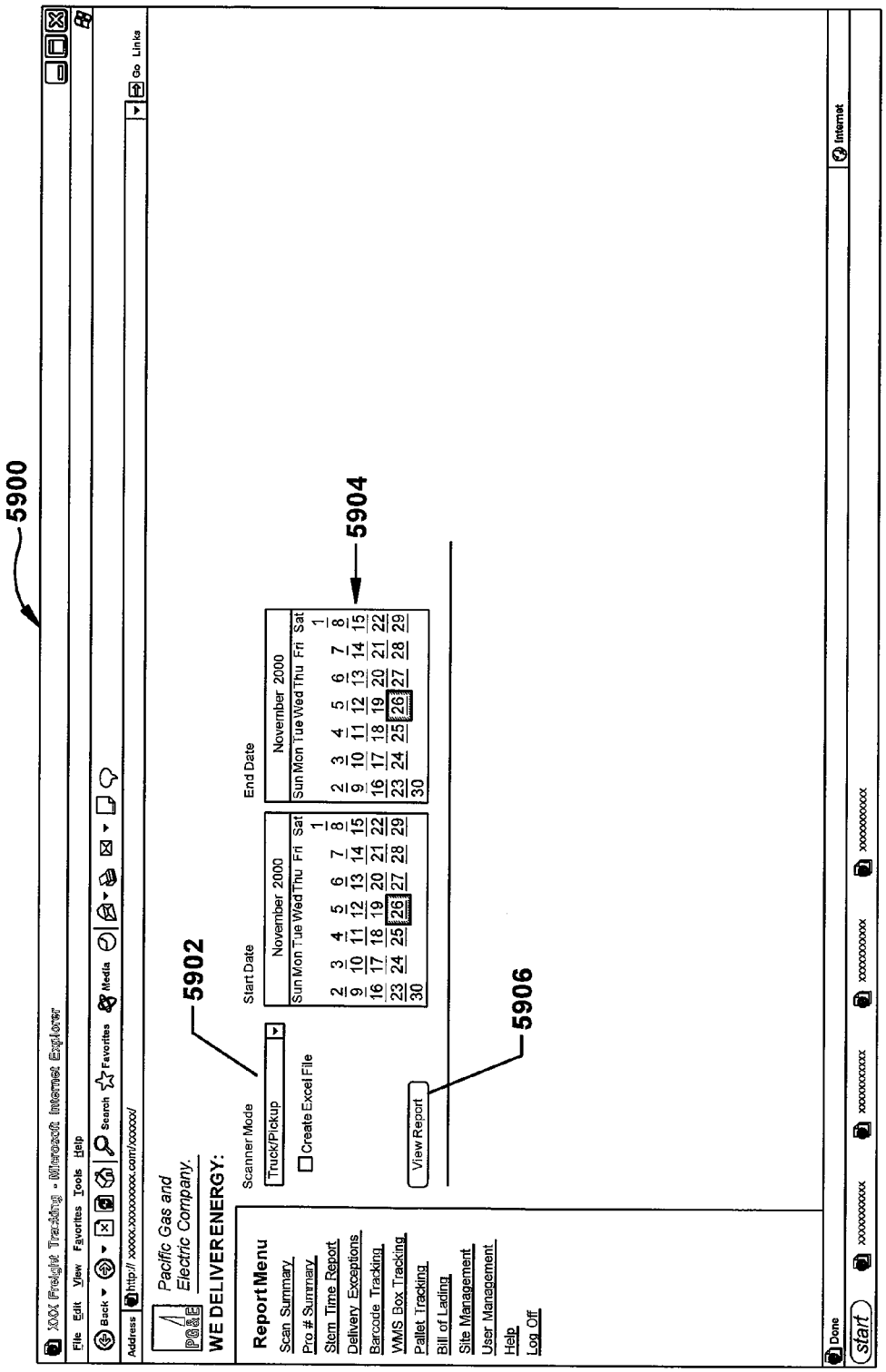
FIG. 59 is a Pro Number Report Query screen of the web based Distribution Center Direct reporting application according to the present invention.
Figure 60:
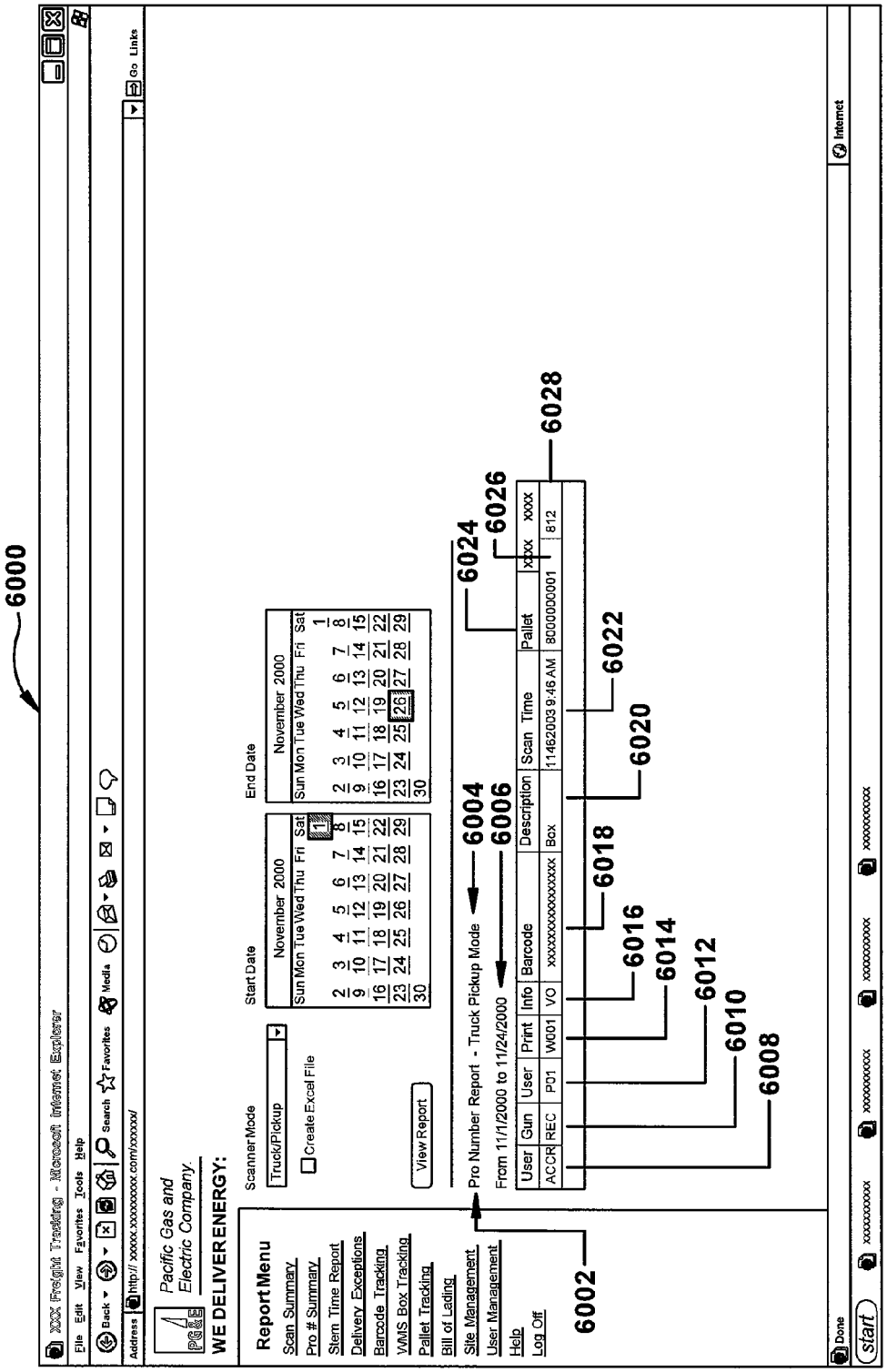
FIG. 60 is a Pro Number Summary report screen of the web based Distribution Center Direct reporting application according to the present invention.

The Pro # Summary report is used to track vendor pickups or other freight to which PRO number barcode labels are attached and can be accessed by clicking on this option 5304 from the Report Menu. This brings the user to the PRO # Report Query Screen 5900 shown in FIG. 59. Here the user selects the Scanner Mode (Truck/Pickup or Delivery) 5902, and selects a date range using the Start and End Date Calendars 5904. By clicking on the View Report button 5906, the query is run and the Pro # Summary Report 6200, shown in FIG. 60, retrieved. In the header of the report, the report name 6002 and scanner mode 6004 are listed as is the date range 6006 for which the report was run. The columns in this report are the scanner user name 6008, the scanner number 6010, the route number 6012, the plant number 6014, the site 6016, the barcode number 6018, the description of the scanned item 6020, the scan time 6022, the pallet number 6024, the box number 6026 and the tractor number 6028. The barcode number 6018 contains a hotlink to the Bar Code Tracking Report 5600.

Figure 61:
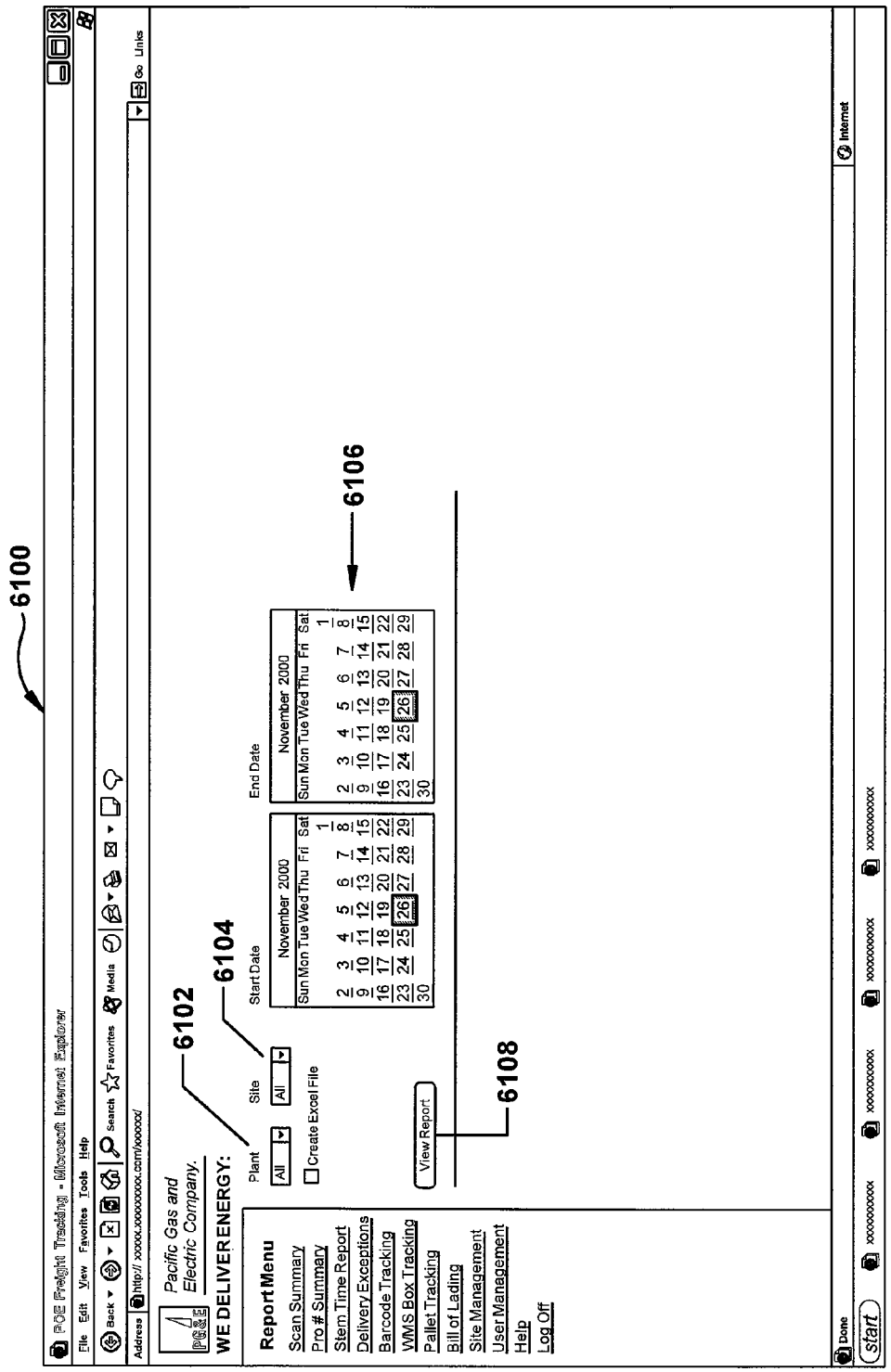
FIG. 61 is a Stem Time report query screen of the web based Distribution Center Direct reporting application according to the present invention.
Figure 62:
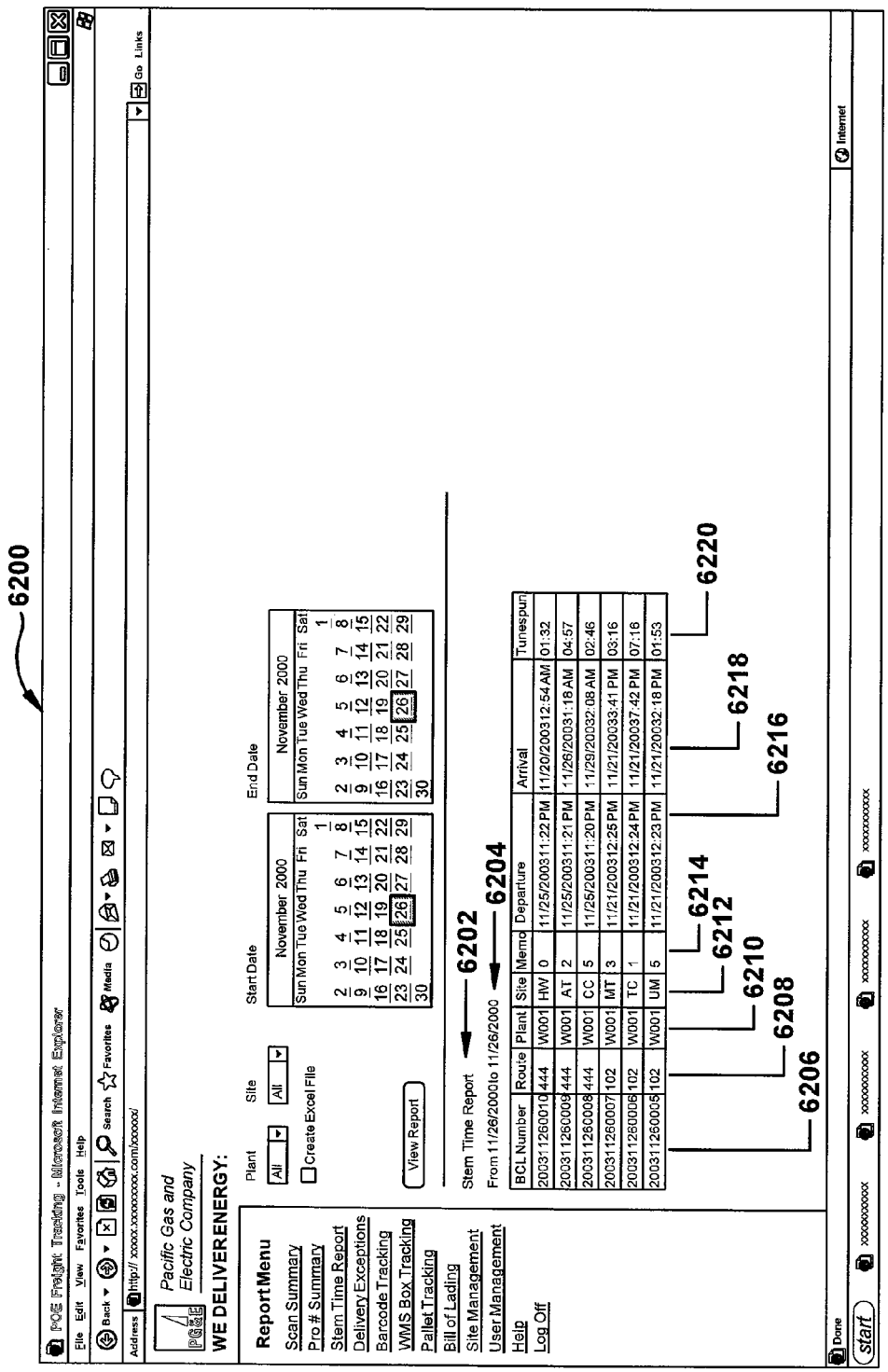
FIG. 62 is a Stem Time report screen of the web based Distribution Center Direct reporting application according to the present invention.

The Stem Time Report shows the time elapsed between when a delivery truck left the distribution center to the time a delivery is concluded. After clicking on this report option 5306 from the Report Menu, the user is brought to the Stem Time Report Query Screen 6100 shown in FIG. 61. Here the user selects the plant 6102 and site 6104 from drop down menus and clicks on a date range from the Start Date and End Date calendars 6106. Once this query is run by clicking the View Report button 6108, the Stem Time Report 6200, shown in FIG. 62, is returned. The header of the report lists the name of the report 6202 and the date range selected 6204. The report itself contains columns for the BOL number 6206, route number 6208, originating plant number 6210, delivery site 6212, number of items 6214, departure time 6216, arrival time 6418, and time span 6220. The BOL number 6206 contains a hot link that if clicked takes the user to the Bill of Lading for that particular load.

Figure 63:
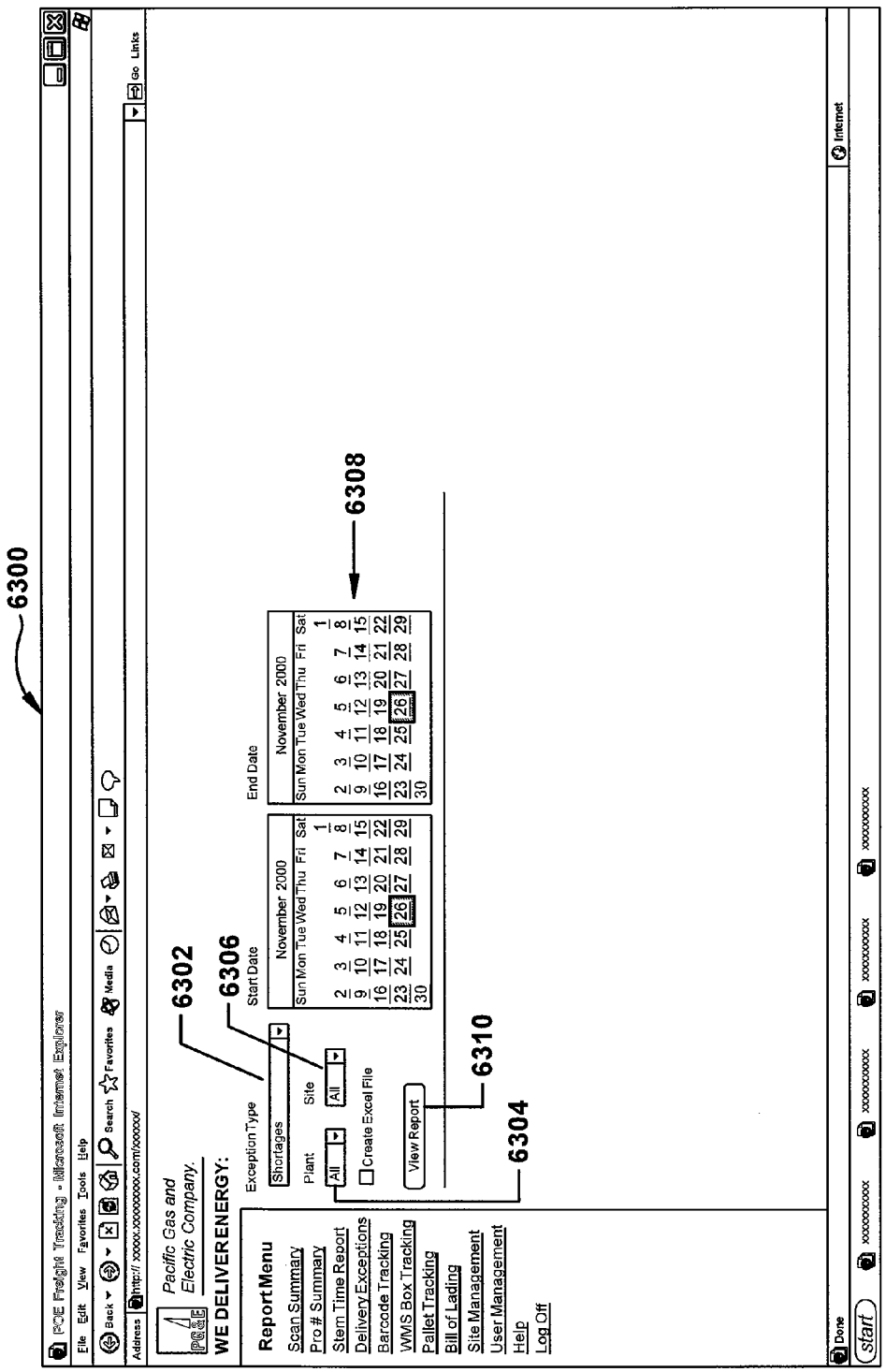
FIG. 63 is a Delivery Exception report query screen of the web based Distribution Center Direct reporting application according to the present invention.
Figure 64:
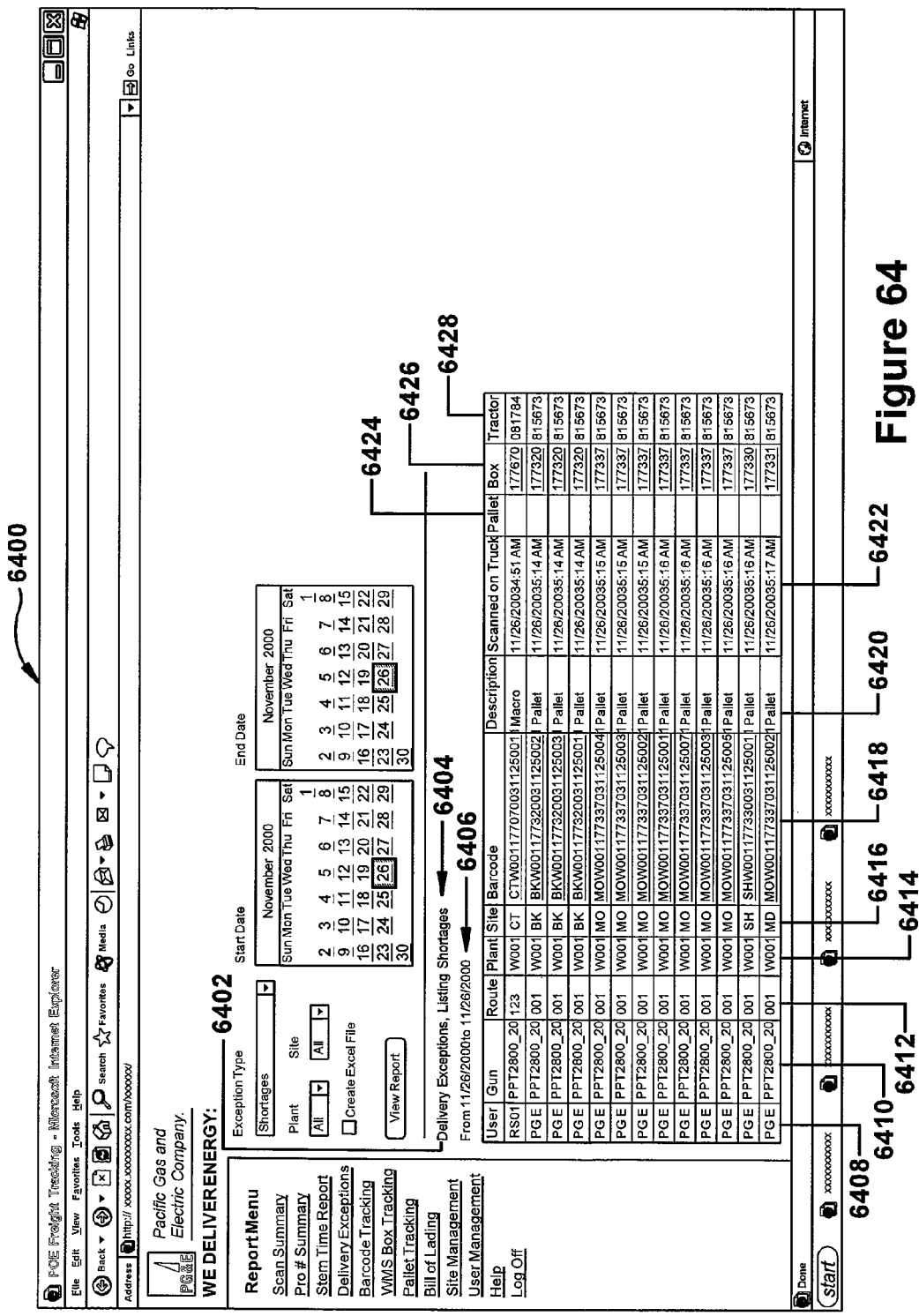
FIG. 64 is a Delivery Exception report screen of the web based Distribution Center Direct reporting application according to the present invention.

The Delivery Exceptions Report lists all items which were scanned onto a truck at the distribution center, but were not scanned at a delivery site. By clicking on this report option from the Report Menu 5308, the user is taken to the Delivery Exceptions Report Query Screen 6300 shown in FIG. 63. To return a delivery exceptions report, the user selects the exception type (shortages, overages, damages, all exceptions) 6302, the plant 6304, the site 6306, and a date range from the Start Date and End Date Calendars 6308 and clicks on the View Report button 6310. The header of the Delivery Exceptions Report 6400 shown in FIG. 64 provides the name of the report 6402 and exception type queried 6404 along with the date range selected 6406. The columns in the report are the scanner user 6408, the scan gun number 6410, the route number 6412, the originating plant 6414, the delivery site 6416, the barcode number 6418, a description of the item 6420, the date and time that the item was scanned onto the delivery truck at the distribution center 6422, the pallet number 6424, the box number 6426, and the tractor number 6428. Numbers in the barcode, pallet and box columns contain hotlinks. Clicking on the barcode number 6418 takes the user to the Barcode Tracking Report 5600. Clicking on the pallet number 6424 takes the user to the Pallet Tracking Report 7000. The WMS Box Tracking Report 6800 is accessed if the Box number 6426 is clicked.

Figure 65:
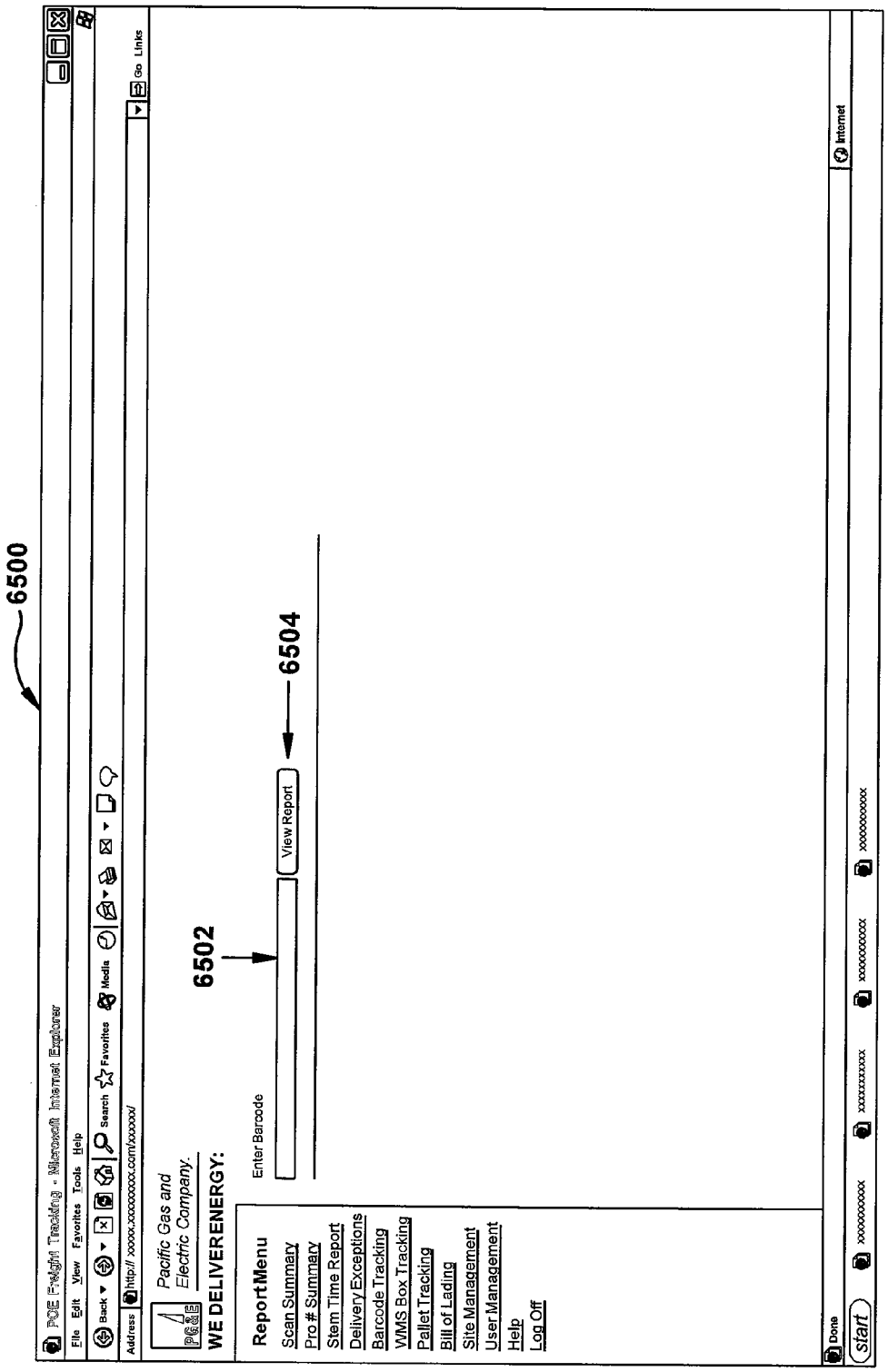
FIG. 65 is a Barcode tracking report query screen of the web based Distribution Center Direct reporting application according to the present invention.
Figure 66:
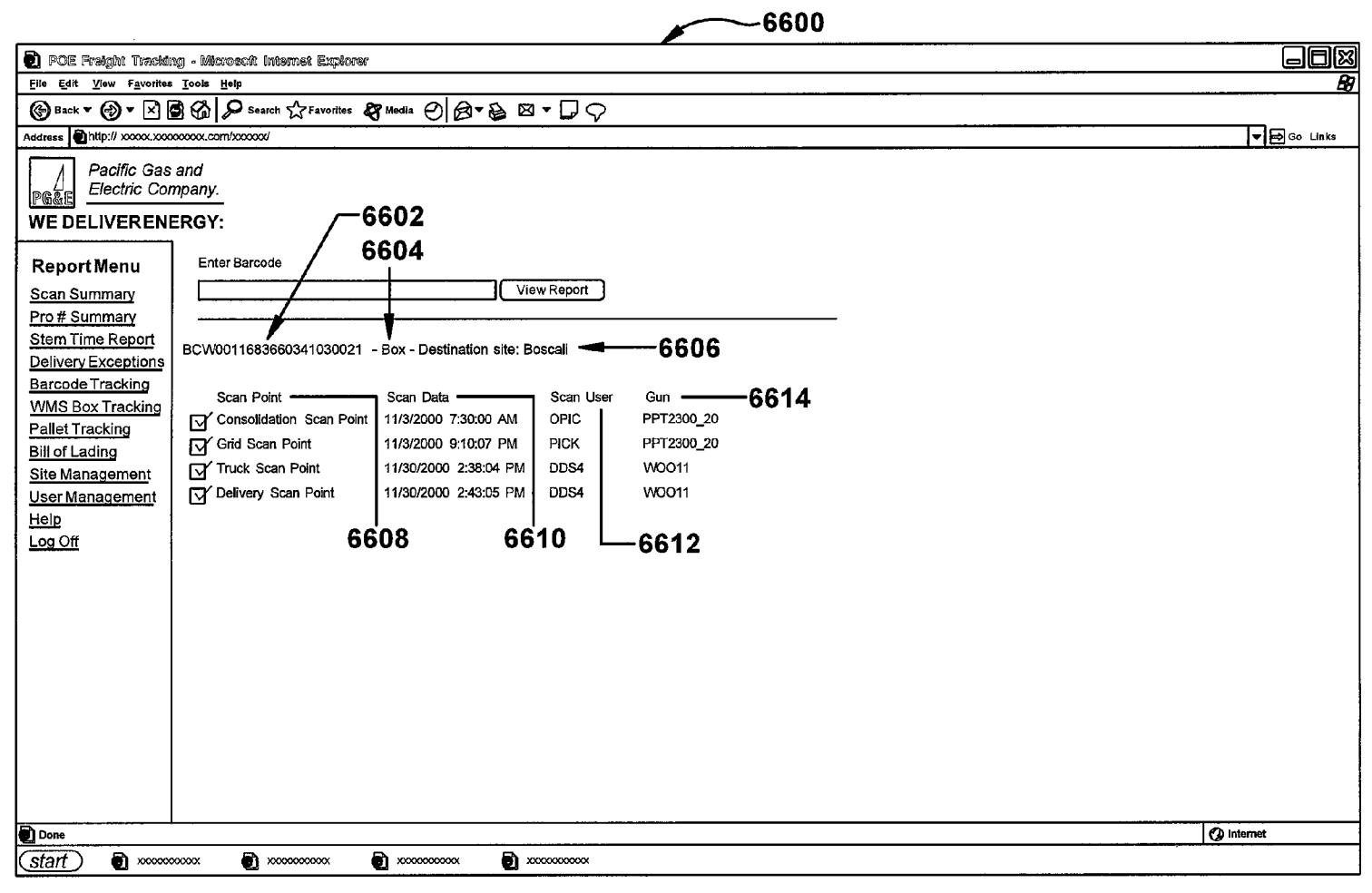

The user can track individual items that have been scanned and obtain a scan history by clicking on the barcode tracking menu option 5310. This will bring the user to the barcode tracking query menu 6500 shown in FIG. 65. The user enters a barcode number 6502 on this screen and clicks the view report button 6504. This brings the user to the screen 6600 shown in FIG. 66. The header of this report lists the barcode number 6602, the item type 6604, and the destination site 6606. The columns in this report are the scan point 6608, the scan date and time 6610, the scan user 6612 and the scan gun ID 6614. A check mark in the box to the left of the Scan Point column indicates that scan data for that mode has been received.

Figure 67:
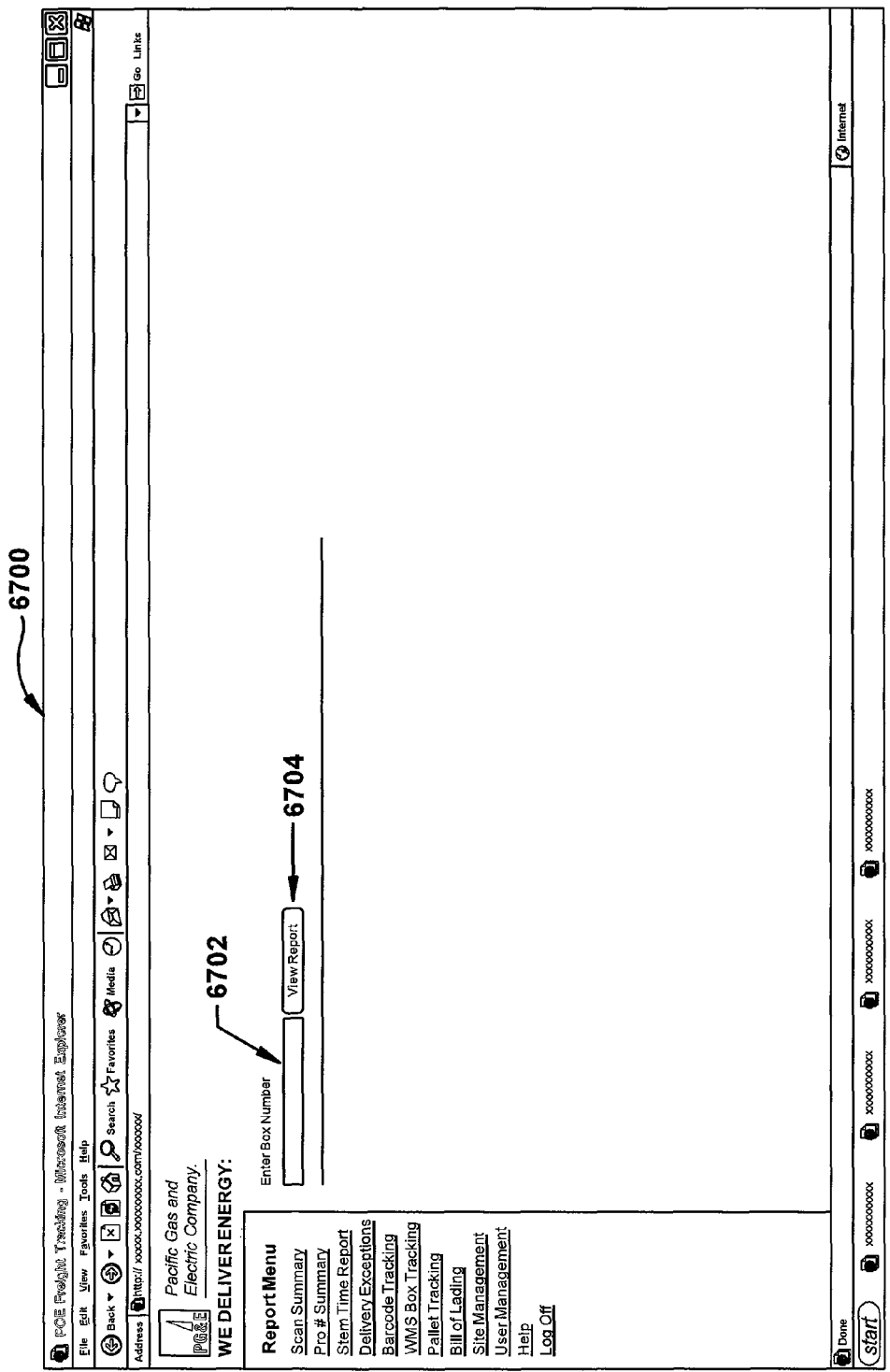
FIG. 67 is a WMS Box tracking report query screen of the web based Distribution Center Direct reporting application according to the present invention.
Figure 68:
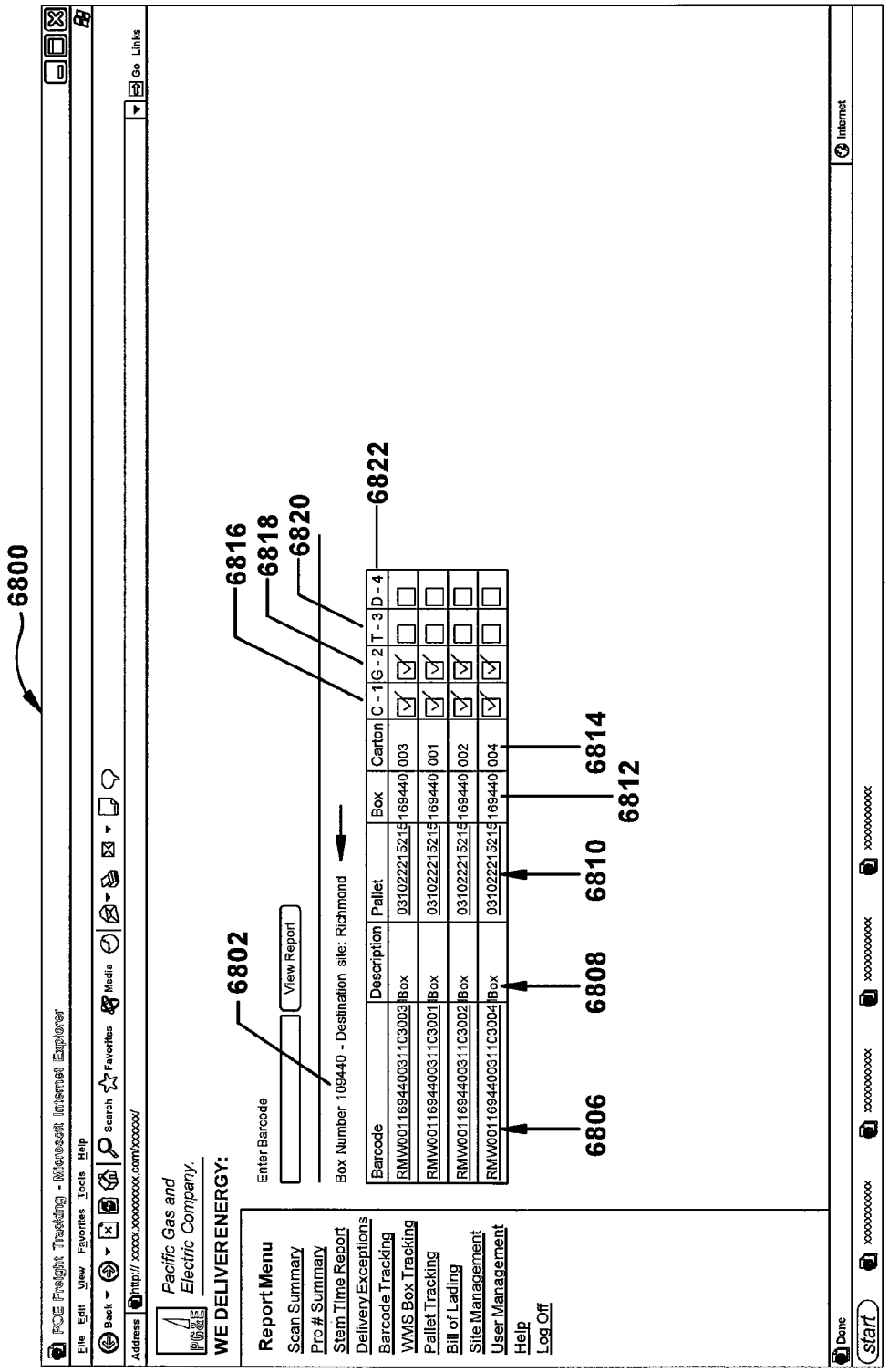
FIG. 68 is a WMS Box tracking report screen of the web based Distribution Center Direct reporting application according to the present invention.

The user can track individual items that a shipper groups into individual shipments at the shipment, container, box or bill of lading level. This is referred to as "WMS box tracking" (and is also referred to as "trip," "trailer" or "load" tracking) and these reports can be accessed by clicking on the WMS box tracking menu option 5312. This will bring the user to the WMS box tracking query menu 6700 shown in FIG. 67. The user enters a WMS box number 6902 on this screen and clicks the view report button 6704. This brings the user to the WMS Box Tracking Report 6800 shown in FIG. 68 which details all items that are grouped by a shipper together at the bill of lading or box level. The header of this report lists the box number queried 6802 and the destination site 6804. The columns in the report are the barcode number 6806, the description of the item scanned 6808, the pallet number 6810, box number 6812, the carton number 6814, and whether it was scanned in the consolidation 6816, grid 6818, truck 6820 and delivery scan 6822 modes. Hotlinks are provided for the barcode 6806 and pallet numbers 6810 to the Barcode Tracking Report 5600 and the Pallet Tracking Report 7000.

Figure 69:
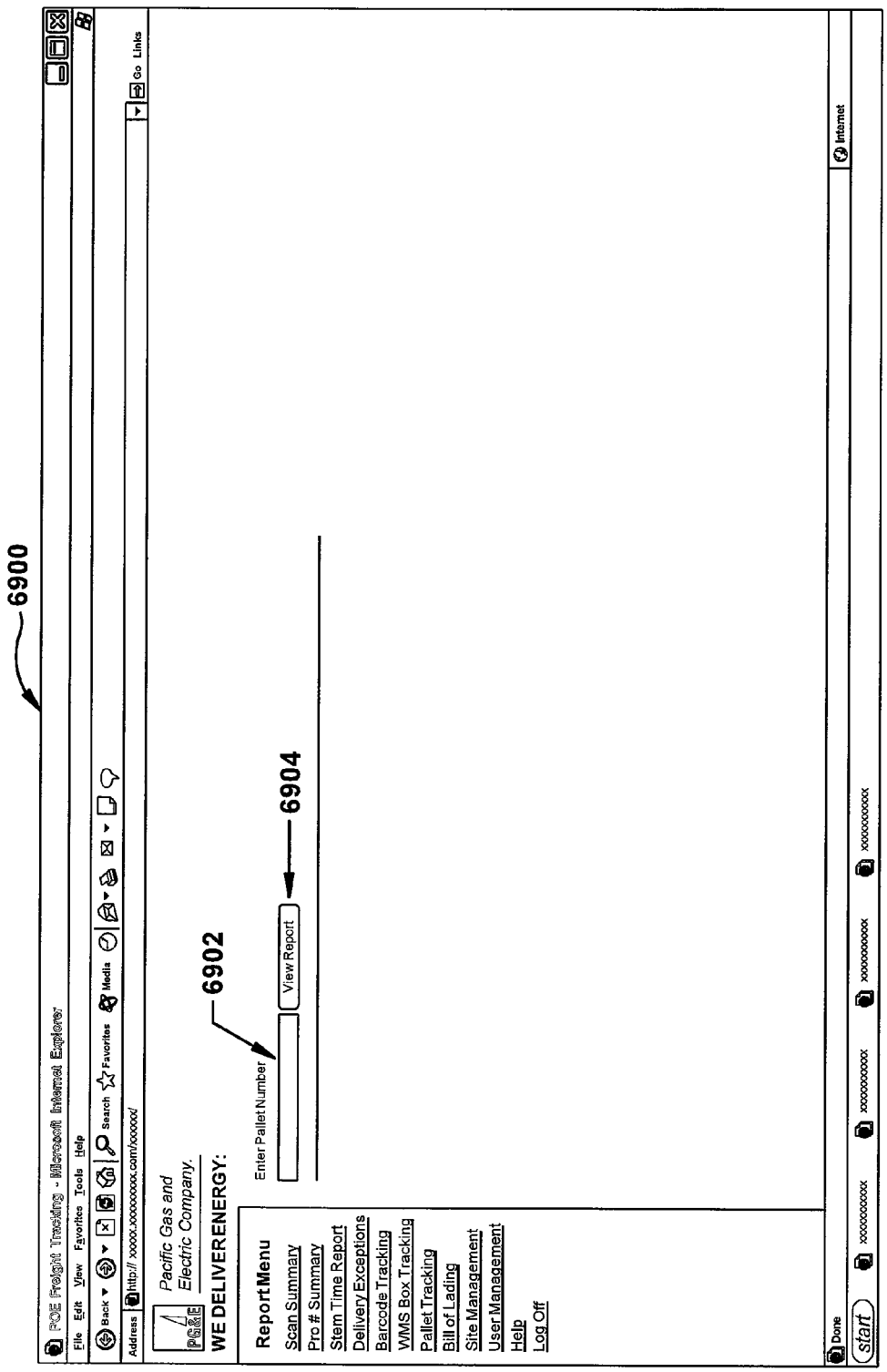
FIG. 69 is a Pallet tracking report query screen of the web based Distribution Center Direct reporting application according to the present invention.
Figure 70:
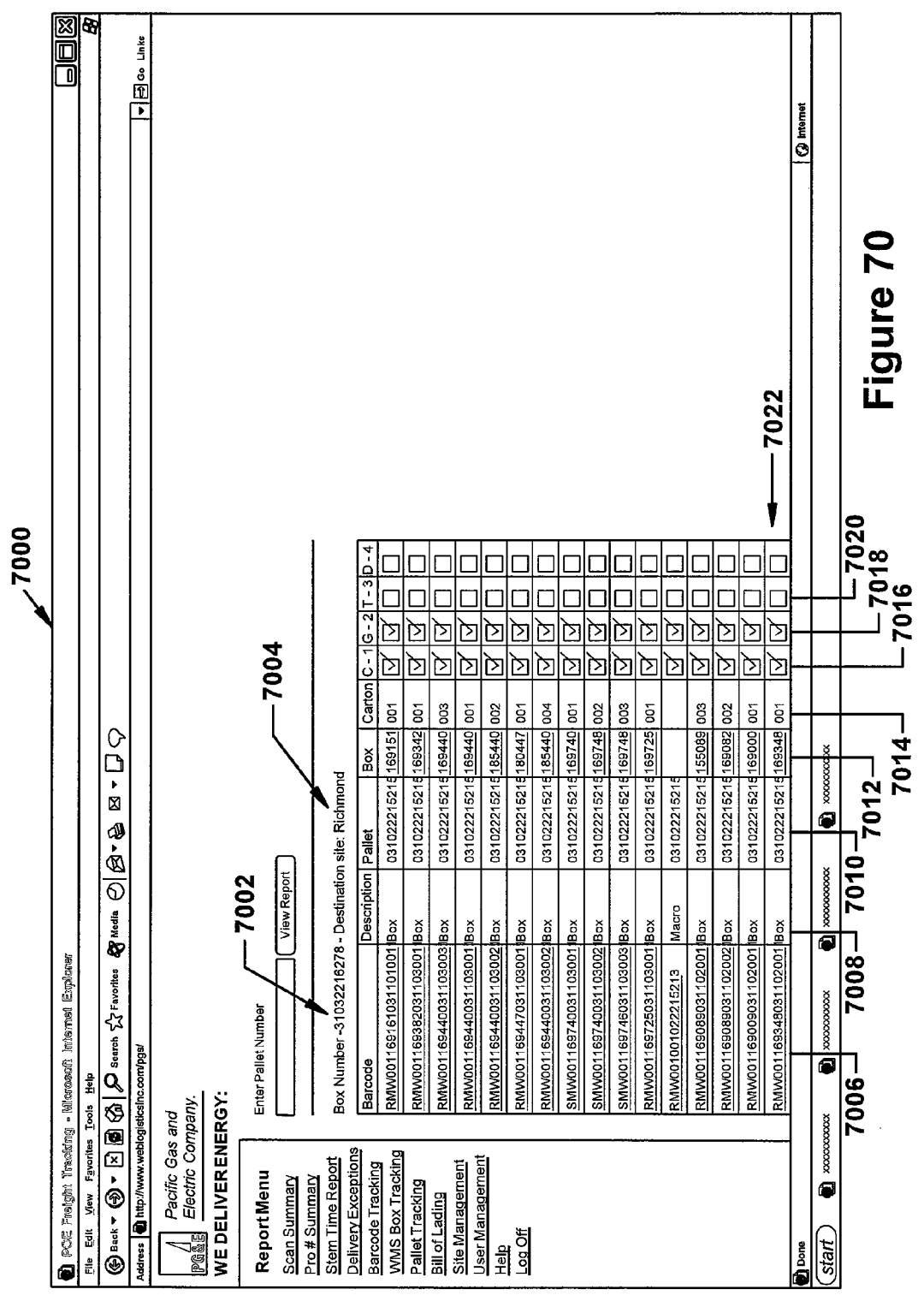

The user can track individual items that a shipper groups onto pallets or into containers. This is referred to as "pallet tracking" and these reports can be accessed by clicking on the Pallet tracking menu option 5314. This will bring the user to the pallet tracking query menu 6900 shown in FIG. 69. The user enters a pallet number 6902 on this screen and clicks the view report button 6904. This brings the user to the Pallet Tracking Report 7000 screen shown in FIG. 70. The header of this report lists the pallet number 7002 and the destination site 7004. The column headings are the barcode numbers of the items scanned onto the pallet 7006, the description of the scanned item 7008, the pallet number 7010, the box number 7012, the carton number 7014, and whether the pallet was scanned in the consolidation 7016, grid 7018, truck 7020 and delivery 7022 scan modes. Hotlinks are provided for the barcode 7006 and box number 7012 to the Barcode Tracking Report 5800 and the WMS Box Tracking Report 6800.

Figure 71:
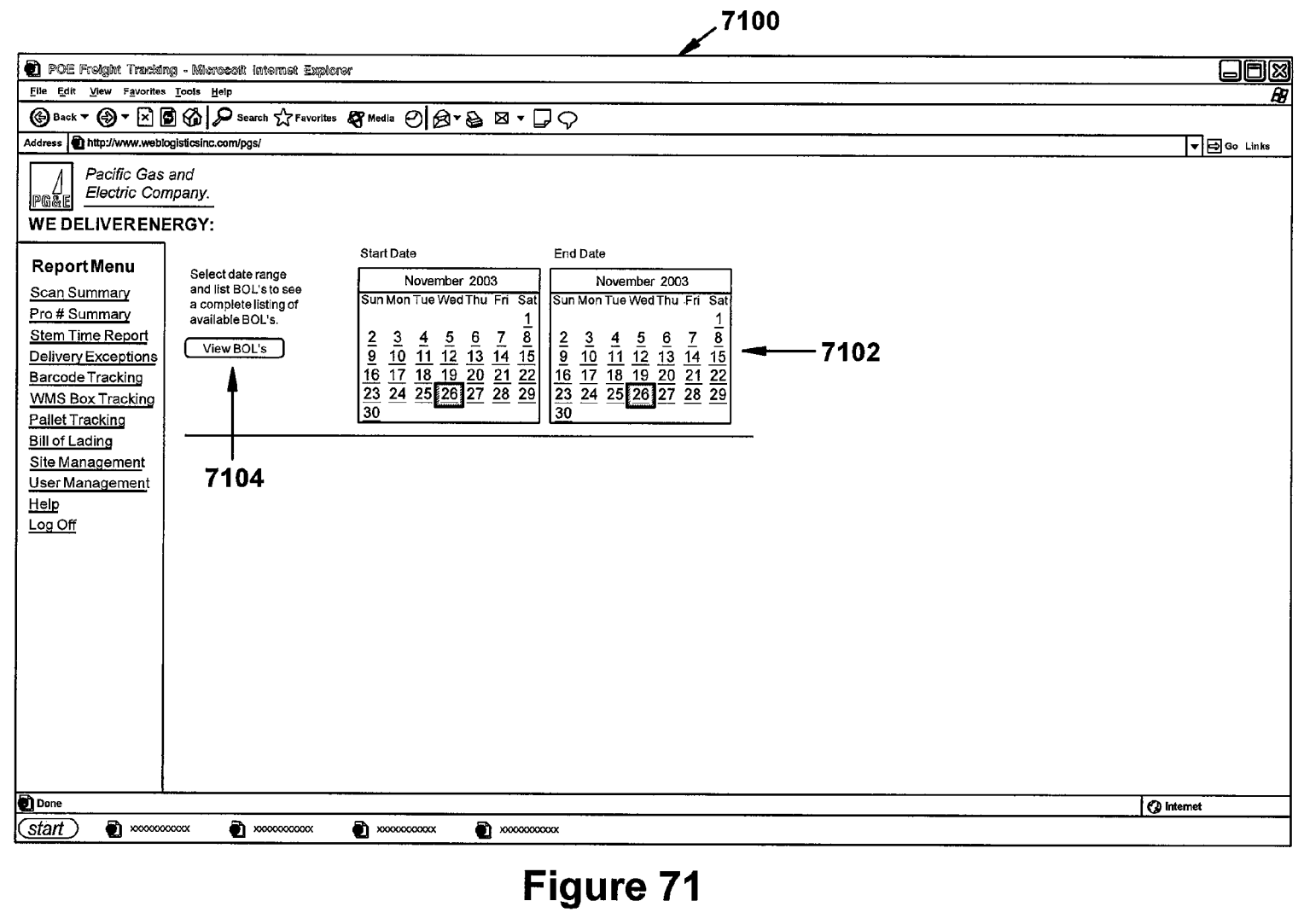
Figure 72:
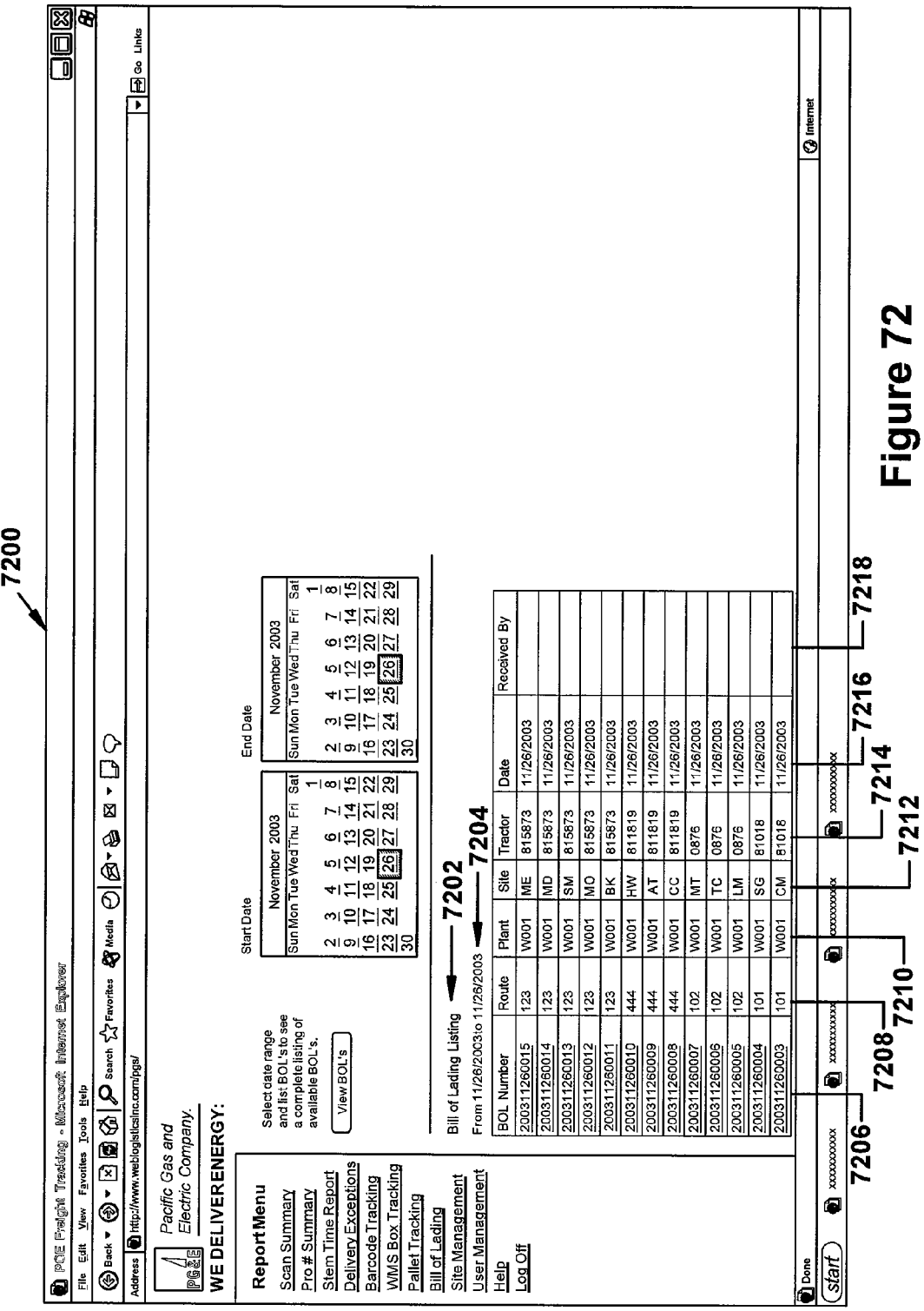
FIG. 72 is the Bill of Lading listing screen of the web based Distribution Center Direct reporting application according to the present invention.

The Bill of Lading menu option 5316 is used to create bills of lading after items are scanned onto a truck at the distribution center. After clicking on the Bill of Lading menu option 5316 from the Reports Menu, the user is brought to the Bill of Lading Query Menu 7100 as shown in FIG. 71. Here the user simply selects a date range 7102 and clicks the View BOL's button 7104. The user is then brought to a list of bills of lading which can be printed as shown in FIG. 72. The header of this report list the name of the report 7202 and the date range selected 7204. The user can select the bill of lading to be printed by reviewing the BOL number 7206, route 7208, originating plant number 7210, delivery site code 7212, tractor number 7214, date scanned onto the truck 7216, or the received by 7218 information on the report. By clicking on the hotlink BOL number 7206, the user is brought to the bill of lading shown in FIG. 73 which can be used by the driver when making the delivery.

The bill of lading contains the name of the carrier 7302, the BOL number 7304, the address of the originating distribution center 7306, the BOL print date 7308, the name and address of the site to which the load is to be delivered 7310, a description of the items loaded on the truck to be delivered by type of item 7312, the barcode number 7314, pallet number (if any) 7316, box number 7318, and carton number 7320. At the bottom of the bill of lading is an area for the consignee to sign for the goods received 7322. Below the list of goods shipped, is an area listing the shipper 7322, the carrier 7324, and boxes to enter the carrier vendor number 7326, prepared by 7328, the shipper's phone number 7330, the driver name 7332, and consignee signature 7334.

Figure 74:
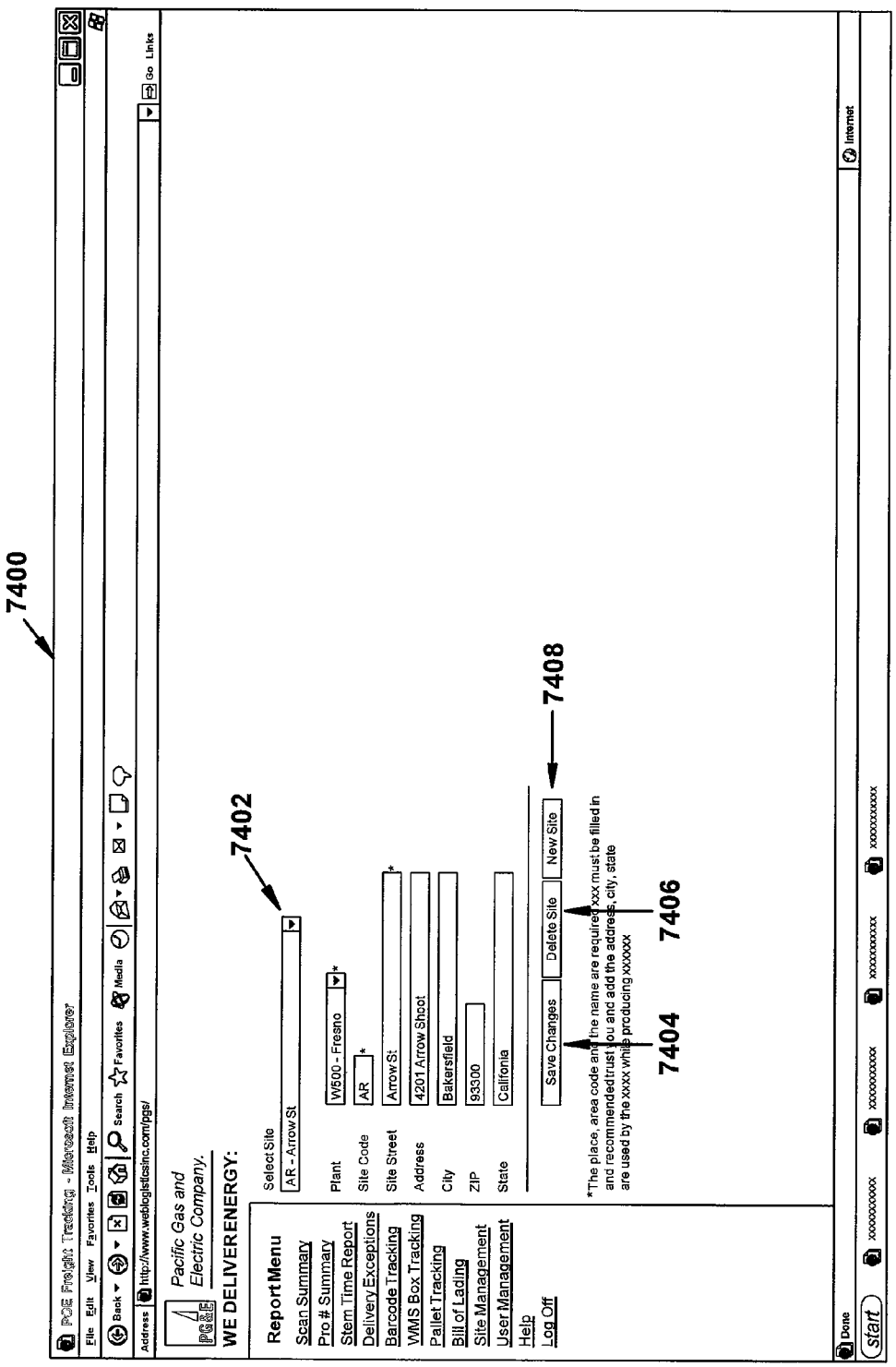
FIG. 74 is a Site Management screen of the web based Distribution Center Direct reporting application according to the present invention.

The web based reporting system also includes site management tools. The Site Management tool is accessed by clicking on the Site Management Menu option 5318 on the Report Menu 5300. Once this menu option is accessed, the user is brought to the Site Management screen 7400 shown in FIG. 74. This tool allows the user to edit delivery sites and their corresponding addresses and other information by selecting one from the pull down menu 7402. The user can then save the changes 7404, delete a site 7406 or add a new one 7408.

Figure 75:
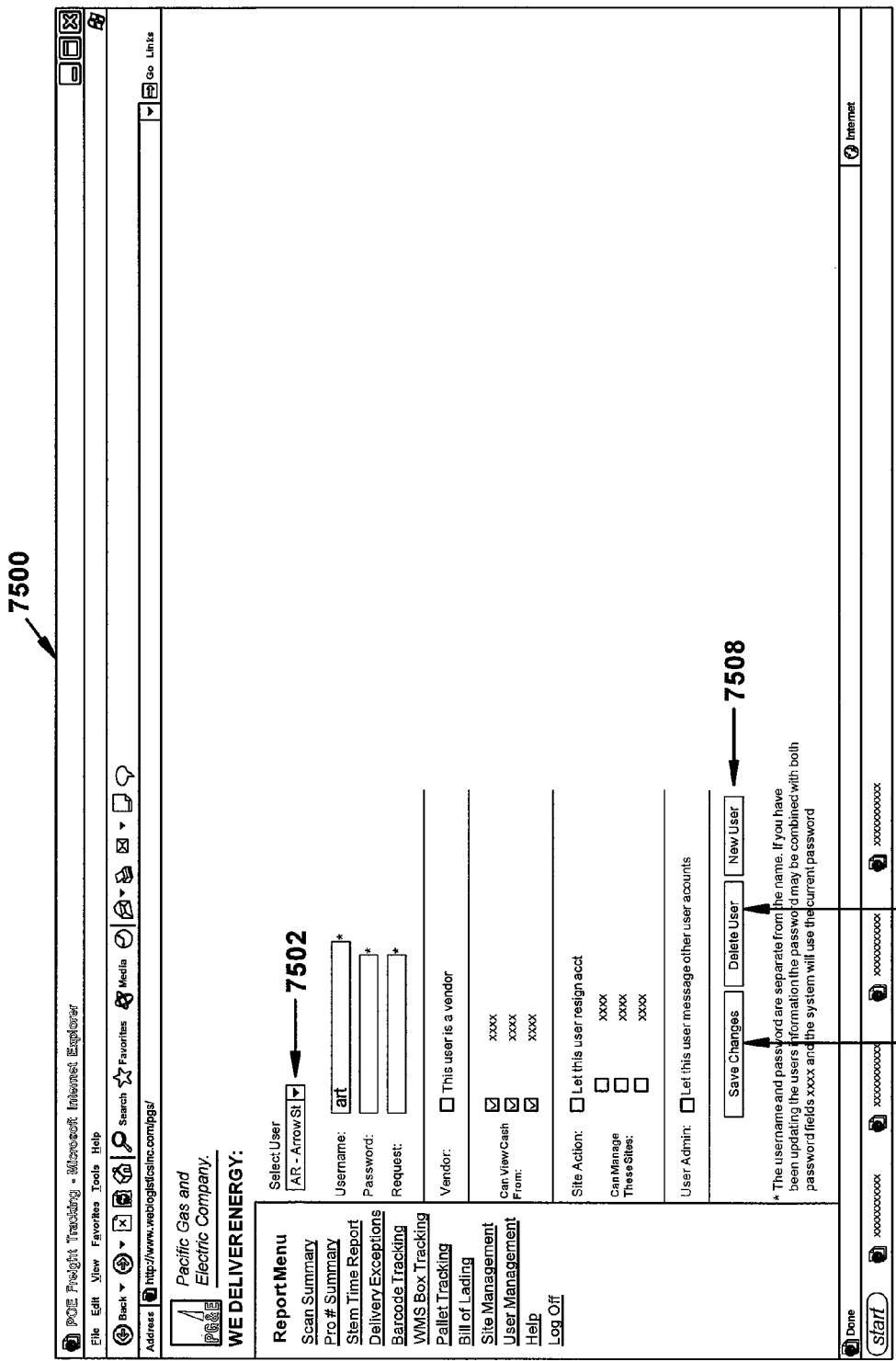
FIG. 75 is a User Management screen of the web based Distribution Center Direct reporting application according to the present invention.

The User Management tool is accessed by clicking on the User Management Menu option 5320 on the Report Menu 5300. Once this menu option is accessed, the user is brought to the User Management screen 7500 shown in FIG. 75. This tool allows the user to edit users their corresponding user names, passsword and permissions by selecting one from the pull down menu 7502. The user can then save the changes 7504, delete a site 7506 or add a new one 7508.

The Help menu option 5322, if clicked, will take the user to online user documentation which can be either reviewed on line or printed on a local printer.

Pool Distribution Reports

Figure 76:
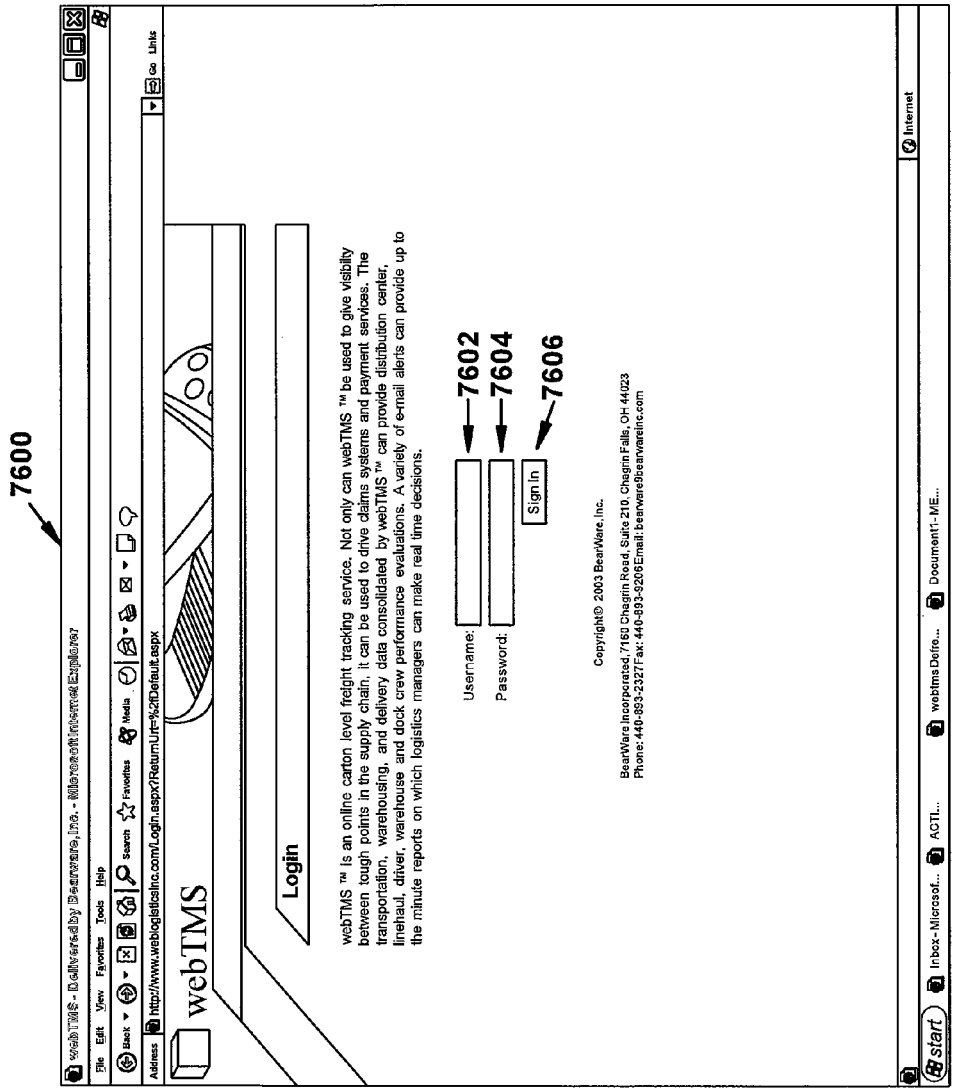
FIG. 76 is a Login screen of the web based Pool Distribution reporting application according to the present invention.

After entering in the correct web address in their internet browser application, the user is brought to the login screen 7600 shown in FIG. 76. At this screen, the user types in their user name 7602 and password 7604 and then presses enter or moves their curser and clicks on the sign in button 7606.

Figure 77:
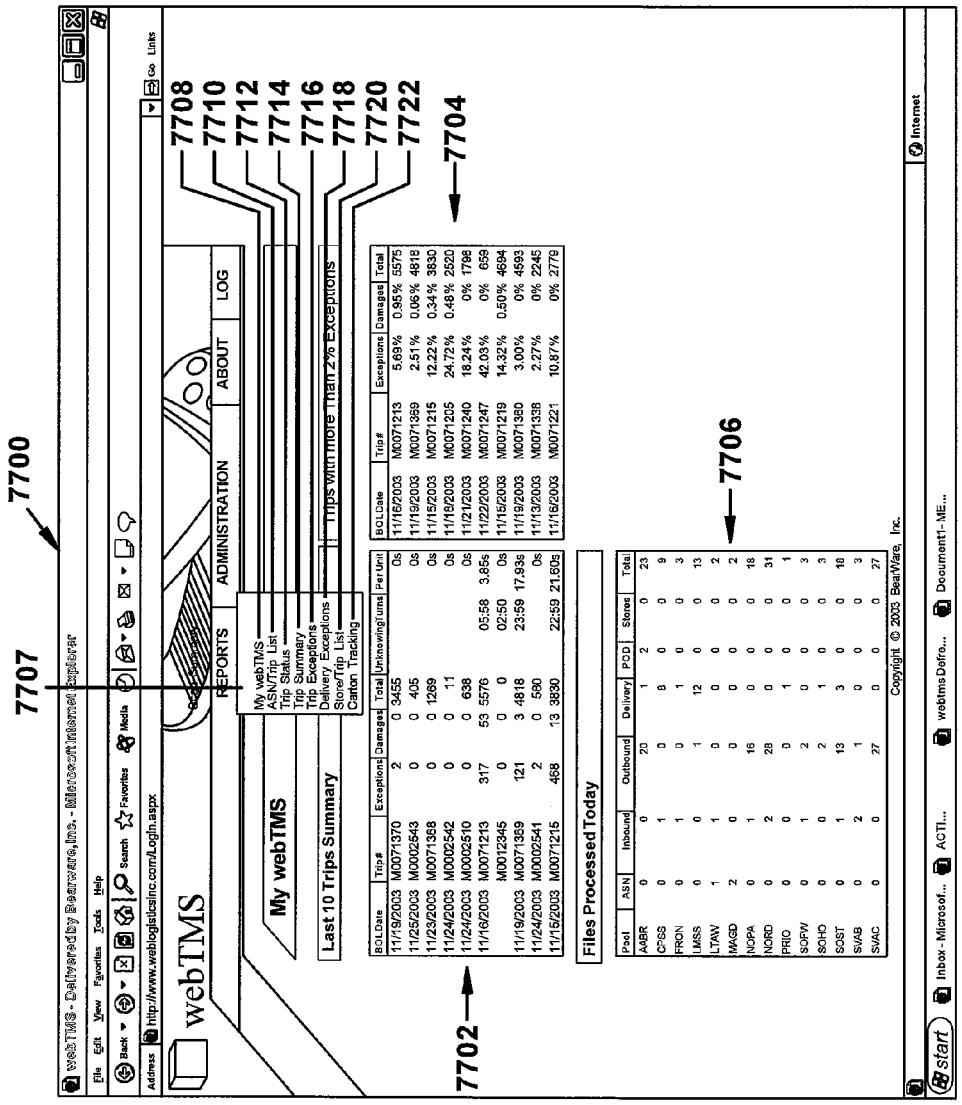
FIG. 77 is a My WebTMS screen of the web based Pool Distribution reporting application according to the present invention.

After signing in the user is brought to the My webTMS screen 7700 shown in FIG. 77. This screen shows summary report information such as a summary of the last ten trips 7702, trips with more than 2% exceptions 7704, and files processed by the web service 7706. The My webTMS screen is customizable by user.

Reports are accessed by the user by selecting the desired report from the pull down reports menu 7707. The available reports found in the pull down reports menu are the ASN/Trip List 7708, Trip Status 7710, Trip Summary 7712, Trip Exceptions 7714, Delivery Exceptions 7716, Scan Summary 7718, Store/Trip List 7720, and Carton Tracking 7722.

Figure 78:
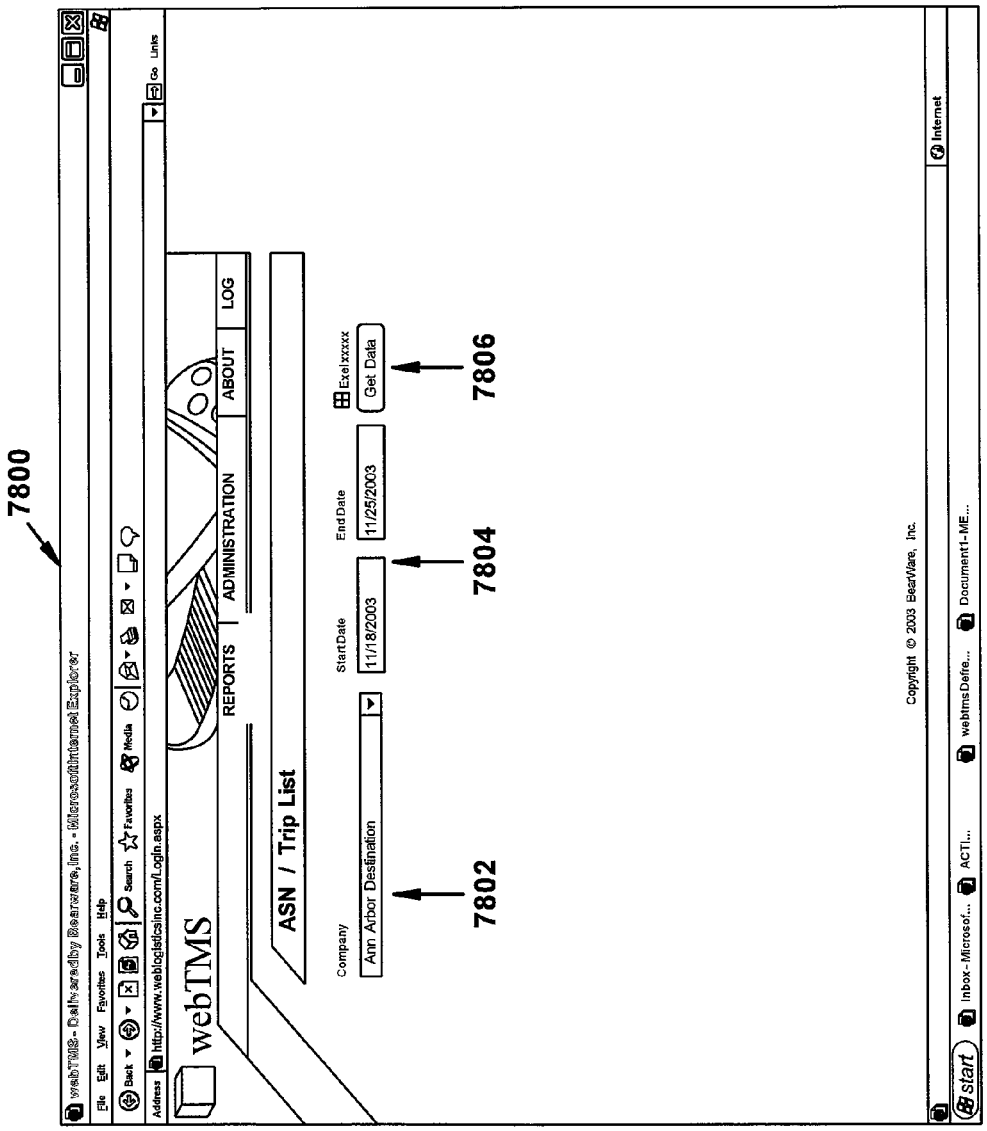
FIG. 78 is a ASN/Trip List query screen of the web based Pool Distribution reporting application according to the present invention.

By selecting the ASN/Trip List item 7708 from the Reports drop down menu 7707, the user is brought to the ASN/Trip List selection screen 7800 shown in FIG. 78. Here the user selects the shipper or pool distributor 7802, and a date range 7804 and then clicks on the Get Data button 7806. This sends a query to the web database to display a list of all inbound shipments to a particular pool distributor or by a particular shipper for a specific period of time. If the user would like the ASN/Trip list returned in Excel spreadsheet format, the user would click on the Excel format button 7808.

Figure 79:
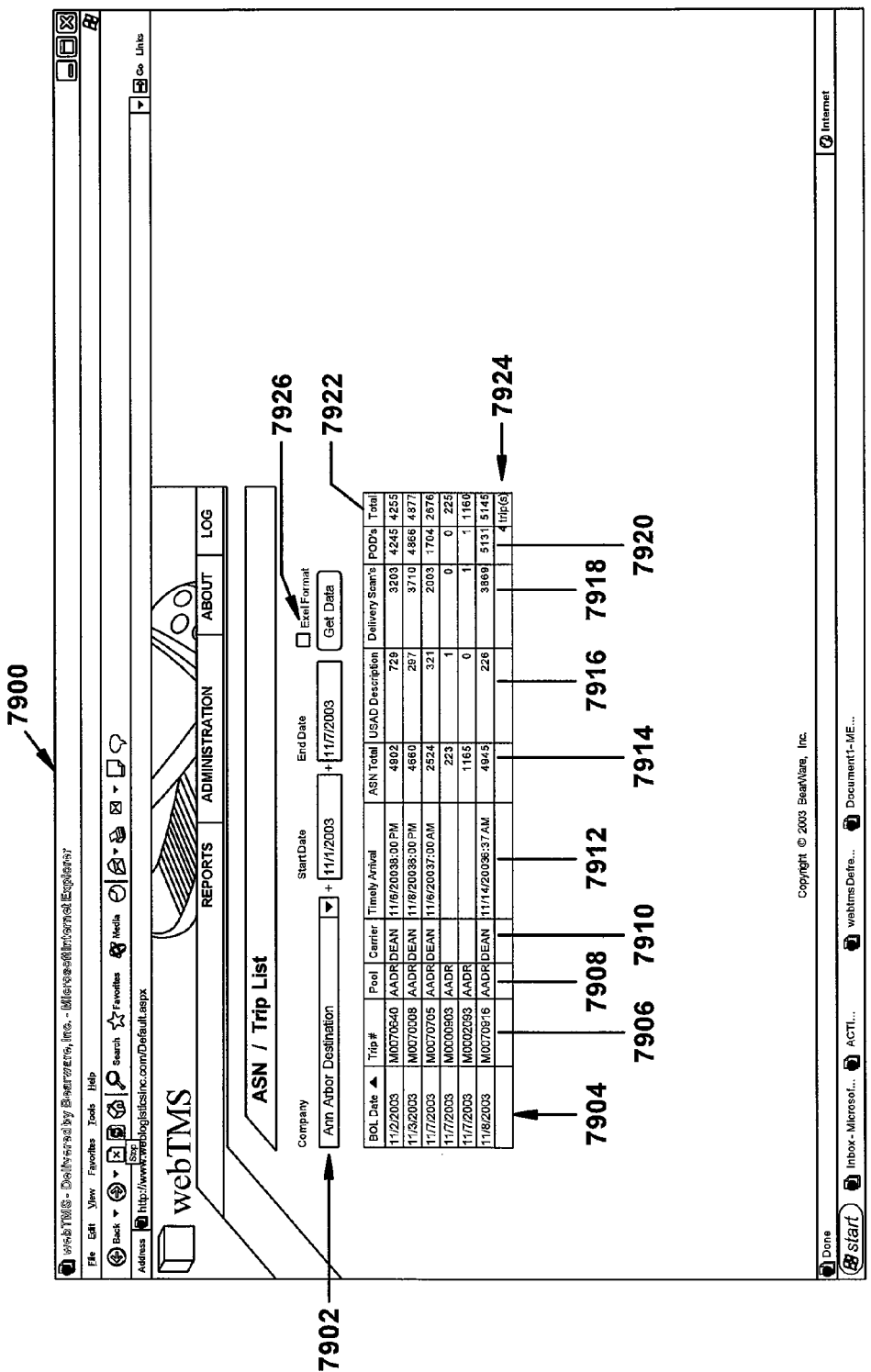
FIG. 79 is a ASN/Trip List report screen of the web based Pool Distribution reporting application according to the present invention.

Once the query has been retrieved, the ASN/Trip List 7900 is displayed as shown in FIG. 79. The header of the report 7902 lists the query parameters: the pool distributor and date range. The ASN/Trip List is made up of the following columns: BOL Date 7904, Trip Number 7906, Pool 7908, Carrier 7910, Trailer Arrival 7912, ASN Total 7914, OS&D Exceptions 7916, Delivery Scans 7918, Proof of Deliveries ("POD's") 8120, and Total 7922. The report also lists the total number of records returned by the query 7924. The BOL Date 7904 is the date that an ASN transmission was sent by a shipper and received by the web database. The Trip Number 7906 is a unique number assigned to a specific aggregation of freight which is loaded on a trailer for a specific pool distributor. The Pool column 7908 contains a four letter unique designation for a specific pool distributor. Carrier 7910 refers to the trucking company bringing the freight from the shipper to the pool distributor. The date and time contained in the Trailer Arrival column 7912 is the date and time the trailer from the shipper was received by the pool distributor. ASN Total 7914 is the total number of pieces of freight that a shipper believes is being sent to a pool distributor for store delivery. OS&D Exceptions 7916 refers to "overs, shorts, and damages." Overs refer to cartons received by the pool which were not in the ASN; cartons which the shipper did not know that it sent to the pool distributor. Shorts refer to cartons that were in the ASN, but were not received by the pool distributor. Damages refer to cartons that were damaged in some way upon receipt at the pool distributor. The number in the OS&D Exceptions column is a total of all overs, shorts and damages for a particular trip. Delivery Scans 7918 refer to the total number of cartons in a particular trip that were scanned at delivery. POD's 7920 refer to the total number of cartons in a particular trip that were verified received by the pool distributor. By selecting the Excel Format box 7926, the user can have the ASN/Trip List downloaded as an Excel spreadsheet.

There are a number of "hot links" on the ASN/Trip List which take the user directly to other reports if selected. By clicking on a date in the BOL Date column 7904, the user is brought to the Trip Status report for that trip. By clicking on a trip number in the Trip # column 7906, the user is brought to the Trip Summary report for that trip. By clicking on the number in the OS&D Exceptions column 7916, the user is brought to the Trip Exceptions report for that trip. By clicking on a number in the Total column 7922, the user is brought to the Scan Summary Report for that trip.

Figure 80:
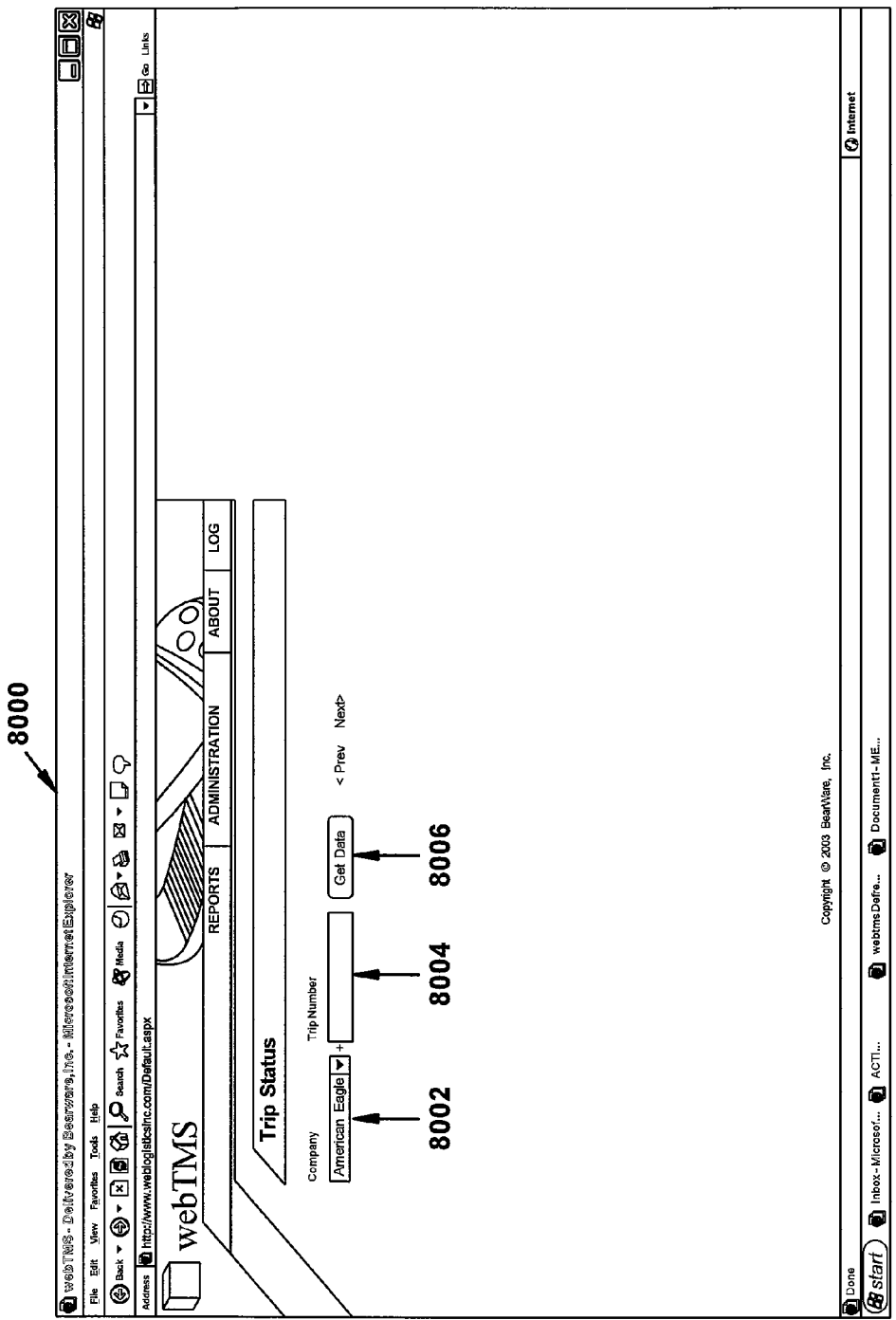
FIG. 80 is a Trip Status report query screen of the web based Pool Distribution reporting application according to the present invention.

The Trip Status Report can be accessed by selecting the Trip Status Report option 7710 from the Reports Menu 7707. This brings the user to the Trip Status Report query screen 8000 shown in FIG. 80. Here the user selects the company from a pull down list 8002 and enters the trip number 8004 and then clicks on the Get Data button 8006. The user is then brought to the Trip Status Report 8100.

Figure 81:
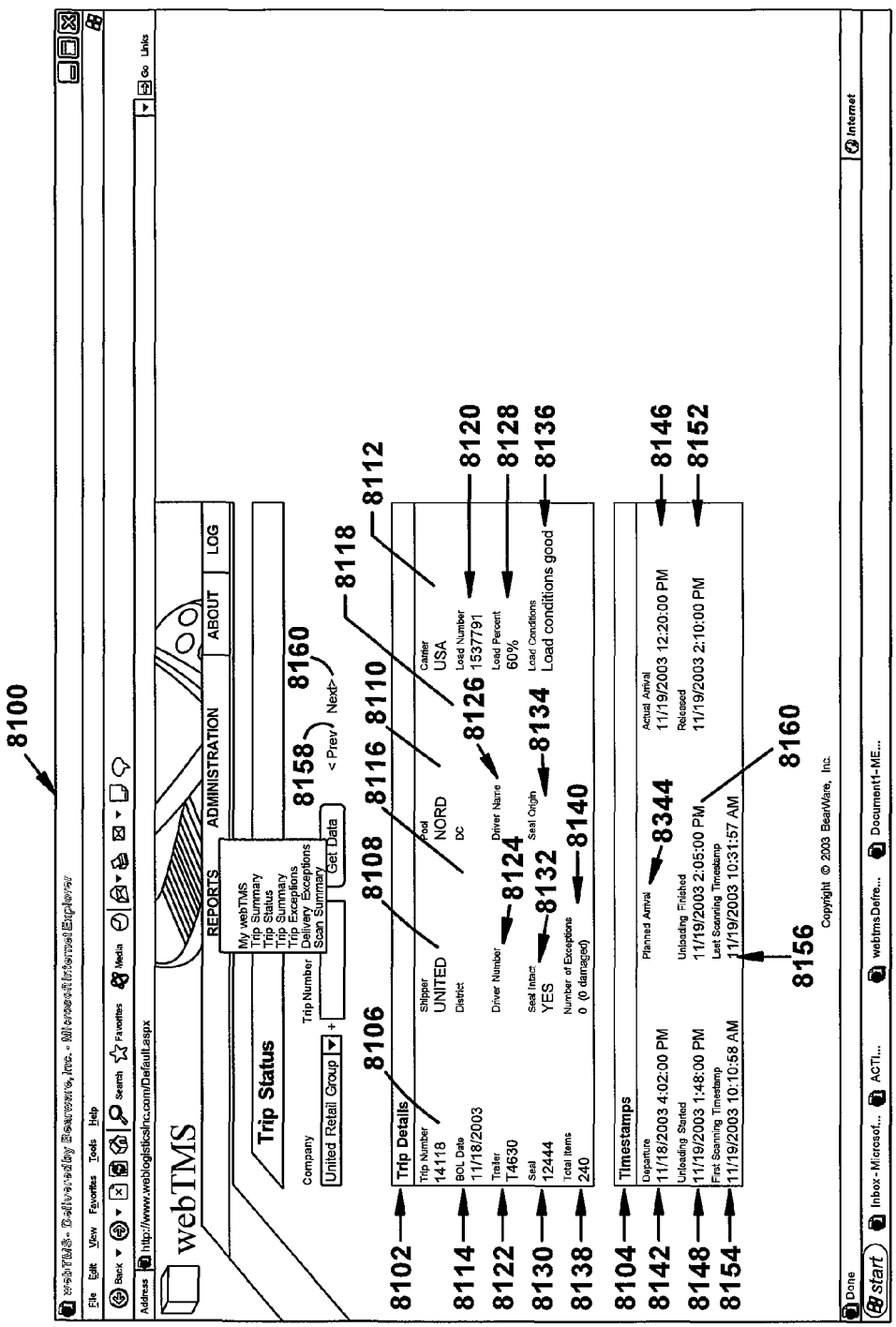
FIG. 81 is a Trip Status report screen of the web based Pool Distribution reporting application according to the present invention.

The Trip Status Report shown in FIG. 81 consists of two parts: Trip Details 8102 and Timestamps 8104. The Trip Details section 8102 gives information on the load as received by the pool distributor. The Timestamps section 8104 lists the date and time of various events relating to a particular trip. The Trip Details section of the Trip Status Report displays the trip number 8106, the shipper 8108, the pool distributor 8110, the carrier who brought the freight from the shipper to the pool distributor 8112, the BOL Date 8114, the District 8116 and Distribution Center (DC) 8118, the load number 8120, the trailer number 8122, the Driver Number 8124 and Name of the driver of the shipment from the shipper to the pool distributor 8126, the percentage of the trailer that was filled with freight ("load percentage") 8128, the seal number 8130, whether the seal was intact on receipt 8132, the seal origin 8134, the load condition 8136, the total number of items in the trailer 8138 and the number of exceptions 8340. The Timestamps section of the report includes the date and time for the departure of the truck from the shipper to go to the pool distributor 8142, the planned arrival of that shipment at the pool distributor 8144, the actual arrival time of the shipment at the pool distributor 8146, the time when unloading of the freight started 8148 and stopped 8150, the time when the first 8154 and last 8156 carton were scanned, and the time when the driver of the truck was released at the completion of unloading the truck 8152.

There are "hotlinks" on the Trip Status Report. By clicking on the Trip Number 8106, the user is brought to the Trip Summary Report for that particular trip. By clicking on the Total Items number 8130, the user is brought to the Scan Summary Report for that particular trip. The Trip Status Report also contains Previous 8158 and Next buttons 8160. By clicking on these buttons, the user is brought to the previous or next trip number.

Figure 82:
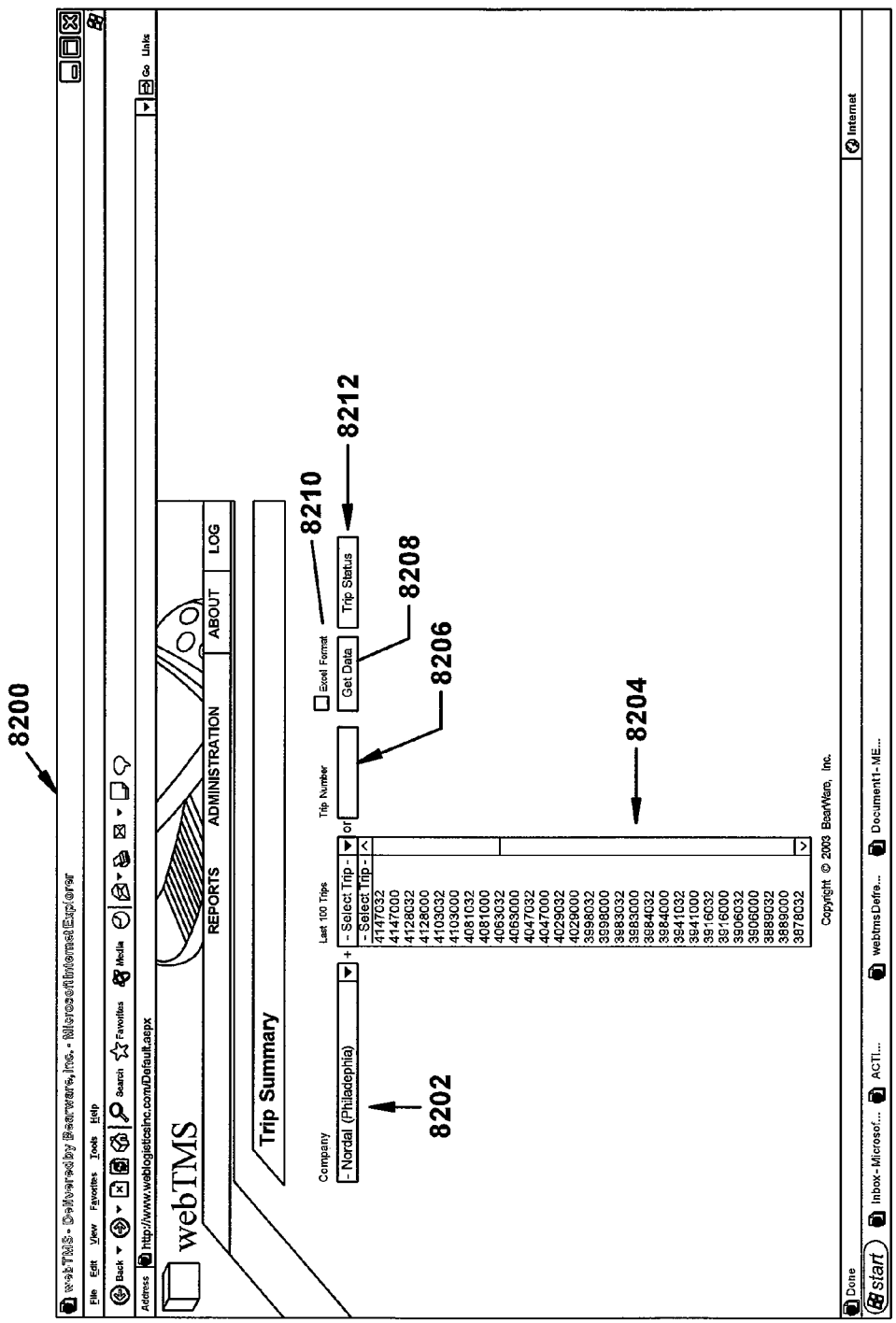
FIG. 82 is a Trip Summary report query screen of the web based Pool Distribution reporting application according to the present invention.

By selecting the Trip Summary item 7712 from the Reports drop down menu 7707, the user is brought to the Trip Summary selection screen 8200 shown in FIG. 82. Here the user selects the company 8202 and selects a trip from a list 8204 of the last one hundred trips in the web database or types in the requested trip 8406 and then clicks on the Get Data button 8208. If the user wants to display the Trip Summary data in an excel spreadsheet form, they click on the Excel Format box 8410. The Trip Status report 8100 for the selected trip can also be accessed by clicking on the Trip Status box 8212 after selecting the company and trip number. This sends a query to the web database to display a store level summary of all cartons shipped on a particular trip.

Figure 83:
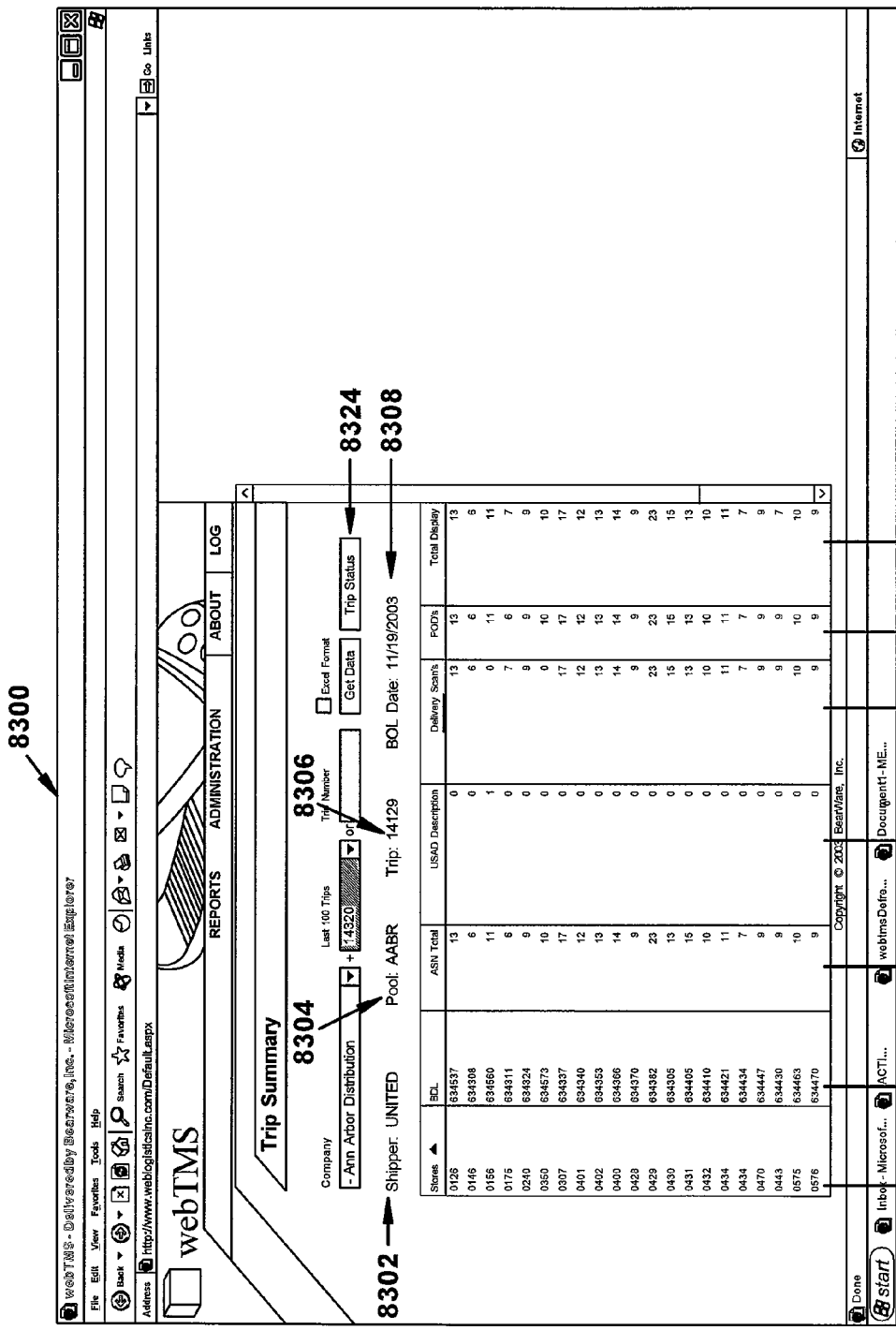
FIG. 83 is a Trip Summary report screen of the web based Pool Distribution reporting application according to the present invention.
Figure 84:
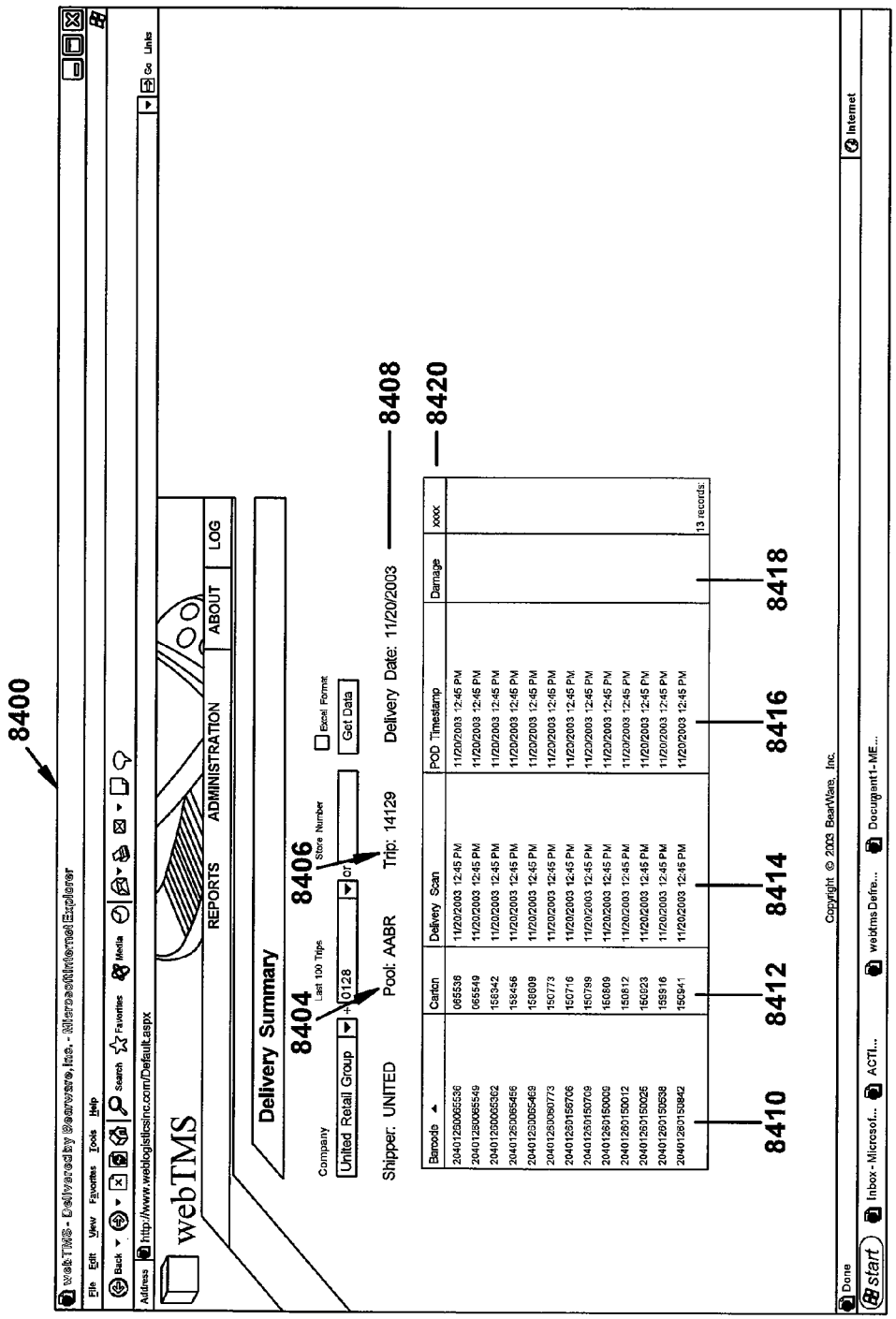
FIG. 84 is a Delivery Summary report screen of the web based Pool Distribution reporting application according to the present invention.

The Trip Summary Report 8300 shown in FIG. 83 displays the queried trip information on the top of the report: the shipper 8302, the pool 8304, the trip number 8306, and the BOL date 8308. The columns on the report are store number 8310, BOL number 8312, ASN total 8314, OS&D Exceptions 8316, Delivery Scans 8318, POD's 8320, and Total Items 8322. The Store Number 8310 is the identification number given by a shipper to a particular store or delivery point. The BOL number 8312 is a number assigned to a particular aggregation of freight that is being delivered to a store on a certain date. The ASN Total 8314 is the number of pieces that the shipper believes sent to that store for the selected trip. The OS&D Exceptions column 8316 contains the number of over, short or damaged cartons for the referenced store and trip number. Delivery Scans 8318 refers to the number of pieces scanned at the store by the driver for the trip. POD's 8320 refers to the number of pieces for which delivery data was entered for a store for the trip. Total Items 8322 refers to the total number of cartons that were available for delivery for that store: the ASN Total less short cartons and plus over cartons. The user can access the Trip Status report 8100 for this trip by clicking on the Trip Status button 8324. The numbers in the Store column are hotlinks. If the user clicks on the store number 8310, the Delivery Summary Report 8400 as shown in FIG. 84 for that trip is displayed.

The header of the Delivery Summary Report lists the shipper 8402, the pool distributor 8404, the trip number 8406, and the delivery date 8408. The columns in this report are the barcode 8410, the carton number 8412, the delivery scan date and time 8414 and the POD date and time 8416. This report shows information on all cartons delivered to a store on a particular date. The barcode number 8412 contains a hotlink to the Carton Tracking Report 9400.

Figure 85:
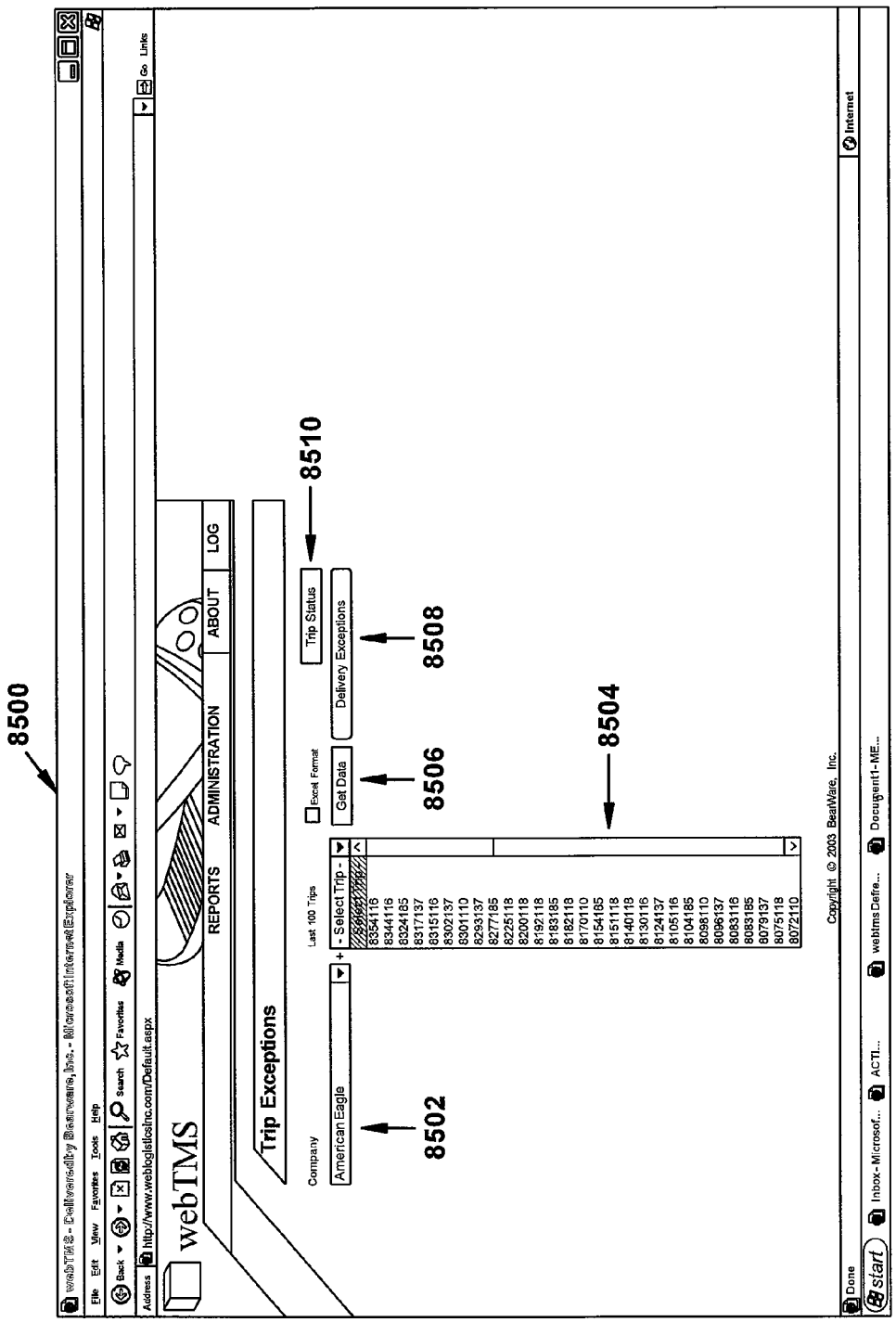
FIG. 85 is a Trip Exceptions report query screen of the web based Pool Distribution reporting application according to the present invention.

The Trip Exceptions Report is accessed by selecting the Trip Exceptions option 7714 from the Reports pull down menu 7707. This brings the user to the Trip Exceptions selection screen 8500 shown in FIG. 85. Here the user selects the company 8502 and the trip number from a list 8504 of the last one hundred trips. To get the Trip Exceptions Report the user clicks on the Get Data Button 8506. The user can also navigate to delivery exceptions and the trip status reports 8100 by clicking on delivery exception 8508 and trip status 8510 buttons.

Figure 86:
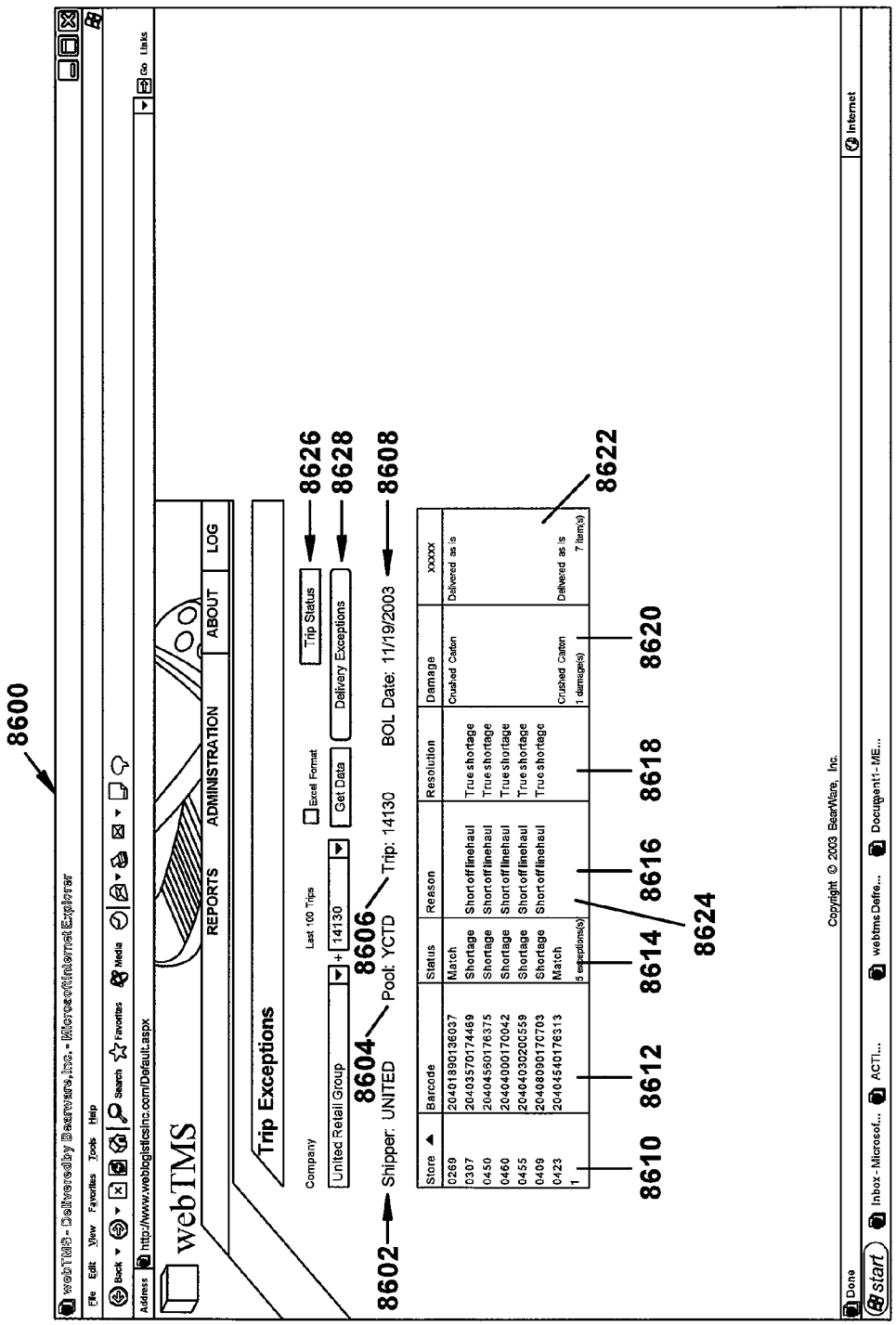
FIG. 86 is a Trip Exceptions report screen of the web based Pool Distribution reporting application according to the present invention.

The Trip Exceptions report 8600 shown in FIG. 86 lists all discrepancies found between what the shipper thought was shipped in good condition and what the pool distributor inbound scanned. In the header of the report is listed the shipper name 8602, the pool name 8604, the trip number 8606 and the BOL date 8608. The columns of the report are Store Number 8610, Barcode Number 8612, Status 8614, Reason 8616, Resolution 8618, Damage 8620, and Repair 8622. The store number column 8610 contains the shipper's store number for which a particular carton with exceptions was to be delivered. The barcode number column 8612 contains the barcode number of the particular carton which was an exception. The Status column 8614 lists the exception status of the carton: match, shortage, overage, out of area, or duplicate. The Reason column 8616 lists the reason the carton was an exception. The Resolution column 8618 details how the pool distributor dealt with the exception carton. The Damage column 8620 lists the type of damage associated with the carton. The Repair 8622 column details how the pool distributor dealt with the damaged carton. At the bottom of the report exceptions, damages, and total trip exceptions are totaled 8624. The user is also able to navigate to the trip status 8626 and delivery exceptions 8628 reports for the trip shown in the header 8606 from this screen. Hotlinks are provided in this report from the store number 8610 and barcode number 8612. The store number 8610 if clicked takes the user to the Delivery Summary Report 8400 and the barcode number 8612 to the Carton Tracking Report 9700.

Figure 87:
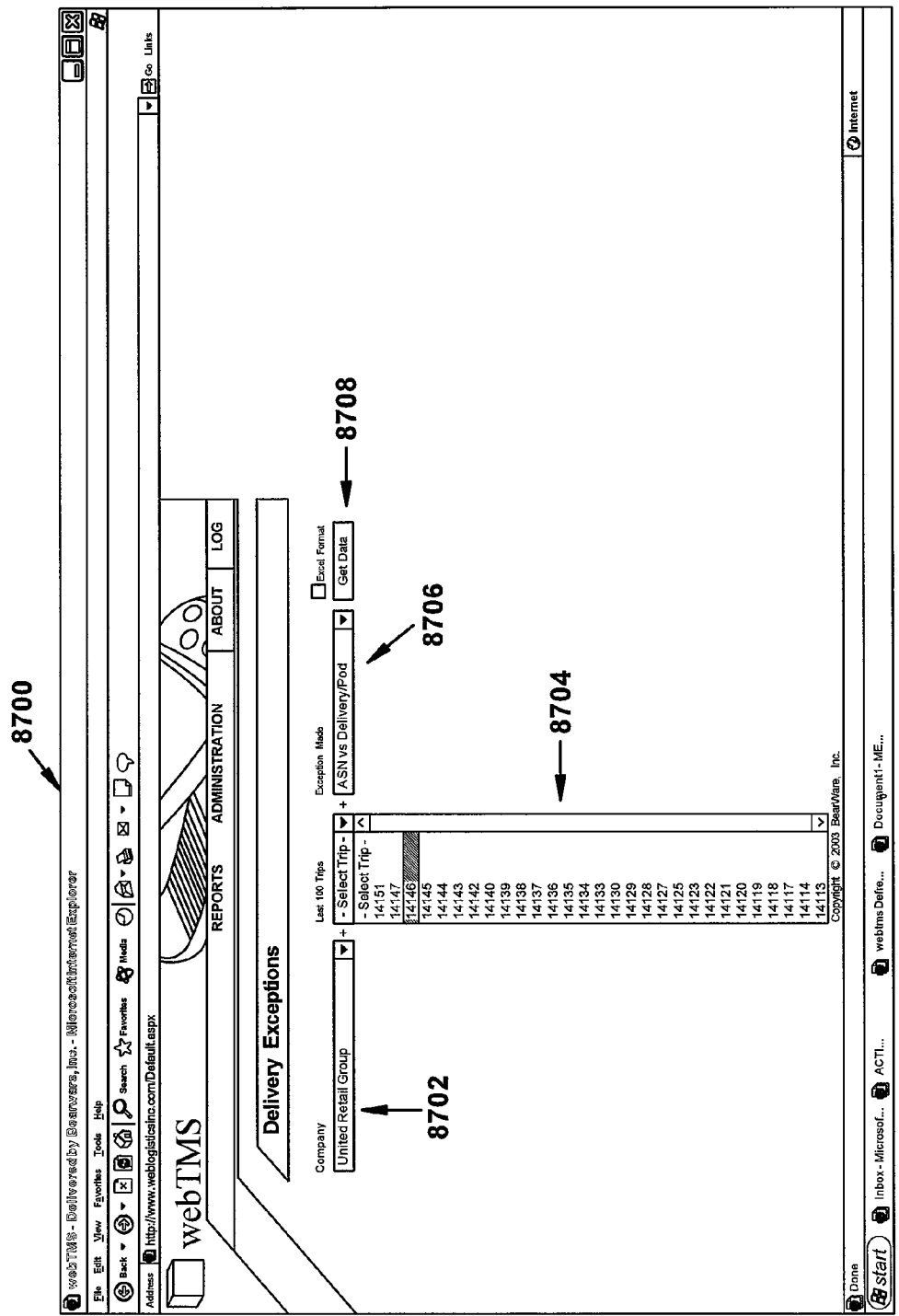
FIG. 87 is a Delivery Exceptions report query screen of the web based Pool Distribution reporting application according to the present invention.
Figure 88:
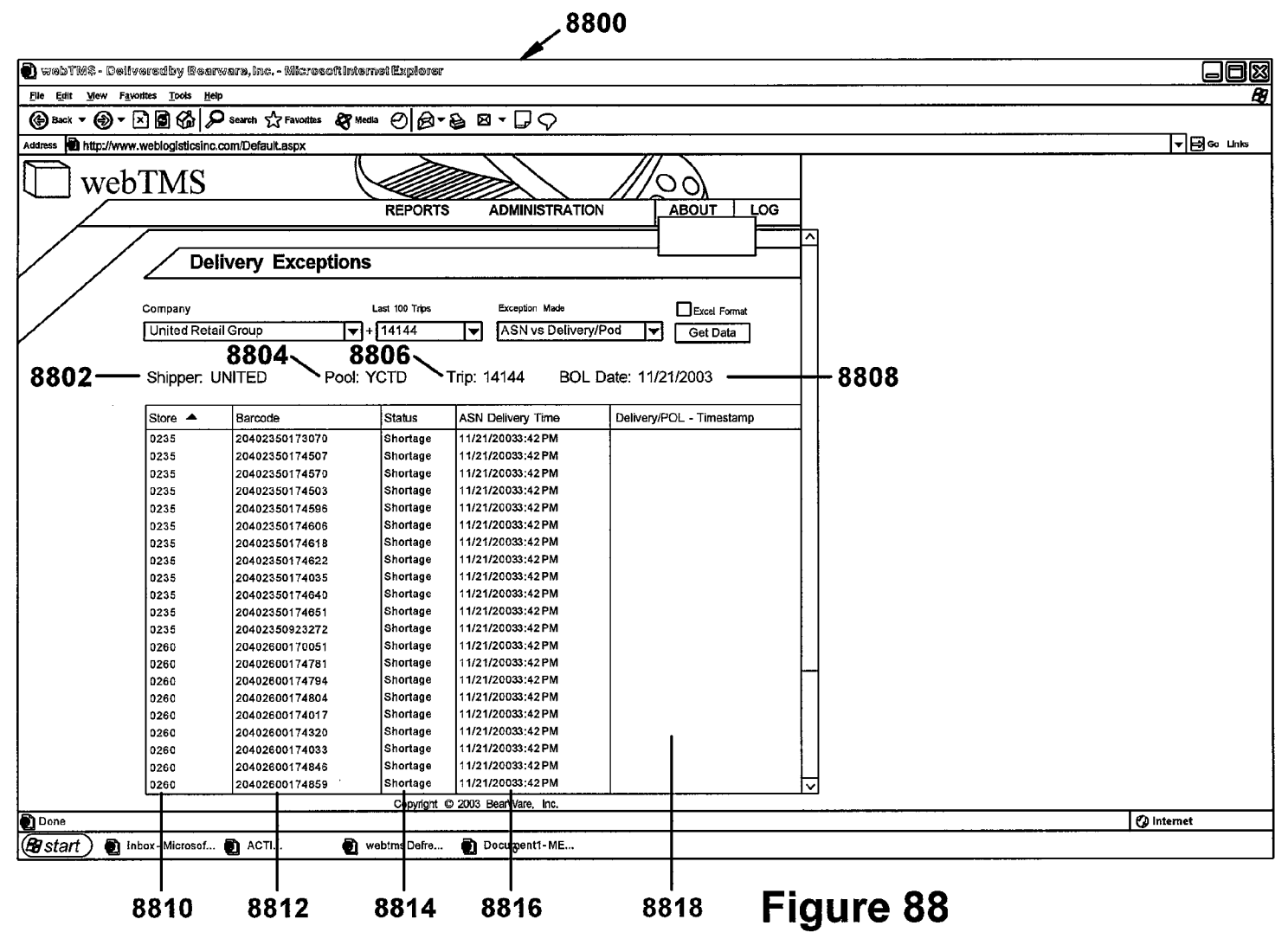

The Delivery Exceptions Report lists all cartons which were expected to be delivered to a store, but were not. The Delivery Exceptions Report is accessed by selecting the report 7716 from the Reports drop down menu 7707. After this selection is made the user is brought to the Delivery Exceptions Query Screen 8700 shown in FIG. 87. At this screen the user selects the company 8702, the trip 8704, and the exception mode (ASN v. Delivery/POD; Inbound v. Outbound; Inbound v. Delivery/POD) 8706 and then clicks on the Get Data Button 8708. The user is then brought to the Delivery Exception Report 8800 shown in FIG. 88. In the header of the report are listed the shipper 8802, the pool 8804, the trip number 8806 and the BOL Date 8808. The columns in the report are the store number 8810, the barcode number 8812, the status 9814, the ASN Timestamp 8816, and Delivery Timestamp 8818. Hotlinks on this report are the store number 8810 which takes the user to the Delivery Summary Report 8400 and the barcode number 8812 which takes the user to the Carton Tracking Report 9400.

Figure 89:
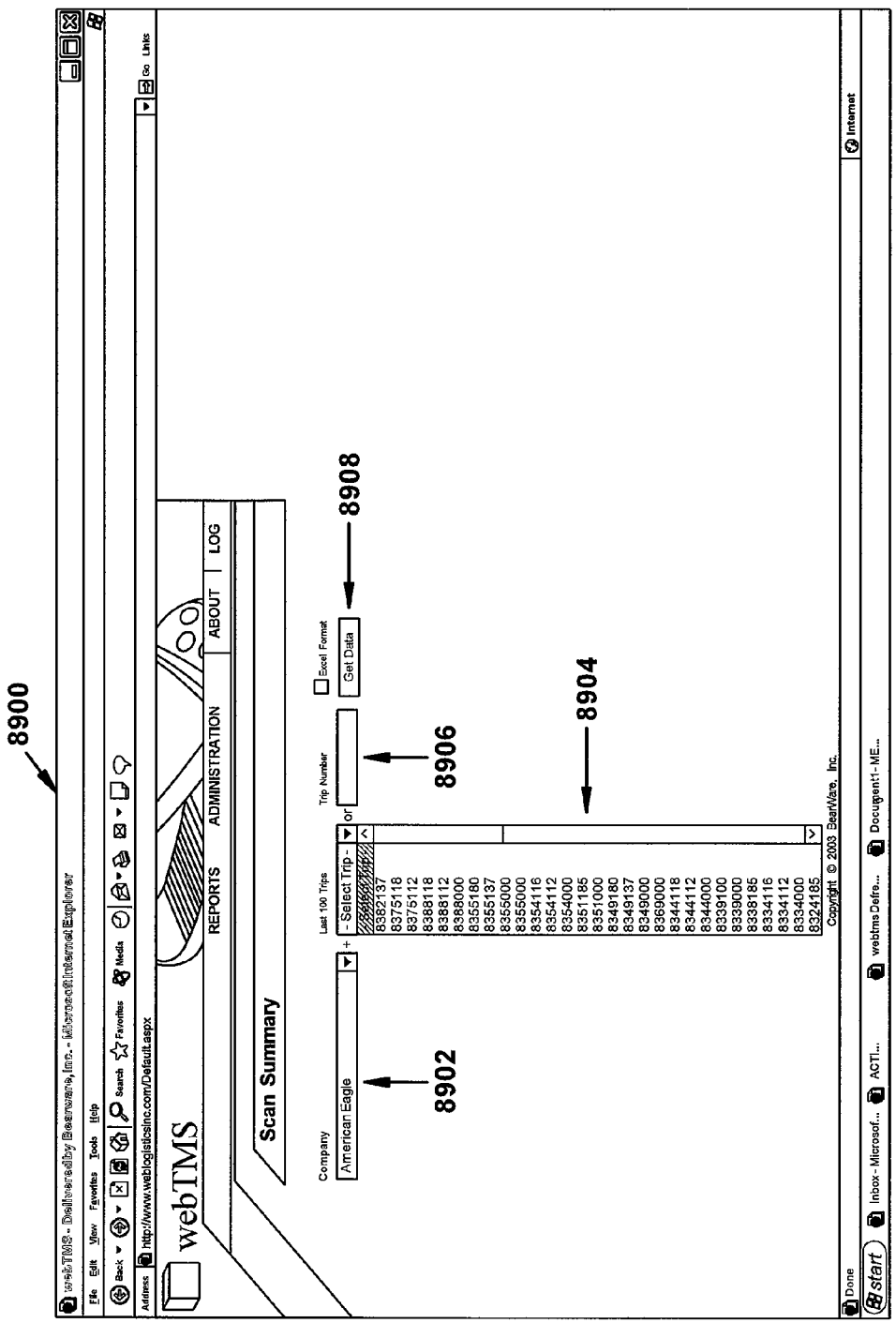
FIG. 89 is a Scan Summary report query screen of the web based Pool Distribution reporting application according to the present invention.
Figure 90:
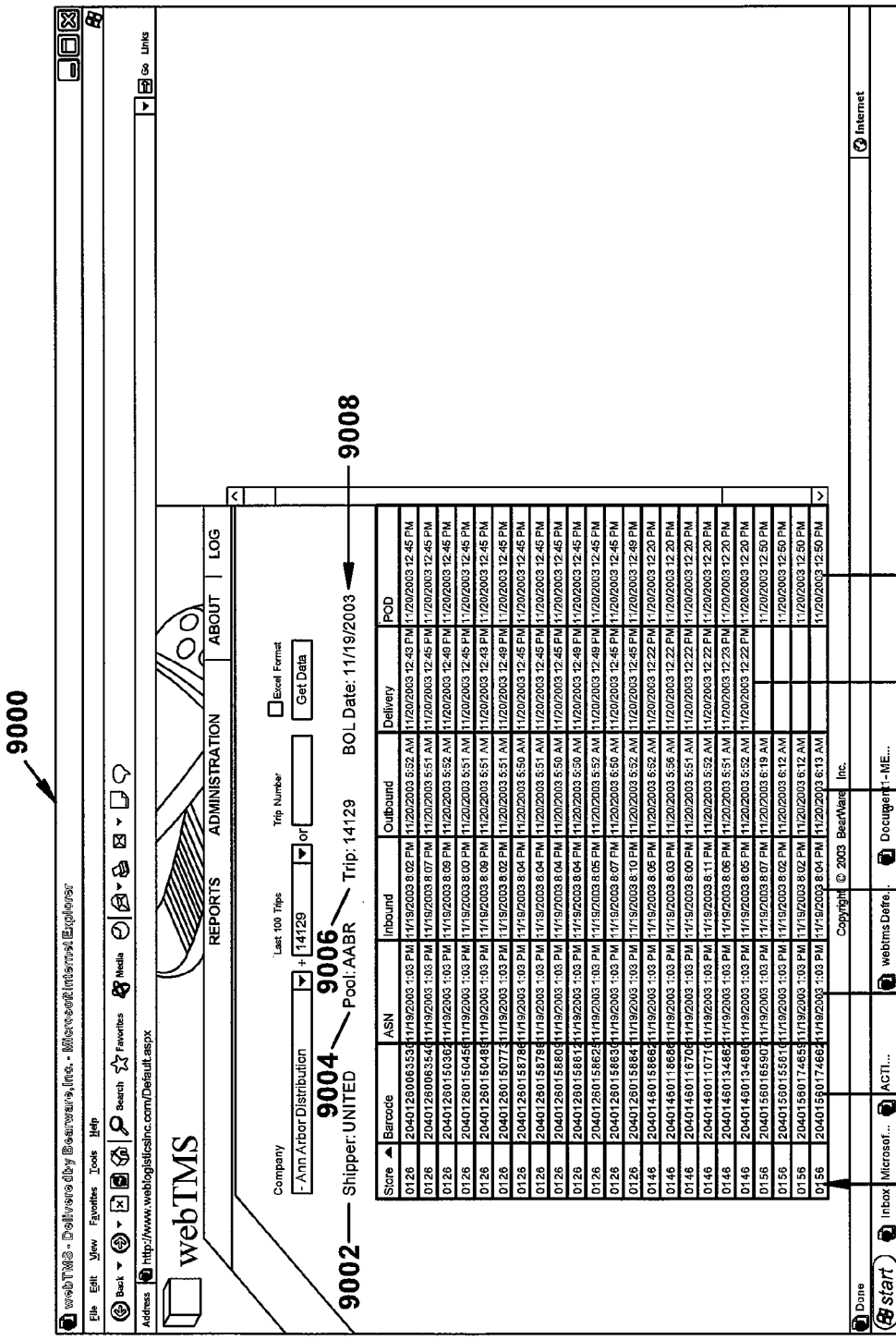
FIG. 90 is a Scan Summary report screen of the web based Pool Distribution reporting application according to the present invention.

The Scan Summary Report is accessed by selecting the report 7718 from the Reports drop down menu 7707. This report lists all cartons scanned in all modes for a particular trip. After selecting the Scan Summary Report menu option, the user is brought to the Scan Summary Query Screen 8900 shown in FIG. 89. Here the user selects the company 8902, and either enters a trip number 8906 or selects a trip number from the pull down list 8904. After clicking on the Get Data Button 8908, the user is brought to the Scan Summary Report 9000 shown in FIG. 90. In the header of the report are listed the shipper 9002, the pool 9004, the trip number 9006 and the BOL Date 9208. The columns in this report are the store number 9210, the barcode number 9212, 9012 ASN 9014, Inbound 9016, Outbound 9018, Delivery 9020, and POD 9022. The date and time in the ASN, Inbound, Outbound, Delivery and POD columns reflect the time when the listed carton passed through that scan point. Hotlinks on this report are the store number 9010 which takes the user to the Delivery Summary Report 8400 and the barcode number 9012 which takes the user to the Carton Tracking Report 9400.

Figure 91:
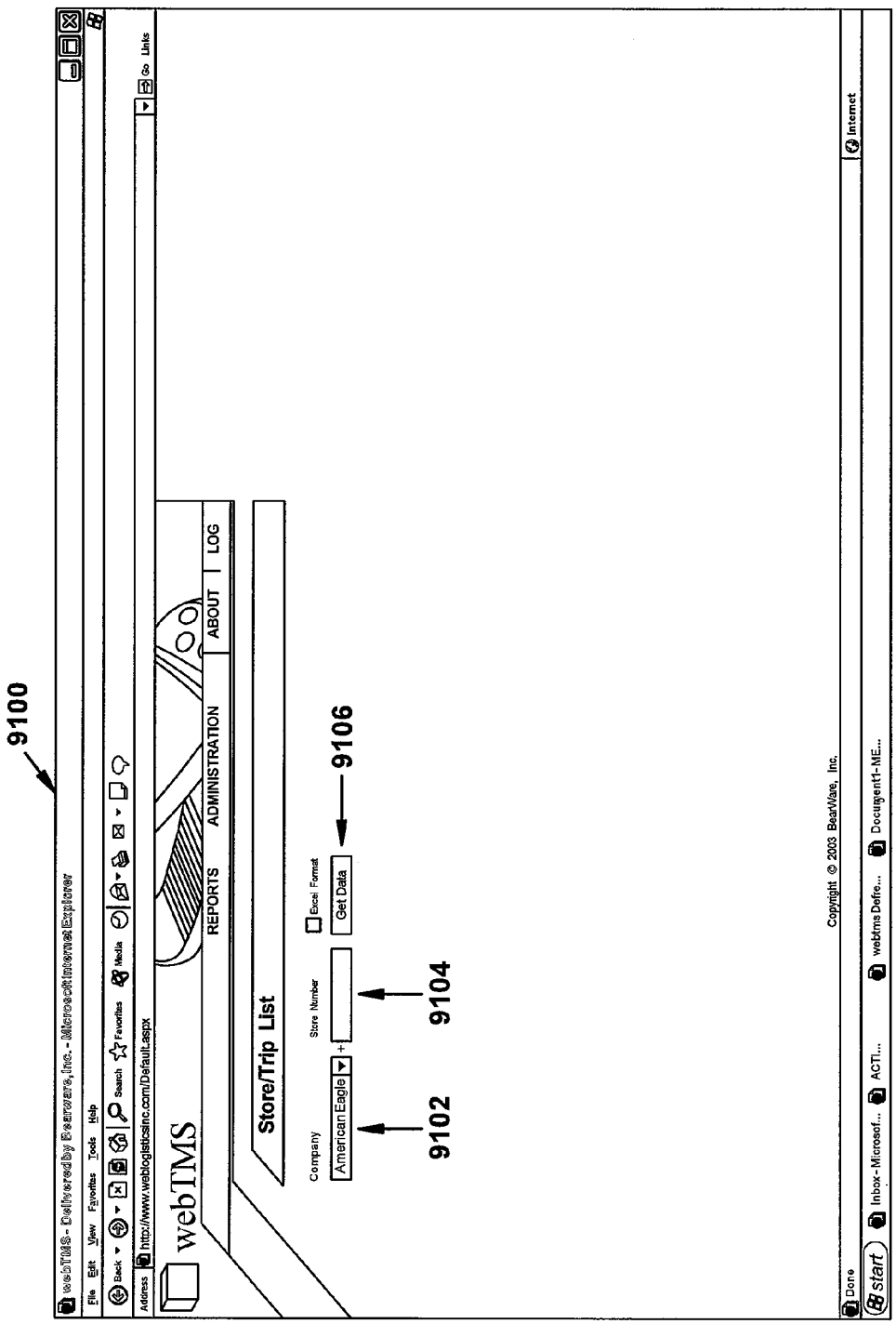
FIG. 91 is a Store/Trip List report query screen of the web based Pool Distribution reporting application according to the present invention.
Figure 92:
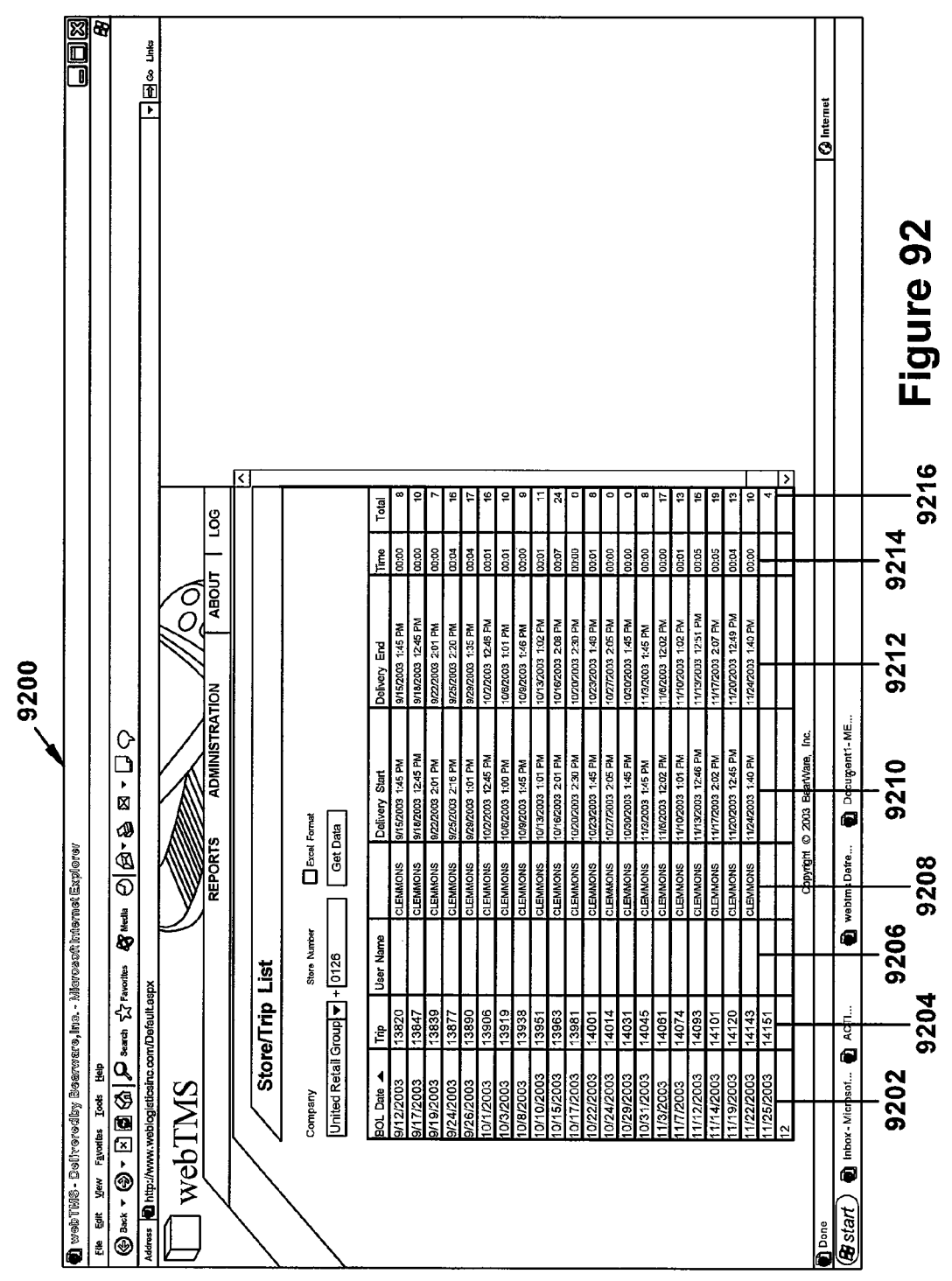

The Store/Trip List provides the user with a historical summary of deliveries made to a particular store over a given time frame. The Store/Trip List Report is accessed by selecting the report 7720 from the Reports drop down menu 7707. The user is then brought to the Store/Trip List Query Screen 9100 shown in FIG. 91 where they select the company 9102 and the store number 9104 and click on the Get Data button 9306. This takes the user to the Store/Trip List 9200 shown in FIG. 92. Here the user sees a historical summary of deliveries to the selected store. The columns in this report are BOL Date 9202, Trip Number 9204, Driver Name 9206, Signee 9208, Delivery Start 9210, Delivery End 9212, Time 9214, and Total 9216. The BOL Date 9202 is the date on which the ASN was received on the web database; the Trip Number 9204 is the number associated with a particular load of freight from the shipper; the Driver Name 9206 is the name of the driver who delivered the shipper's freight to the store; the signee name 9208 is the name of the store personnel who signed for the delivery; the Delivery Start 9210 and End 9212 are the timestamps entered by the driver into the scanner prior to and at the end of making the delivery; time 9214 refers to elapsed time between the delivery start and end; total 9216 is the total number of cartons delivered to the store.

The report contains hotlinks as well. By clicking on the BOL Date 9202 or Total 9216 the user is brought to the Delivery Summary Report 8400. This report lists all cartons delivered to a particular store for a particular trip. The header of the report lists the shipper 8402, the pool 8404, the trip number 8406, and the delivery date 8408. In the body of the report are listed the barcode 8410, the carton number 8412 and the delivery scan date and time 8414, the POD time stamp 8416, damages 8418, and any repair to a damaged carton 8420. By clicking on the Trip Number in the Store/Trip List 9204, the user is brought to the Trip Summary Report 8300.

Figure 93:
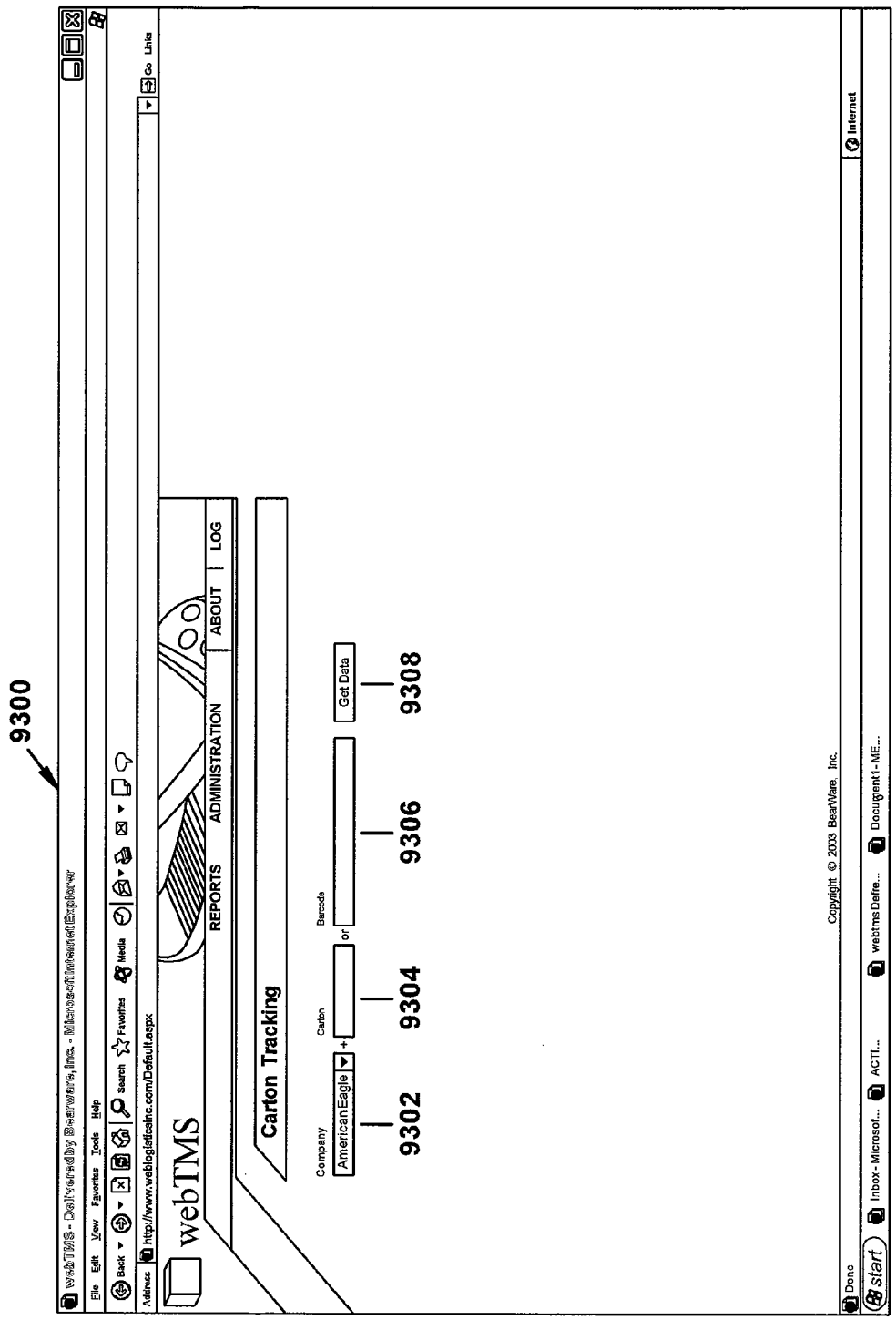
FIG. 93 is a Carton Tracking report query screen of the web based Pool Distribution reporting application according to the present invention.
Figure 94:
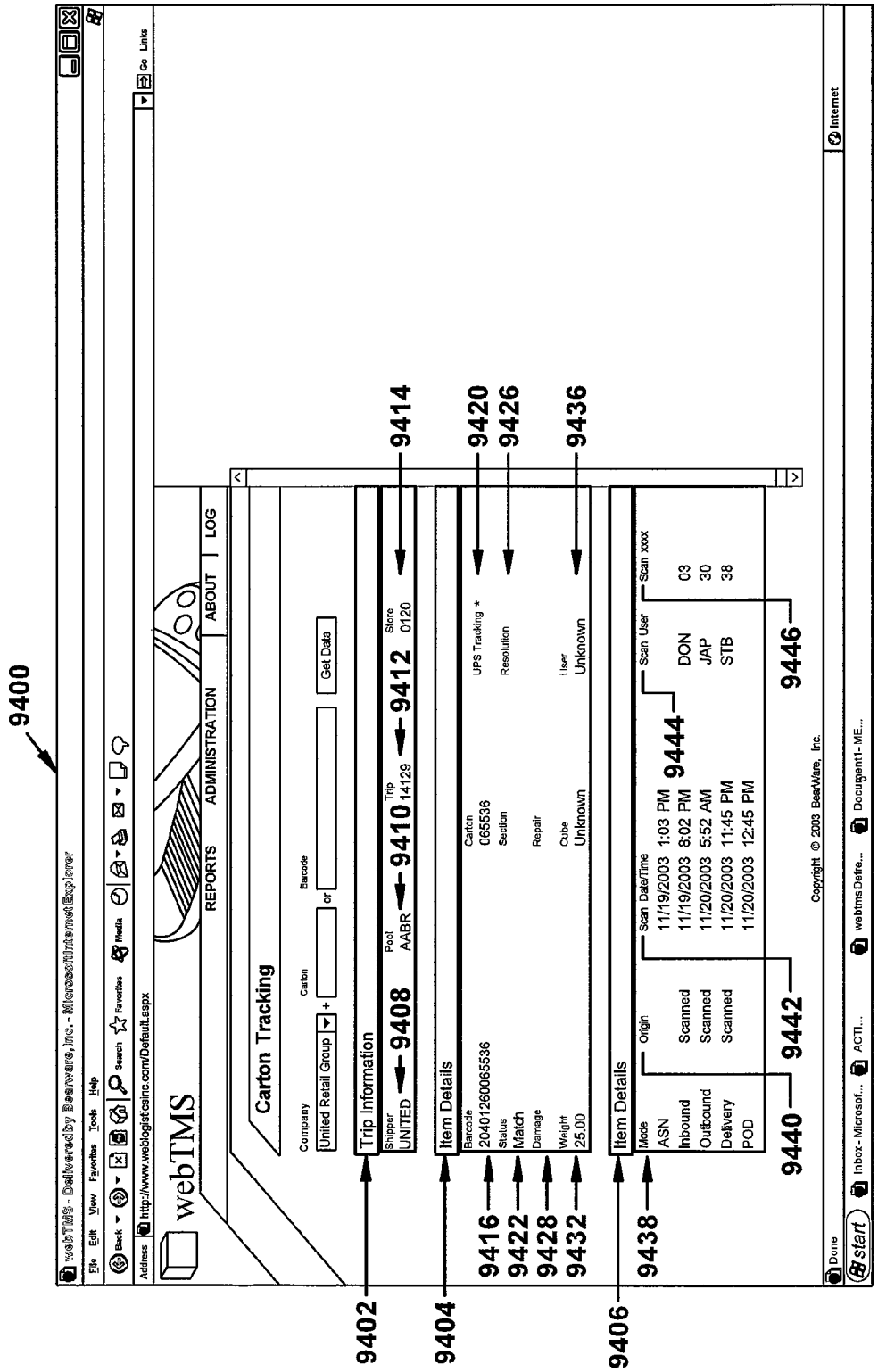
FIG. 94 is a Carton Tracking report screen of the web based Pool Distribution reporting application according to the present invention.

The Carton Tracking Report is used to display summary information on a particular carton. From the Reports pull down menu 7707, the user selects Carton Tracking 7722 to get to the Carton Tracking Query Screen 9300 shown in FIG. 93. Here the user selects the company 9302, enters a carton number 9304 or the complete barcode number 9306 and clicks on the Get Data Button 9308. From there, the user is brought to the Carton Tracking Report 9400 shown in FIG. 94. This Report contains three parts: the Trip Information 9402, Item Details 9404, and Scanning History 9406. The Trip Information 9402 portion of the report lists the shipper 9408, the pool 9410, the trip number 9412 and the store 9414 where the carton was to be delivered. The Item Details 9404 section of the report lists the barcode number 9416, the carton number 9418, a UPS Tracking Number 9420, the status 9422, the reason 9424, resolution 9426, damage 9428, repair 9430, carton weight 9432, carton cube 9434 and carton units 9436. The Scanning History 9406 section of the report sets forth the scanning mode 9438, the origin of the data (scanned or manual) 9440, the scan date and time 9442, the scan user 9444 and the scan gun number 9446 for each scan point.

Figure 95:
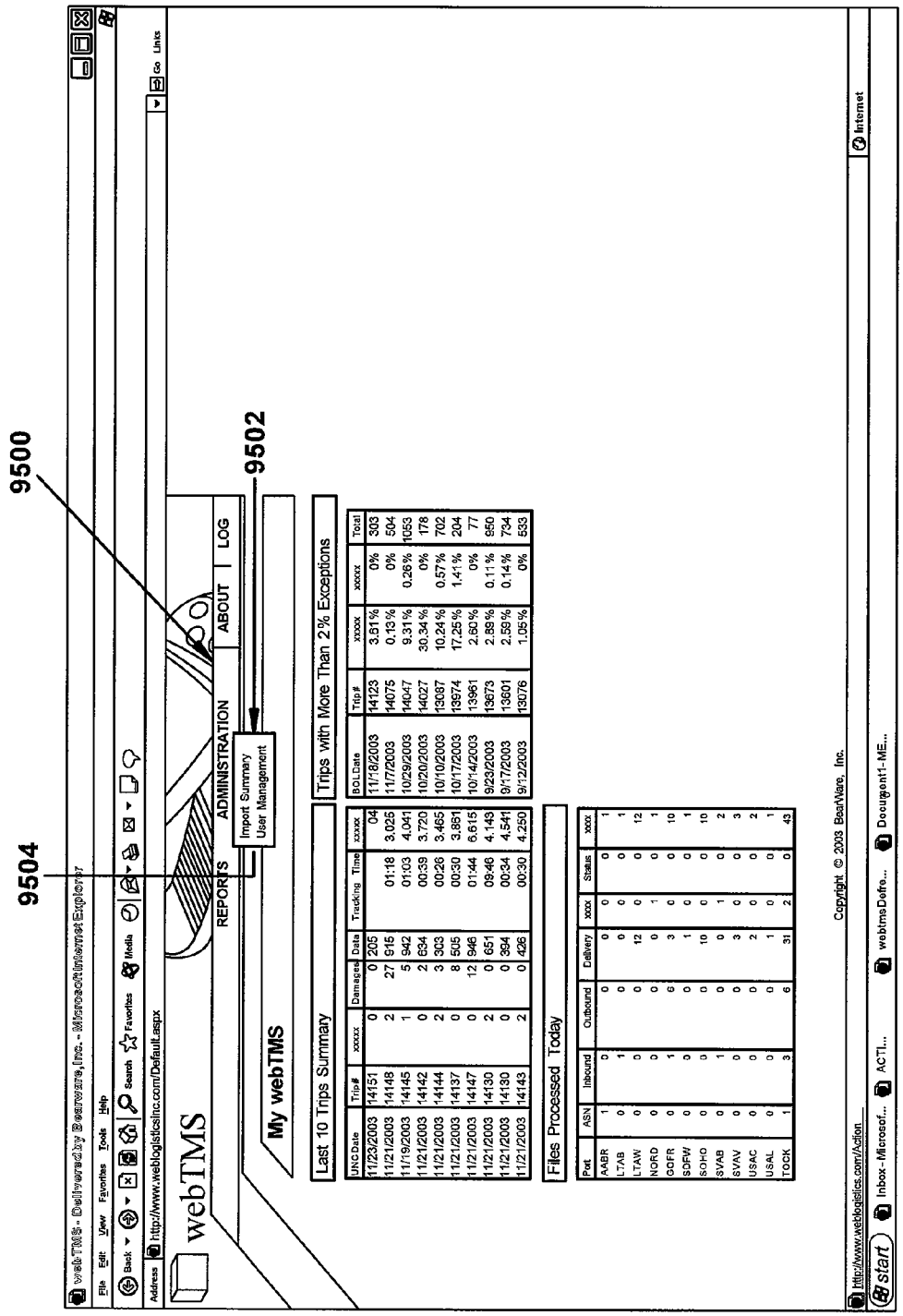
FIG. 95 is a Administration Menu of the web based Pool Distribution reporting application according to the present invention.

The pool distribution web-based reports also have an administration component. The administration tools are accessed from the Administration drop down menu 9500 shown in FIG. 95. The two administration options are import summary 9502, and user management 9504.

Figure 96:
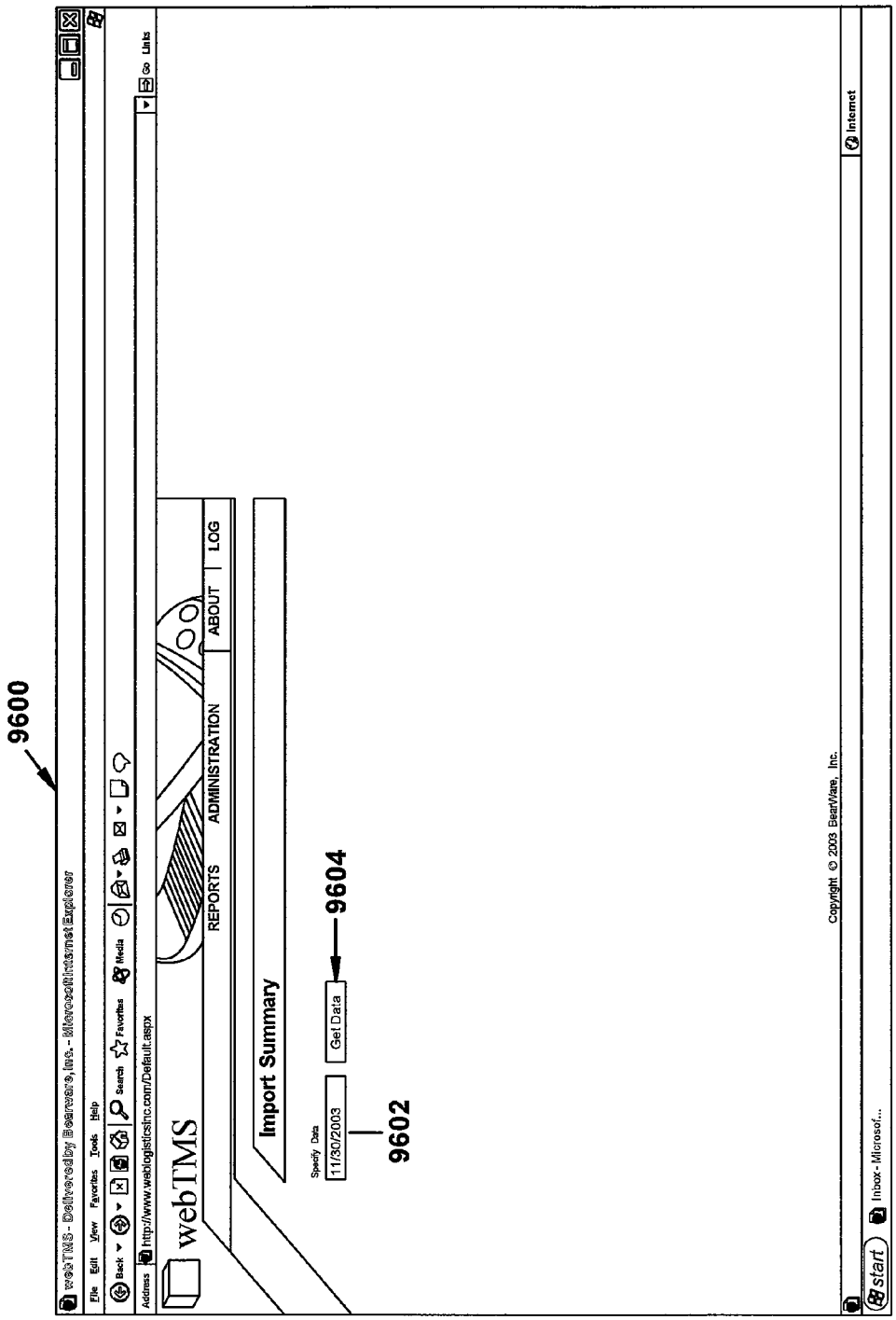
FIG. 96 is a Import Summary report query screen of the web based Pool Distribution reporting application according to the present invention.
Figure 97:
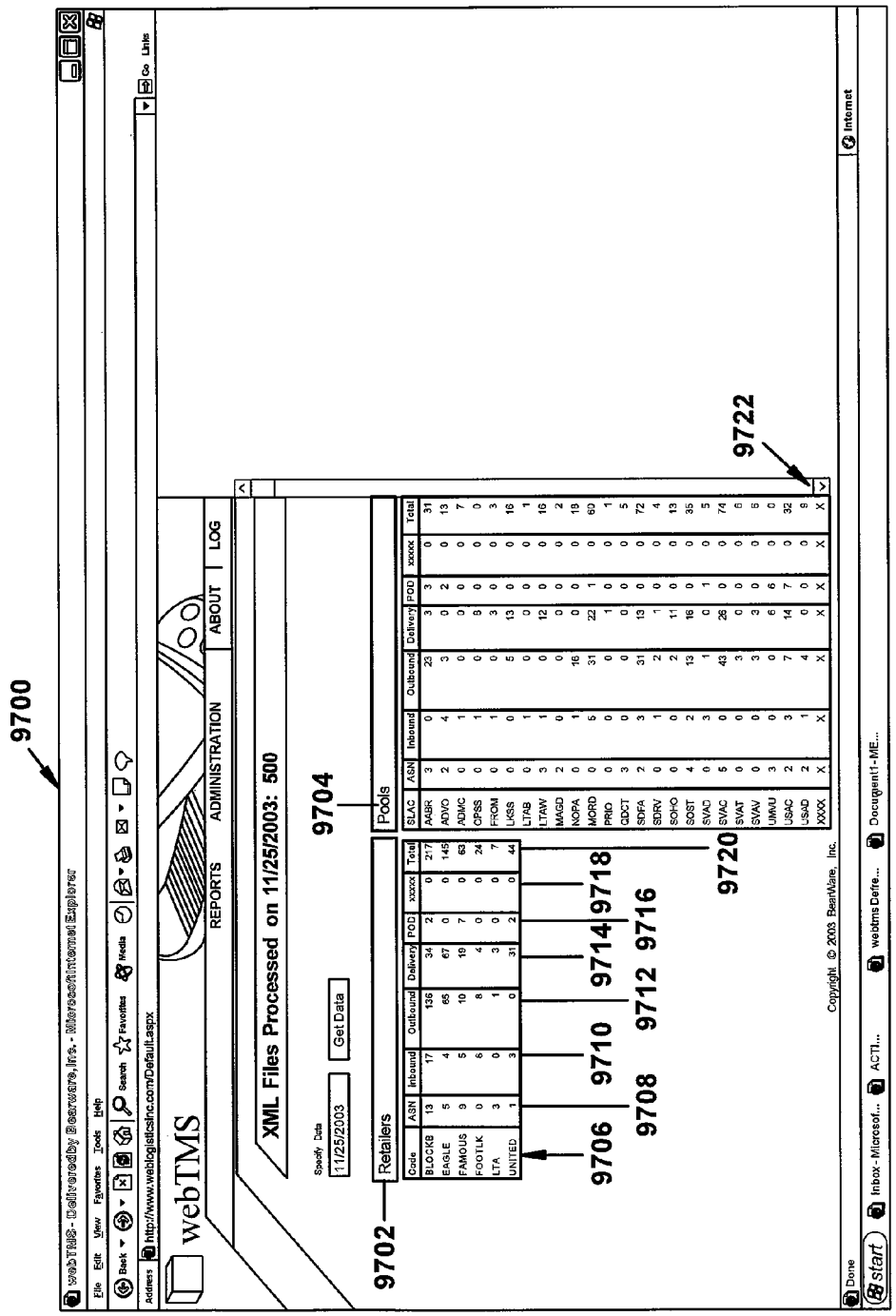
FIG. 97 is a top portion of the Import summary report screen of the web based Pool Distribution reporting application according to the present invention.
Figure 98:
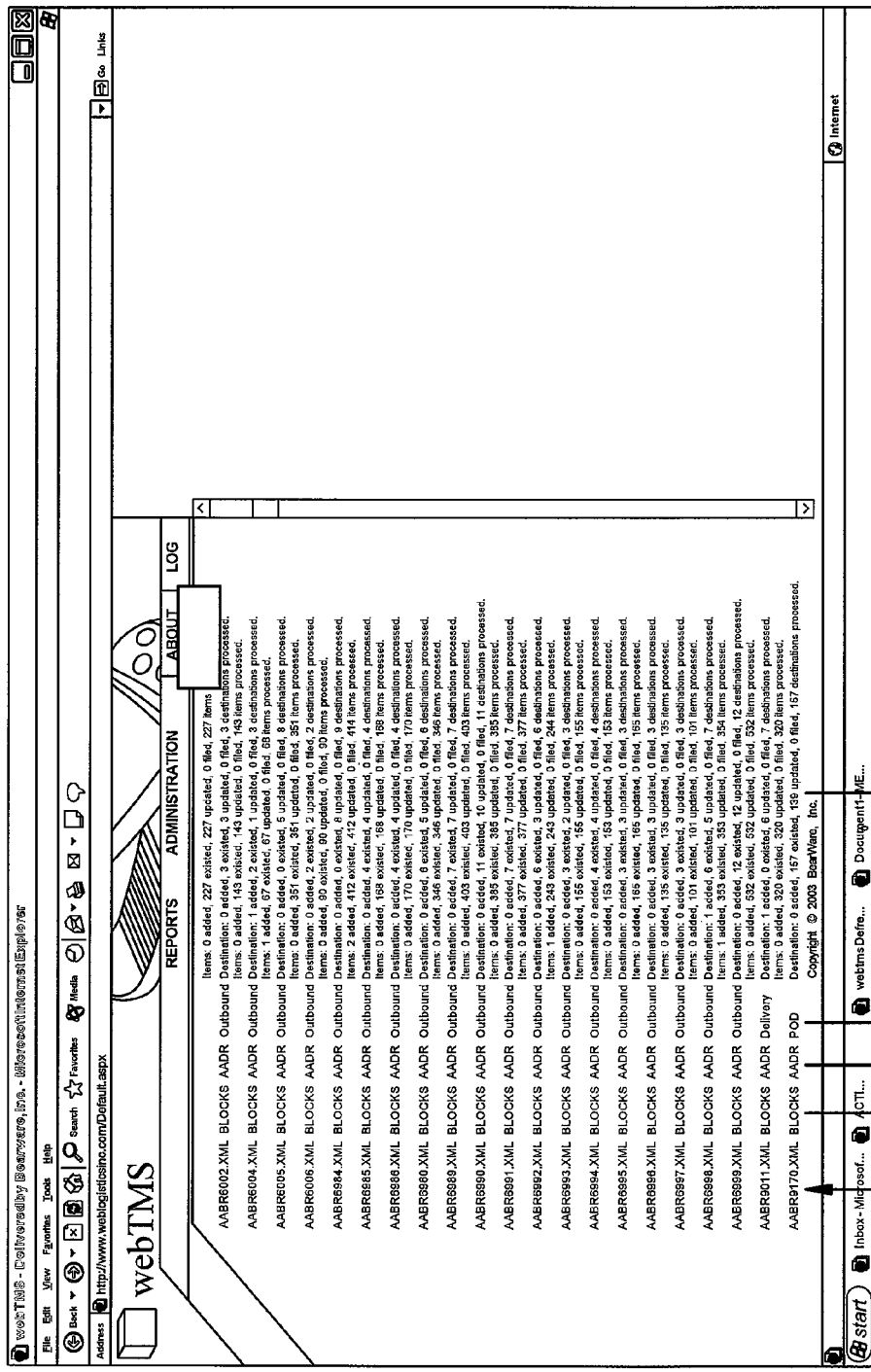
FIG. 98 is a bottom portion of the Import summary report screen of the web based Pool Distribution reporting application according to the present invention.

The Import Summary Report lists all files transmitted by particular shippers and pool distributors to the web service for a selected day. This report is accessed by clicking on the Import Summary Menu option 9502. Clicking on this menu option takes the user to the Import Summary Query Screen 9600 shown in FIG. 96. Here the user enters the date for which they want an import summary 9602 and click on the Get Data button 9604. The user is then taken to the import summary report 9700 shown in FIG. 97. The import summary report breaks down the files received by Retailer (Shipper) 9702 and Pool 9704. The columns in the report are Sender 9706, ASN 9708, Inbound 9710, Outbound 9712, Delivery 9714, POD 9716, Stores 9718, and Total 9720. By scrolling down the page 9722, the user views more detailed information on the files imported. A sample of this portion of the report is shown in FIG. 98. Here the file name is shown 9802, the shipper for whom the file pertains 9804, the pool distributor who sent the file 9806, the type of file 9808, and information on the addition of the file to the database 9810.

Figure 99:
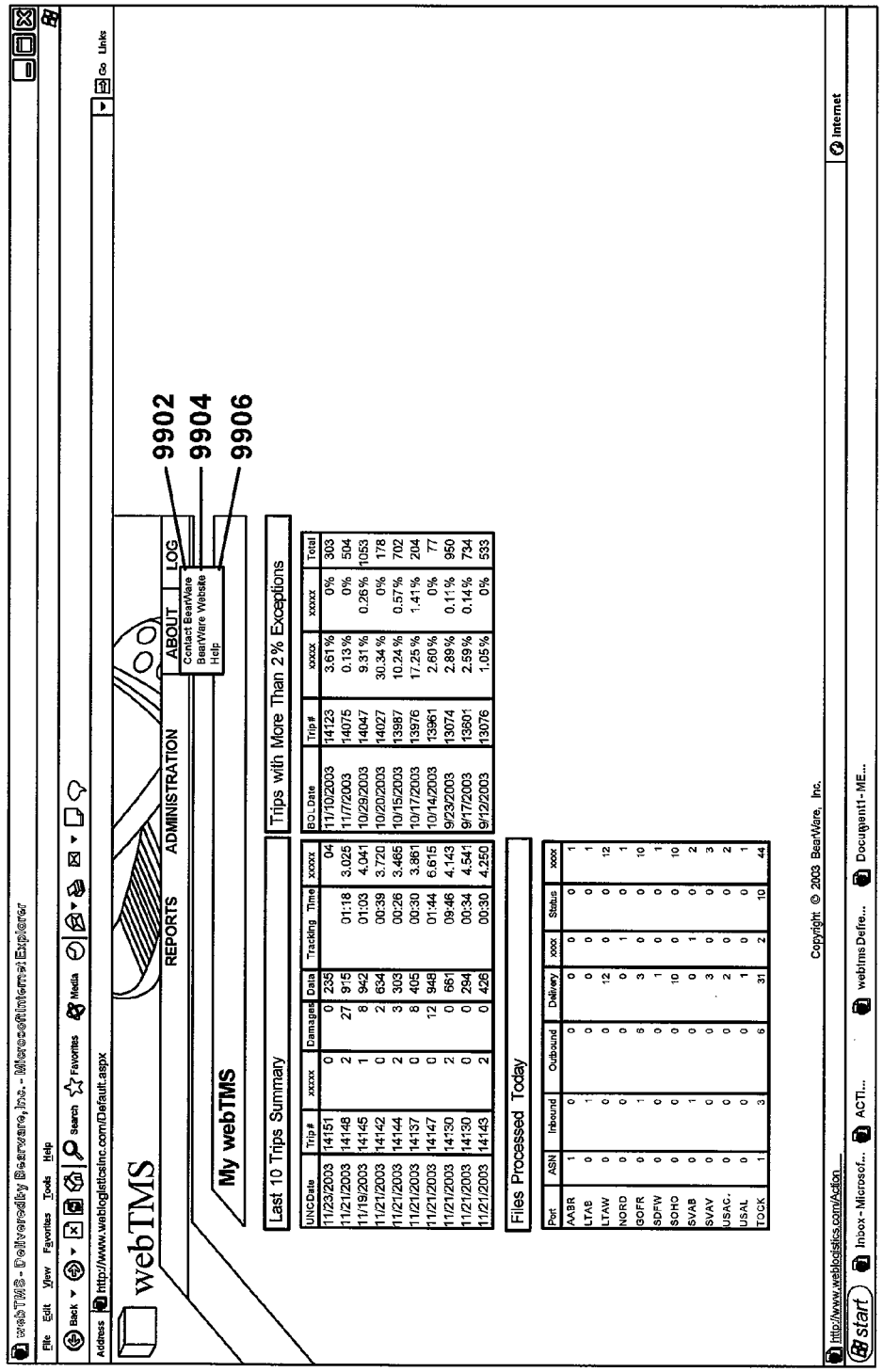
FIG. 99 is a About Menu screen of the web based Pool Distribution reporting application according to the present invention.

The About Menu option shown in FIG. 99 contains three options: Contact BearWare 9902 which opens the user's email application and fills in the addressee box to bearware@bearwareinc.com, BearWare Website 9904 which takes the user to BearWare's website, www.bearwareinc.com, and Help 9906 which takes the user to online documentation on the use of the web application.

Although the preferred embodiment has been described in detail, it should be understood that various changes, substitutions, and alterations can be made therein without departing from the spirit and scope of the invention. It will be appreciated that various changes in the details, materials and arrangements of parts, which have been herein described and illustrated in order to explain the nature of the invention, may be made by those skilled in the area within the principle and scope of the invention.

What is claimed is:

1. An electronic system for managing items in an associated pool distribution supply chain for pooled distribution of the items to one or more associated destinations via an associated pooled transport distribution system, the electronic system comprising:
    an input scanner configured to selectively first capture item identification information associated with a plurality of received items, the plurality of received items being associated with a plurality of unique shipper sources and delivery destinations, and each of the plurality of items being identified for supply chain management in the associated pooled transport distribution system;
    a capturing mode specifying input on the input scanner, the capturing mode specifying input being configured to receive first user input corresponding to a selection of at least one of a plurality of capturing modes, wherein each capturing mode is configured to create association information data by associating the first captured item identification information with pool distribution supply chain information;
    an outbound scan integrity check input on the input scanner, the outbound scan integrity check input being one of the plurality of capturing modes and being configured to receive second user input corresponding to a user-selected sorted consolidation of groups of the plurality of items associated with the plurality of unique shipper sources prior to delivery of the plurality of items to associated selected destinations of the one or more associated destinations, the user-selected sorted consolidation of groups of the plurality of items grouping a first set of items of the plurality of items according to a selected first destination of the one or more associated destinations together with a second set of items of the plurality of items according to a selected second destination of the one or more associated destinations as a pooled group of items to be delivered in accordance with the pool distribution supply chain information to the associated selected destinations of the one or more associated destinations, the outbound scan integrity check input being adapted for second capturing item identification information for each item of the pooled group of items for determining a mis-sorted item amongst the pooled group of items comprising the first and second sets of items by comparing the second captured item identification information with data associated with the selected destinations;

a communication port configured to communicate the association information data and the first and second captured item identification information to a data storage device for storage, the association information data and the first and second captured item identification information being communicated to the data storage device to selectively commence distribution of each item of the first and second sets of items of the pooled group to the associated selected destinations in accordance with specified consolidation and routing data;

a delivery scanner configured to, upon arrival for delivery of the first or second sets of items to their corresponding selected destinations, receive data associated with the corresponding selected destination and record a delivery arrival time, and to receive the specified consolidation and routing data as preload delivery data and receive third user input corresponding to the first or second sets of items of the pooled group of items being delivered to the first or second destination corresponding thereto, the delivery scanner being configured to receive, by selectively scanning each delivered item of the pooled group of items, third captured item identification information for each delivered item of the pooled group of items, and determining an elapsed delivery time for the first or second set of items in accordance with the delivery arrival time and a corresponding delivery end time, and determining a correspondence between the preload delivery data, the third user input, and the third captured item identification information, and classifying in accordance with the determined correspondence each delivered item of the pooled group of items as a one of a delivered item, a mis-delivered item, an un-delivered item, or an over-delivered item; and, a report output generating report data representative of the elapsed delivery time for each of the first and second sets of items and a result of the determining by the outbound integrity check input and the classifying by the delivery scanner.

2. The system of claim 1, wherein the communication port comprises at least one of a physical connection to the data storage device or a wireless connection to the data storage device.

3. The system of claim 1, wherein the communication port comprises an Internet connection for selective communication with the data storage device.

4. The system of claim 1, wherein the data storage device comprises means adapted for formatting the associated information in accordance with an input user request.

5. The system of claim 1, wherein:
the first set of items of the pooled group of items is associated with a first shipper in accordance with the item identification information;
the second set of items of the pooled group of items is associated with a second shipper in accordance with the item identification information; and
the association information data and the first and second captured item identification information being communicated to the associated data storage device selectively commencing the distribution comprises commencing distribution by the pool distributor of the first set of items of the first shipper together with the second set of items of the second shipper on a single route specified by a user-selected consolidation mode.

6. The system of claim 1, wherein the outbound scan integrity check input is configured to generate a signal in accordance with a result of the determining of the mis-sorted item.

7. The system of claim 1, wherein the outbound scan integrity check input is configured to determine the mis-sorted item as being a non-member of the first or second sets of items.

8. The system of claim 1, wherein the delivery scanner is configured to generate a warning signal in accordance a result of the determining being a mis-delivered item or an over-delivered item.

9. The system of claim 1, wherein the delivery input is configured to determine a mis-delivered or an over-delivered item as not being a member of the first or second set of items to be delivered.

10. The system of claim 1, wherein the delivery input is configured to determine an undelivered, mis-delivered or over-delivered item as being a new item unidentified for the supply chain management by a comparison between item identification information contained in the preload delivery data stored in a scanning device for a specific destination and the third captured item identification information acquired by the scanning device.

11. A method for managing items in an associated pool distribution supply chain for pooled distribution of the items to one or more destinations via an associated pooled transport distribution system, the method comprising:
first capturing, by an input device in a pooled transport distribution computer comprising a processor and a data storage device, item identification information associated with a plurality of received items, the plurality of received items being associated with a plurality of unique shipper sources and delivery destinations, and each of the plurality of items being identified for supply chain management in the associated pooled transport distribution system;
receiving, by a capturing mode specifying input on the input device, first user input corresponding to a selection of at least one of a plurality of capturing modes, wherein each capturing mode is configured to create association information data by associating the first captured item identification information with pool distribution supply chain information;
receiving, by an outbound scan integrity check input being one of the plurality of capturing modes of the input device, second user input corresponding to user-selected consolidation relative to a sorted consolidation of groups of the plurality of items associated with the plurality of unique shipper sources prior to delivery of the plurality of items to associated selected destinations of the one or more associated destinations, the user-selected sorted consolidation of groups of the plurality of items grouping a first set of items of the plurality of items according to a selected first destination of the one or more associated destinations together with a second set of items of the plurality of items according to a selected second destination of the one or more associated destinations as a pooled group of items to be delivered in accordance with the pool distribution supply chain information to the associated destinations of the one or more associated destinations, the outbound scan integrity checking further comprising second capturing item identification information for each item of the pooled group of items for determining a mis-sorted item amongst the pooled group of items comprising the first and second sets of items by comparing the second captured item identification information with data associated with the selected destinations;

communicating, by a communication port of the pooled transport distribution computer, the association information data and the first and second captured item identification information to the data storage device for storage, the association information data and the first and second captured item identification information being communicated to the data storage device selectively commencing distribution of each item of the first and second sets of items of the pooled group to the associated selected destinations in accordance with specified consolidation and routing data;

receiving by a delivery device upon arrival for delivery of the first or second sets of items to their corresponding selected destinations, data associated with the corresponding selected destination and record a delivery arrival time, and receiving the specified consolidation and routing data as preload delivery data, and receiving third user input corresponding to the first and second sets of items of the pooled group of items being delivered to the first or second destination corresponding thereto, the delivery scanning further comprising receiving third captured item identification information for each delivered item of the pooled group of items and determining an elapsed delivery time for the first or second set of items in accordance with the delivery arrival time and a corresponding delivery end time, and determining a correspondence between the preload delivery data, the third user input, and the third captured item identification information, and classifying in accordance with the determined correspondence each delivered item of the pooled group of items as a one of a delivered item, a mis-delivered item, an un-delivered item, or an over-delivered item; and, generating by a report output of the pooled transport distribution computer report data representative of the elapsed delivery time for each of the first and second sets of items and a result of the outbound scan integrity checking and the classifying by the delivery scanning.

12. The method of claim 11, wherein the communicating comprises at least one of physically connecting with the data storage device or wirelessly connecting with the data storage device.

13. The method of claim 11, further comprising accessing the data storage device through an Internet connection.

14. The method of claim 13, further comprising formatting, by the data storage device, the associated information in accordance with an input user request.

15. The method of claim 11, further comprising: associating the first set of items of the pooled group of items with a first shipper in accordance with the item identification information;
associating the second set of items of the pooled group of items with a second shipper in accordance with the item identification information; and
commencing distribution by the pool distributor of the first set of items of the first shipper together with the second set of items of the second shipper on a single route specified by a user-selected consolidation mode.

16. A tangible computer readable medium storing instructions for controlling operation of a pooled transport distribution computer including a processor and a data storage device, the pooled transport distribution computer for managing items in an associated pool distribution supply chain for pooled distribution via an associated pooled transport distribution system of the items to one or more associated destinations, the tangible computer readable medium instructions comprising:

item information capturing instructions comprising first capturing item identification information associated with a plurality of received items, the plurality of received items being associated with a plurality of unique shipper sources and delivery destinations, each of the plurality of items being identified for supply chain management in the associated pooled transport distribution system, the item information capturing instructions performed by controlling an input device of the pooled transport distribution computer;

mode specifying instructions comprising receiving first user input corresponding to a selection of at least one of a plurality of capturing modes, wherein each capturing mode is configured to create association information data by associating the first captured item identification information with pool distribution supply chain information, the mode specifying instructions performed by controlling the input device;

outbound scan integrity check instructions comprising receiving second user input corresponding to a user-selected sorted consolidation of groups of the plurality if items associated with the plurality of unique shipper sources prior to delivery of the plurality of items to associated selected destinations of the one or more associated destinations, the user-selected sorted consolidation of groups of the plurality of items grouping a first set of items of the plurality of items according to a selected first destination of the one or more associated destinations together with a second set of items of the plurality of items according to a selected second destination of the one or more associated destinations as a pooled group of items to be delivered in accordance with the pool distribution supply chain information to the associated destinations of the one or more associated destinations, the outbound scan integrity check instructions further controlling the input device for second capturing item identification information for each item of the pooled group of items for determining a mis-sorted item amongst the pooled group of items comprising the first and second sets of items by comparing the second captured item identification information with data associated with the selected destinations, the outbound scan integrity check instructions performed by controlling the input device in accordance with one of the plurality of capturing modes;

communicating instructions comprising communicating the association information data and the first and second captured item identification information to the data storage device for storage, the association information data and the first and second captured item identification information being communicated to the data storage device selectively commencing distribution of each item of the first and second sets of items of the pooled group to the associated selected destinations in accordance with specified consolidation and routing data, the communicating instruction performed by controlling a communication port of the pooled transport distribution computer;

delivery scan instructions comprising, upon arrival for delivery of the first or second sets of items to their corresponding selected destinations, receiving data associated with the corresponding selected destination and recording a delivery arrival time, and receiving the specified consolidation and routing data as preload delivery data and receiving third user input corresponding to the first or second sets of items of the pooled group of items being delivered to the first or second destination corresponding thereto, the delivery scan instructions controlling a delivery device to receive by selectively scanning each delivered item of the pooled group of items, third captured item identification information for each delivered item of the pooled group of items, and determining an elapsed delivery time for the first or second set of items in accordance with the delivery arrival time and a corresponding delivery end time, and determining a correspondence between the preload delivery data, the third user input, and the third captured item identification information, and classifying in accordance with the correspondence each delivered item of the pooled group of items as a one of a delivered item, a mis-delivered item, an un-delivered item, or an over-delivered item, the delivery scan instructions performed by controlling the delivery device of the pooled transport distribution computer; and, reporting instructions comprising generating report data representative of the elapsed delivery time for each of the first and second sets of items and a result of the determining by the outbound integrity check instructions and the delivery and classifying instructions, the reporting instructions performed by controlling a report output of the pooled transport distribution computer.

17. The medium of claim 16, wherein the communicating instructions comprise instructions for communicating by at least one of a physical connection to the data storage device or a wireless connection to the data storage device.

18. The medium of claim 16, further comprising instructions for accessing the data storage device through an Internet connection.

19. The medium of claim 18, further comprising instructions for formatting the associated information in accordance with an input user request.

20. The medium of claim 16, wherein:
the first set of items of the pooled group of items is associated with a first shipper in accordance with the item identification information;
the second set of items of the pooled group of items is associated with a second shipper in accordance with the item identification information; and
the outbound scan integrity check instructions comprise instructions for commencing distribution by the pool distributor of the first set of items of the first shipper together with the second set of items of the second shipper on a single route specified by a user-selected consolidation mode.

21. A computer implemented method performed by an associated electronic system for managing items in an associated pool distribution supply chain for pooled distribution of the items to one or more destinations via an associated pooled transport distribution system, the computer implemented method comprising:
first capturing, by an input device of the associated electronic system, item identification information associated with a plurality of received items, the plurality of received items being associated with a plurality of unique shipper sources and delivery destinations, and each of the plurality of items being identified for supply chain management in the associated pooled transport distribution system;
receiving, by a capturing mode specifying input on the input device of the associated system, first user input corresponding to a selection of at least one of a plurality of capturing modes, wherein each capturing mode is configured to create association information data by associating the first captured item identification information with pool distribution supply chain information;
receiving, by an outbound scan integrity check input being one of the plurality of capturing modes of the input device of the associated system, second user input corresponding to a user-selected sorted consolidation of groups of the plurality of items associated with the plurality of unique shipper sources prior to delivery of the plurality of items to associated selected destinations of the one or more associated destinations, the user-selected sorted consolidation of groups of the plurality of items grouping a first set of items of the plurality of items according to a selected first destination of the one or more associated destinations together with a second set of items of the plurality of items according to a selected second destination of the one or more associated destinations as a pooled group of items to be delivered in accordance with the pool distribution supply chain information to the associated destinations of the one or more associated destinations, the outbound scan integrity check input further receiving second capturing item identification information for each item of the pooled group of items for determining a mis-sorted item amongst the pooled group of items comprising the first and second sets of items by comparing the second captured item identification information with data associated with the selected destinations;
communicating, by a communication port of the associated system, the association information data and the first and second captured item identification information to an associated data storage device of the associated electronic system for storage, the association information data and the first and second captured item identification information being communicated to the associated data storage device selectively commencing distribution of each item of the first and second sets of items of the pooled group to the associated selected destinations in accordance with consolidation and routing data;
upon arrival for delivery of the first or second sets of items to their corresponding selected destinations, receiving by a delivery device of the associated system data associated with the corresponding selected destination and a recorded delivery arrival time, and receiving the specified consolidation and routing data as preload delivery data, and receiving third user input corresponding to the first or second sets of items of the pooled group of items being delivered to the first or second destinations corresponding thereto, and the delivery scanning further comprising receiving, by selectively scanning each delivered item of the pooled group of items, third captured item identification information for each delivered item of the pooled group of items, and determining an elapsed delivery time for the first or second set of items in accordance with the delivery arrival time and a corresponding delivery end time, and determining a correspondence between the preload delivery data, the third user input, and the third captured item identification information, and classifying in accordance with the determined correspondence each delivered item of the pooled group of items as a one of a delivered item, a mis-delivered item, an un-delivered item, or an over-delivered item; and, generating by a report output of the associated system report data representative of the elapsed delivery time for each of the first and second sets of items and a result of the outbound scan integrity checking and the classifying by the delivery scanning.

22. The method of claim 21, further comprising accessing the data storage device through an Internet connection.

23. The method of claim 22, further comprising formatting the association information data in the data storage device in accordance with an input user request.

24. The method of claim 21, further comprising:
associating the first set of items of the pooled group of items with a first shipper in accordance with the item identification information;
associating the second set of items of the pooled group of items with a second shipper in accordance with the item identification information; and
commencing distribution by the pool distributor of the first set of items of the first shipper together with the second set of items of the second shipper on a single route specified by a user-selected consolidation mode.

* * * * *